(12) United States Patent
Sakurai et al.

(10) Patent No.: US 11,601,664 B2
(45) Date of Patent: *Mar. 7, 2023

(54) DECODING DEVICE AND DECODING METHOD, AND ENCODING DEVICE AND ENCODING METHOD

(71) Applicant: SONY CORPORATION, Tokyo (JP)

(72) Inventors: Hironari Sakurai, Tokyo (JP); Ohji Nakagami, Tokyo (JP); Yoshitomo Takahashi, Kanagawa (JP); Teruhiko Suzuki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 91 days.

This patent is subject to a terminal disclaimer.

(21) Appl. No.: 17/238,736

(22) Filed: Apr. 23, 2021

(65) Prior Publication Data

US 2021/0258597 A1    Aug. 19, 2021

Related U.S. Application Data

(60) Division of application No. 16/380,058, filed on Apr. 10, 2019, now Pat. No. 11,025,939, which is a
(Continued)

(30) Foreign Application Priority Data

Apr. 6, 2012 (JP) ................................. 2012-087870
Jun. 14, 2012 (JP) ................................. 2012-135222

(51) Int. Cl.
*H04N 19/00* (2014.01)
*H04N 19/46* (2014.01)
(Continued)

(52) U.S. Cl.
CPC ........... *H04N 19/46* (2014.11); *H04N 13/161* (2018.05); *H04N 19/597* (2014.11)

(58) Field of Classification Search
CPC ..... H04N 19/46; H04N 13/161; H04N 19/597
See application file for complete search history.

(56) References Cited

U.S. PATENT DOCUMENTS 9,367,746 B2    6/2016  Ishihara
2005/0248561 A1  11/2005  Ito et al.
(Continued)

FOREIGN PATENT DOCUMENTS

EP    2362664 A1    8/2011
JP    2010-268433 A    11/2010
(Continued)

OTHER PUBLICATIONS

Jan. 23, 2019, Chinese Office Action issued for related CN application No. 201711296706.7.
(Continued)

*Primary Examiner* — Frank F Huang
(74) *Attorney, Agent, or Firm* — Paratus Law Group, PLLC

(57) ABSTRACT

The present technology relates to a decoding device and a decoding method, and an encoding device and an encoding method that enable images that configure a packed image to be reliably displayed when an encoded stream is decoded and displayed. A decoding unit decodes an encoded data, the encoded data being an encoded packed image in which a plurality of images is packed, and generates the packed image. A display control unit identifies the images that configure the packed image based on packing SEI preferentially used when the packed image is displayed. The present technology can be applied to a decoding device, for example.

11 Claims, 36 Drawing Sheets

Related U.S. Application Data continuation of application No. 14/381,643, filed as application No. PCT/JP2013/059134 on Mar. 27, 2013, now abandoned.

(51) Int. Cl.
  *H04N 19/597* (2014.01)
  *H04N 13/161* (2018.01)

(56) References Cited

U.S. PATENT DOCUMENTS

| | | | |
|---|---|---|---|
| 2010/0046635 A1 | 2/2010 | Pandit et al. | |
| 2010/0128105 A1 | 5/2010 | Halavy | |
| 2011/0268194 A1 | 11/2011 | Nagano | |
| 2011/0280311 A1 | 11/2011 | Chen et al. | |
| 2012/0020413 A1 | 1/2012 | Chen et al. | |
| 2012/0033039 A1 | 2/2012 | Sasaki et al. | |
| 2015/0172693 A1* | 6/2015 | Yang | H04N 19/119 375/240.26 |
| 2019/0238877 A1* | 8/2019 | Sakurai | H04N 19/597 |
| 2020/0275129 A1* | 8/2020 | Deshpande | H04N 19/186 |
| 2021/0400142 A1* | 12/2021 | Jorasch | H04M 3/567 |
| 2022/0283433 A1* | 9/2022 | Christmas | G02B 27/0103 |

FOREIGN PATENT DOCUMENTS

| | | |
|---|---|---|
| JP | 2011-109397 A | 6/2011 |
| JP | 2011-526770 A | 10/2011 |
| WO | WO 2010/085361 A2 | 7/2010 |
| WO | WO 2012/001606 A1 | 1/2012 |
| WO | WO 2012/017643 A1 | 2/2012 |

OTHER PUBLICATIONS

Jan. 29, 2019, Japanese Office Action issued for related JP application No. 2017-245731.
Sep. 13, 2018, Japanese Office Action issued for related JP application No. 2017-245731.
Okubo et al., H.264/AVC Textbook, Jan. 1, 2009, pp. 293, Impress R&D Corporation, Tokyo, Japan.
Nov. 30, 2016, CN communication issued for related CN application No. 201380018043.6.
Mar. 29, 2016, Japanese Office Action for related JP Application No. 2014-509125.
Nakagami, et al., "On stereo 3D coding using frame packing arrangement SEI", Joint Collaborative Team on Video Coding (JCT-VC) of ITU-T SG16 WP3 and ISO/IEC JTC1/SC29/WG11, Apr. 27-May 7, 2012, pp. 1-4, 9$^{th}$ Meeting: Geneva, CH.
Nakagami, et al., "Frame packing arrangement SEI extension for HEVC", Joint Collaborative Team on Video Coding (JCT-VC) of ITU-T SG16 WP3 and ISO/IEC JTC1/SC29/WP11, Apr. 27-May 7, 2012, pp. 1-4, 9$^{th}$ Meeting: Geneva, CH.
Aug. 12, 2015, EP communication issued for related EP application No. 13772798.8.
Ohji Nakagami, et al., 2D compatible frame packing arrangement SEI, Joint Collaborative Team on Video Coding (JCT-VC) of ITU-T SG 16 WP 3 and ISO/IEC JTC 1/SC 29/WG 11, Jul. 11-20, 2012, pp. 1-7, 10$^{th}$ Meeting: Stockholm, SE.
Benjamin Bross, et al., High-efficiency video coding (HEVC) text specification draft 6, Joint Collaborative Team on Video Coding (JCT-VC) of ITU-T SG16 WP3 and ISO/IEC JTC1/SC29/WG11, Feb. 1-10, 2012, pp. 1-259, 8th Meeting: San José, CA.
Feb. 3, 2020, Chinese Office Action issued for related CN Application No. 201711296706.7.

* cited by examiner

FIG. 3

| | | Descriptor |
|---|---|---|
| 1 | vui_parameters() { | |
| 2 | aspect_ratio_info_present_flag | u(1) |
| 3 | ... | |
| 4 | neutral_chroma_indication_flag | u(1) |
| 5 | field_indication_presence_flag | u(1) |
| 6 | frame_packing_arrangement_flag | u(1) |
| 7 | timing_info_present_flag | u(1) |
| 8 | ... | |
| 9 | } | |

FIG. 4

| | | C | Descriptor |
|---|---|---|---|
| 1 | frame_packing_arrangement(payloadSize) { | | |
| 2 | frame_cropping_override_flag | | |
| 3 | frame_packing_arrangement_id | | |
| 4 | frame_packing_arrangement_cancel_flag | | |
| 5 | if( !frame_packing_arrangement_cancel_flag ) { | | |
| 6 | content_interpretation_type | | |
| 7 | num_of_picture_minus1 | | |
| 8 | for(i=0;i<=num_of_picture_minus1;i++) { | | |
| 9 | picture_left_offset | | |
| 10 | picture_right_offset | | |
| 11 | picture_top_offset | | |
| 12 | picture_bottom_offset | | |
| 13 | picture_id=i | | |
| 14 | } | | |
| 15 | frame_packing_arrangement_reserved_byte | | |
| 16 | frame_packing_arrangement_repetition_period | | |
| 17 | } | | |
| 18 | frame_packing_arrangement_extension_flag | | |
| 19 | } | | |

FIG. 5

| frame_packing_arrangement_id | |
|---|---|
| Value | Interpretation |
| 0 | Each component plane of the decoded frames contains a side-by-side packing arrangement of corresponding planes of two constituent frames. |
| 1 | Each component plane of the decoded frames contains top-bottom packing arrangement of corresponding planes of two constituent frames. |
| 2 | others |

FIG. 6

| content_interpretation_type | |
|---|---|
| Value | Interpretation |
| 0 | Unspecified relationship between the frame packed constituent frames |
| 1 | Indicates that the two constituent pictures form the left and right pictures of a stereo picture scene, with pictureid 0 being associated with the left picture and pictureid 1 being associated with the right picture |
| 2 | Indicates that the two constituent pictures form the right and left pictures of a stereo picture scene, with pictureid 0 being associated with the right picture and pictureid 1 being associated with the left picture |

| 1 | for( j = 0,tileId= 0; j <= num_tile_columns_minus1; j++ ) |
| 2 |    for( i = 0; i <= num_tile_rows_minus1; i++, tileId++ ) |
| 3 |       pictureid |

FIG. 10
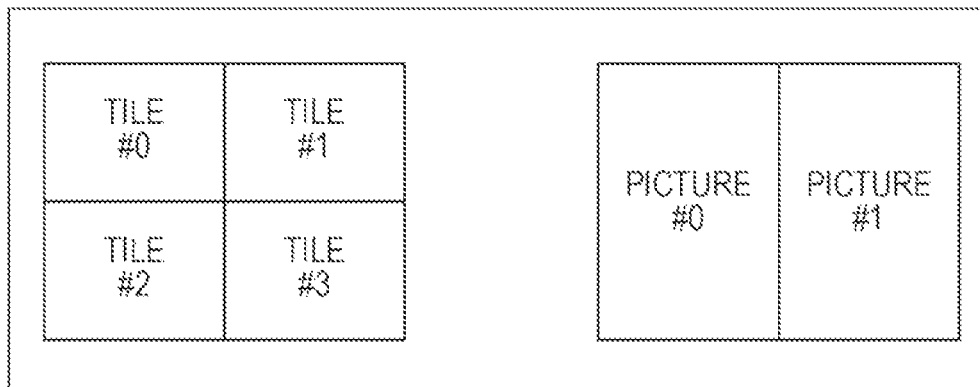
FIG. 11
| 1 | for( i = 0; i <= slice_num; i++ ) |
|---|---|
| 2 | pictureid |
FIG. 12
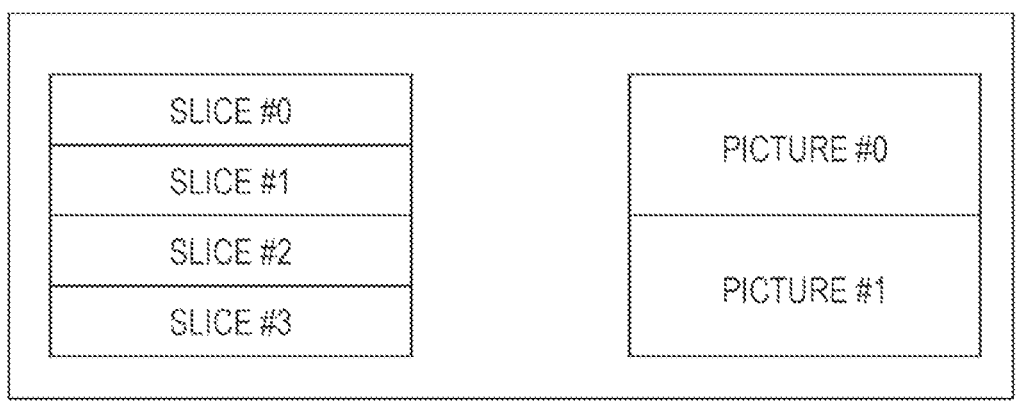

FIG. 13

| | C | Descriptor |
|---|---|---|
| frame_packing_arrangement(payloadSize) { | | |
| frame_cropping_override_flag | 5 | u(1) |
| frame_packing_arrangement_id | 5 | ue(v) |
| frame_packing_arrangement_cancel_flag | 5 | u(1) |
| if(!frame_packing_arrangement_cancel_flag) { | | |
| frame_packing_arrangement_type | 5 | u(7) |
| quincunx_sampling_flag | 5 | u(1) |
| content_interpretation_type | 5 | u(6) |
| spatial_flipping_flag | 5 | u(1) |
| frame0_flipped_flag | 5 | u(1) |
| field_pictures_flag | 5 | u(1) |
| current_frame_is_frame0_flag | 5 | u(1) |
| frame0_self_contained_flag | 5 | u(1) |
| frame1_self_contained_flag | 5 | u(1) |
| if(!quincunx_sampling_flag&&frame_packing_arrangement_type != 5) { | | |
| frame0_grid_position_x | 5 | u(4) |
| frame0_grid_position_y | 5 | u(4) |
| frame1_grid_position_x | 5 | u(4) |
| frame1_grid_position_y | 5 | u(4) |
| } | | |
| frame_packing_arrangement_reserved_byte | 5 | u(8) |
| frame_packing_arrangement_repetition_period | 5 | ue(v) |
| } | | |
| frame_packing_arrangement_extension_flag | 5 | u(1) |
| } | | |

FIG. 14

| 1 | seq_parameter_set_rbsp( ) { | Descriptor |
|---|---|---|
| 2 | profile_idc | u(8) |
| 3 | reserved_zero_8bits /* equal to 0 */ | u(8) |
| 4 | level_idc | u(8) |
| 5 | seq_parameter_set_id | ue(v) |
| 6 | chroma_format_idc | ue(v) |
| 7 | if( chroma_format_idc == 3 ) | |
| 8 | separate_colour_plane_flag | u(1) |
| 9 | max_temporal_layers_minus1 | u(3) |
| 10 | pic_width_in_luma_samples | ue(v) |
| 11 | pic_height_in_luma_samples | ue(v) |
| 12 | pic_cropping_flag | u(1) |
| 13 | if( pic_cropping_flag ) { | |
| 14 | pic_crop_left_offset | ue(v) |
| 15 | pic_crop_right_offset | ue(v) |
| 16 | pic_crop_top_offset | ue(v) |
| 17 | pic_crop_bottom_offset | ue(v) |
| 18 | } | |
| 19 | bit_depth_luma_minus8 | ue(v) |
| 20 | bit_depth_chroma_minus8 | ue(v) |
| 21 | pcm_enabled_flag | u(1) |
| 22 | if( pcm_enabled_flag ) { | |
| 23 | pcm_bit_depth_luma_minus1 | u(4) |
| 24 | pcm_bit_depth_chroma_minus1 | u(4) |
| 25 | } | |
| 26 | qpprime_y_zero_transquant_bypass_flag | u(1) |
| 27 | log2_max_pic_order_cnt_lsb_minus4 | ue(v) |
| 28 | for( i = 0; i <= max_temporal_layers_minus1; i++ ) { | |
| 29 | max_dec_pic_buffering[ i ] | ue(v) |
| 30 | num_reorder_pics[ i ] | ue(v) |
| 31 | max_latency_increase[ i ] | ue(v) |
| 32 | } | |
| 33 | restricted_ref_pic_lists_flag | u(1) |
| 34 | if( restricted_ref_pic_lists_flag ) | |
| 35 | lists_modification_present_flag | u(1) |
| 36 | log2_min_coding_block_size_minus3 | ue(v) |
| 37 | log2_diff_max_min_coding_block_size | ue(v) |
| 38 | log2_min_transform_block_size_minus2 | ue(v) |
| 39 | log2_diff_max_min_transform_block_size | ue(v) |
| 40 | if( pcm_enabled_flag ) { | |
| 41 | log2_min_pcm_coding_block_size_minus3 | ue(v) |
| 42 | log2_diff_max_min_pcm_coding_block_size | ue(v) |
| 43 | } | |
| 44 | max_transform_hierarchy_depth_inter | ue(v) |
| 45 | max_transform_hierarchy_depth_intra | ue(v) |
| 46 | scaling_list_enable_flag | u(1) |
| 47 | chroma_pred_from_luma_enabled_flag | u(1) |

FIG. 24

| | | Descriptor |
|---|---|---|
| 1 | 2Dcompatible_frame_packing_arrangement(payloadSize) { | |
| 2 |   2Dcomp_FPA_id | ue(v) |
| 3 |   2Dcomp_FPA_cancel_flag | u(1) |
| 4 |   if(!2Dcomp_FPA_cancel_flag){ | |
| 5 |     2Dcomp_FPA_type | u(2) |
| 6 |     2Dcomp_FPA_content_interpretation_type | u(6) |
| 7 |     for(i=0;i<2;i++){ | |
| 8 |       spatial_flipping_flag_frame[i] | u(1) |
| 9 |       self_contained_flag_frame[i] | u(1) |
| 10 |       grid_position_x_frame[i] | u(4) |
| 11 |       grid_position_y_frame[i] | u(4) |
| 12 |       top_position_frame[i] | ue(v) |
| 13 |       left_position_frame[i] | ue(v) |
| 14 |       bottom_position_frame[i] | ue(v) |
| 15 |       right_position_frame[i] | ue(v) |
| 16 |     } | |
| 17 |     2Dcomp_FPA_reserved_byte | u(8) |
| 18 |     2Dcomp_FPA_repetition_period | ue(v) |
| 19 |   } | |
| 20 |   2Dcomp_FPA_extension_flag | u(1) |
| 21 | } | |

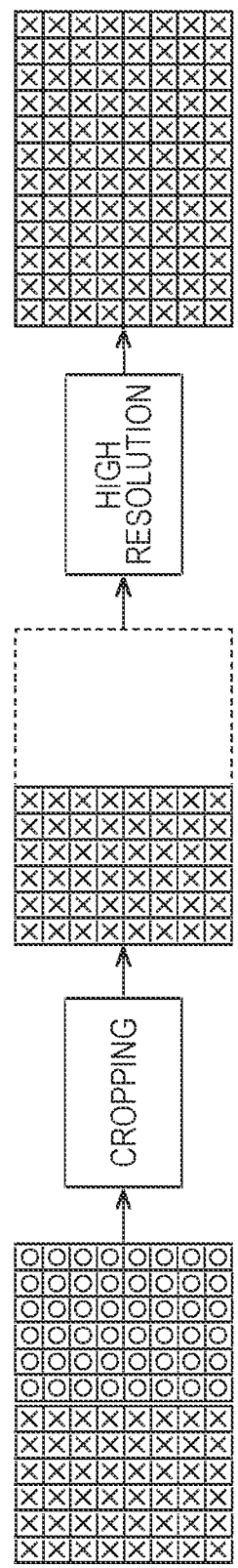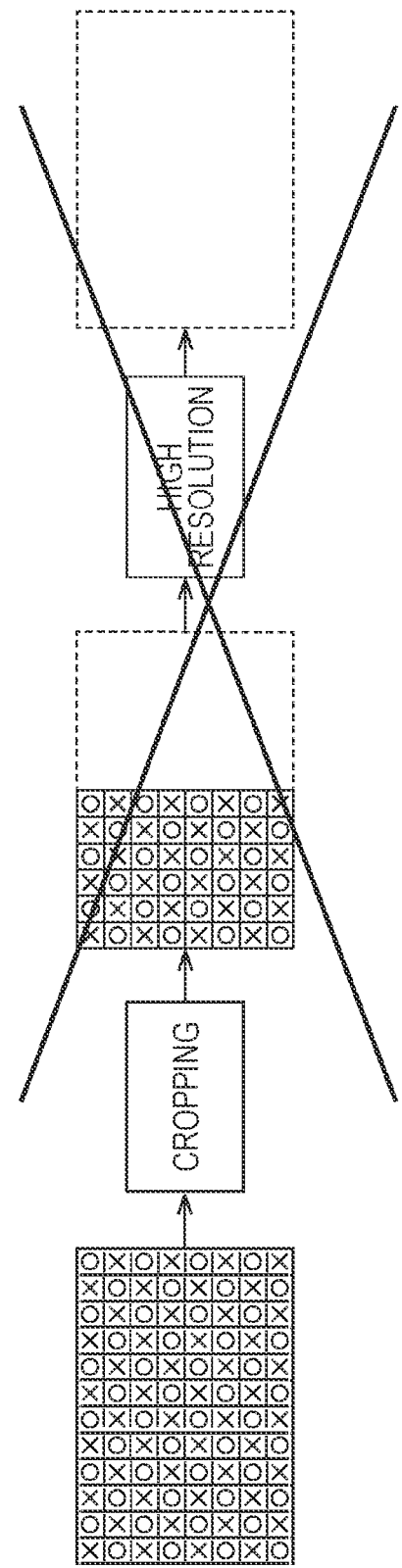

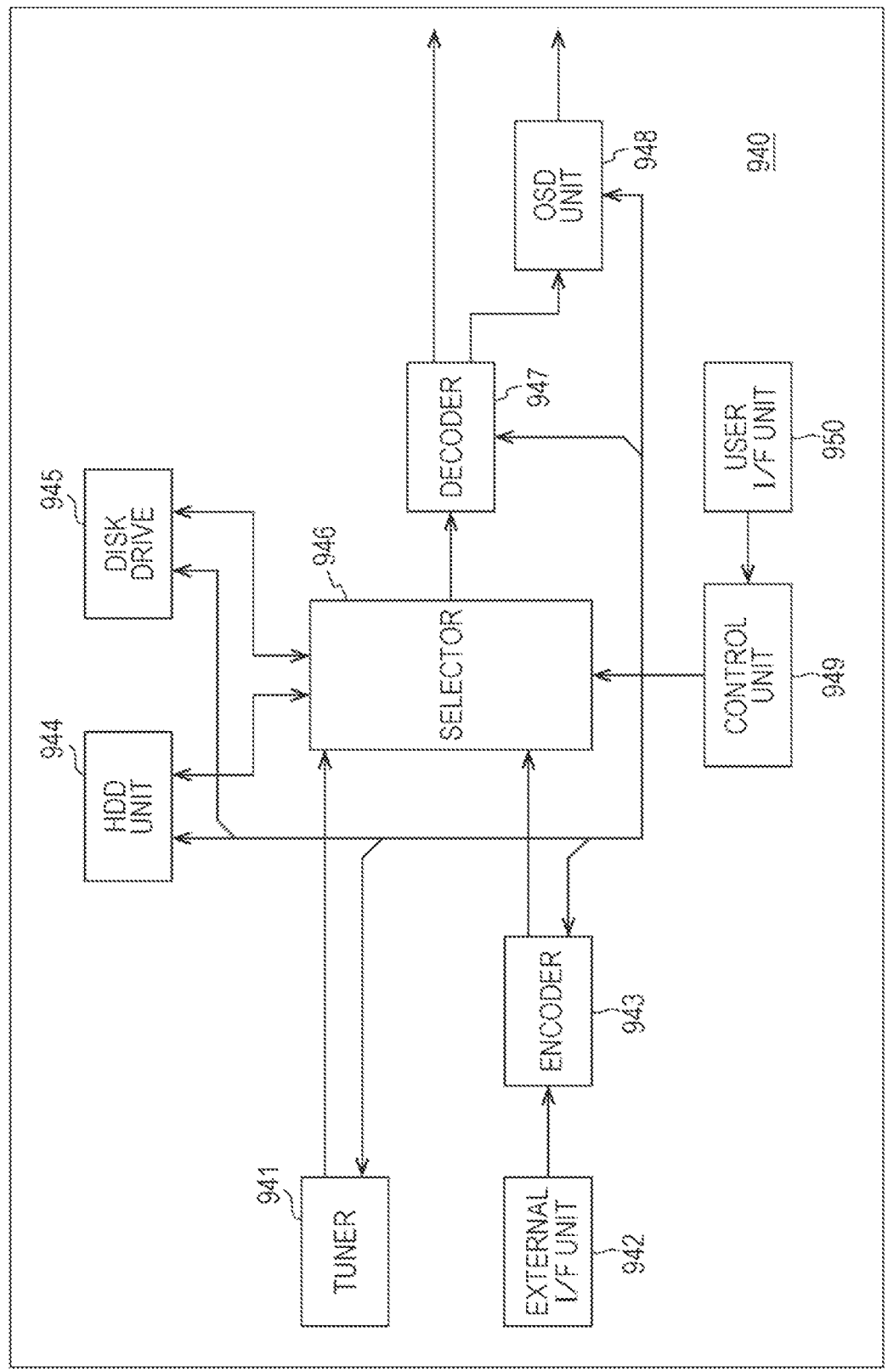

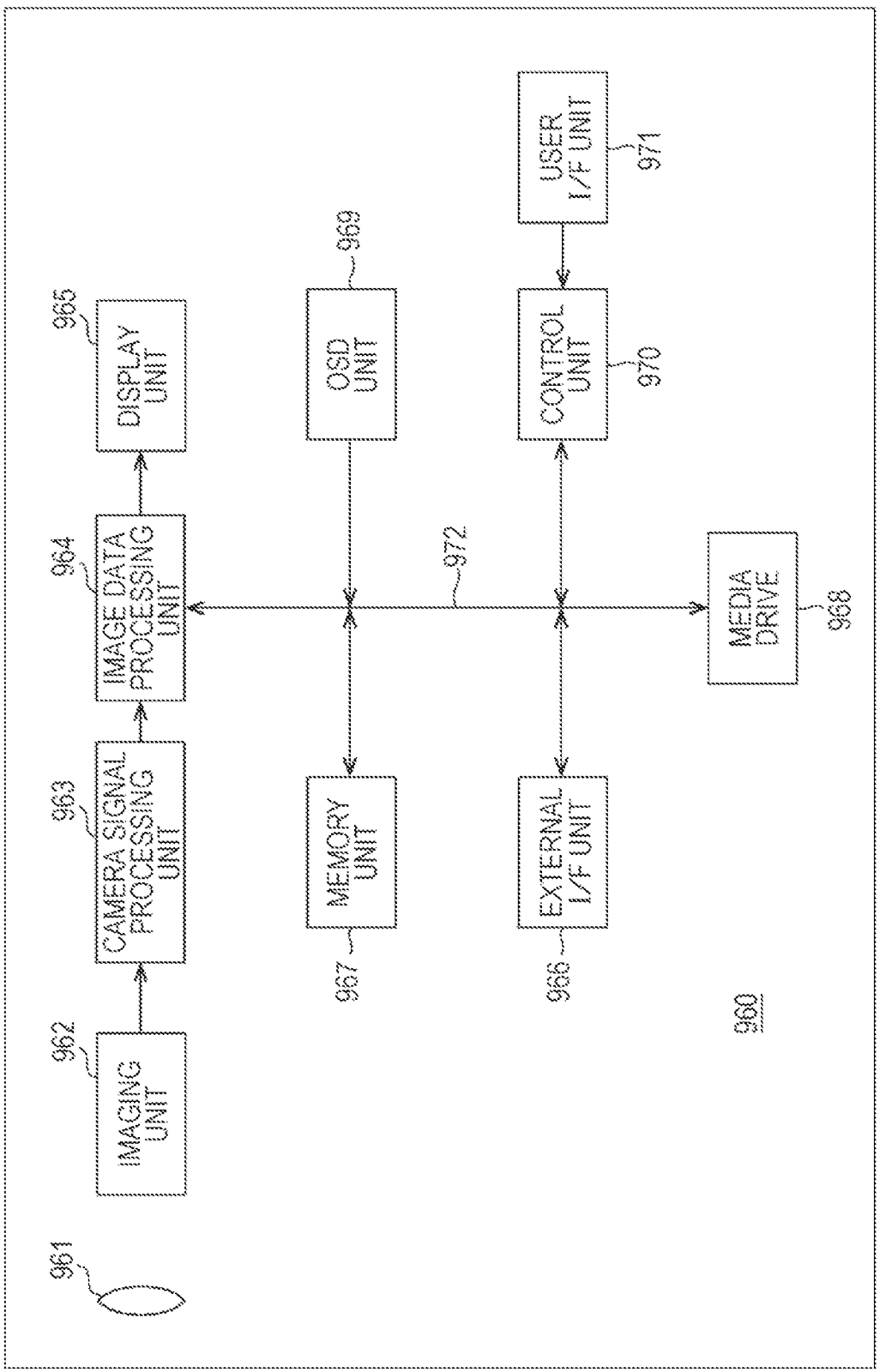

DECODING DEVICE AND DECODING METHOD, AND ENCODING DEVICE AND ENCODING METHOD

CROSS REFERENCE TO PRIOR APPLICATION

This application is a divisional of U.S. patent application Ser. No. 16/380,058 (filed on Apr. 10, 2019), which is a continuation of U.S. patent application Ser. No. 14/381,643 (filed on Aug. 28, 2014), which is a National Stage Patent Application of PCT International Patent Application No. PCT/JP2013/059134 (filed on Mar. 27, 2013) under 35 U.S.C. § 371, which claims priority to Japanese Patent Application Nos. 2012-135222 (filed on Jun. 14, 2012) and 2012-087870 (filed on Apr. 6, 2012), which are all hereby incorporated by reference in their entirety.

TECHNICAL FIELD

The present technology relates to a decoding device and a decoding method, and an encoding device and an encoding method, and especially relates to a decoding device and a decoding method, and an encoding device and an encoding method that enable, when an encoded stream of a packed image in which a plurality of images is packed is decoded and displayed, images that configure the packed image to be reliably displayed.

BACKGROUND ART

In the conventional advanced video coding (AVC) standard, to indicate an image to be encoded is a packed image in which a plurality of images is packed in one-frame image, frame packing arrangement supplemental enhancement information (SEI) is used. However, in the AVC standard, SEI that is additional information related to encoding is informative information. Therefore, whether the processing is performed using the SEI is depending on a decoding device.

For example, when an encoded stream of a 3D display packed image that is packed by a side-by-side system that performs packing by arranging one of two images on the left-half and the other on the right-half, a 2D display decoding device that uses SEI divides a screen of a 3D display packed image based on Frame packing arrangement SEI. The decoding device then performs 2D display by displaying a left-eye image or a right-eye image arranged on the left-half of the screen.

Further, a 3D display decoding device that uses SEI divides the screen of the 3D display packed image based on the Frame packing arrangement SEI. The decoding device then performs 3D display by displaying the image arranged on the left-half of the screen as one of the left-eye image or the right-eye image, and displays the image arranged on the right-half of the screen as the other image.

However, the 2D display decoding device that does not use the SEI cannot determine whether the encoded image is a packed image, and displays the 3D display packed image as it is. As a result, a 2D image in which one of the left-eye image or the right-eye image is arranged on the left-half of the screen, and the other image is arranged on the right-half of the screen is displayed.

Therefore, in the 2D display decoding device that does not use the SEI, to display only either one of the left-eye image or the right-eye image that configures a packed image, a technique of using cropping has been proposed.

In this technique, for example, frame_cropping flag that indicates whether cropping is performed with respect to the packed image and cropping information including a position of the left-eye image as a cropped position are included in a sequence parameter set (SPS) or the like, and are transmitted to the decoding device.

In this case, the 2D display decoding device crops and displays the left-eye image from the packed image based on the cropping information, thereby performing the 2D display, regardless of use of the SEI.

However, the cropping information is included in the SPS, and the SPS is mandatory information on the standard. Therefore, even the 3D display decoding device that uses the SEI needs to crop the left-eye image from the packed image based on the cropping information. As a result, even the 3D display decoding device that uses the SEI only displays the left-eye image, and cannot perform 3D display.

Therefore, a 3D image decoding device using SEI has been developed. The 3D decoding device ignores, when having recognized that an image to be encoded is a packed image according to the Frame packing arrangement SEI, the cropping information and crops images that configure the packed image based on the Frame packing arrangement SEI. This decoding device can perform 3D display by displaying the cropped images as the left-eye image and the right-eye image, respectively.

However, processing of ignoring the cropping information included in the SPS is processing that violates the standard, and thus the 3D display is not guaranteed.

Meanwhile, currently, to further improve the encoding efficiency from H.264/AVC, standardization of an encoding system called high efficiency video coding (HEVC) is proceeding by joint collaboration team-video coding (JCTVC) that is a joint standardization body of ITU-T and ISO/IEC. Regarding the HEVC standard, Committee draft that is the first draft specification has been issued on February 2012 (for example, see Non-Patent Document 1).

CITATION LIST

Non Patent Document

Non-Patent Document 1: Benjamin Bross, Woo-Jin Han, Jens-Rainer Ohm, Gary J. Sullivan, Thomas Wiegand, "High efficiency video coding (HEVC) text specification draft 6", JCTVC-H1003 ver. 20, 2012.2.17

SUMMARY OF THE INVENTION

Problems to be Solved by the Invention

As described above, under the conventional standard, the 2D display decoding device that uses the SEI and the 2D display decoding device that does not use the SEI perform 2D display using the 3D display packed image without violating the standard, and the 3D display decoding device that uses the SEI cannot performs the 3D display using the 3D display packed image. That is, under the convention, when decoding and displaying an encoded stream of a packed image, the decoding device cannot reliably display desired images that configure the packed image.

The present technology has been made in view of the foraging, and enables images that configure a packed image to be reliably displayed when an encoded stream of the packed image is decoded and displayed.

Solutions to Problems

A decoding device according to a first aspect of the present technology includes: a decoding unit configured to decode encoded data, the encoded data being an encoded packed image in which a plurality of images is packed, and to generate the packed image; and a control unit configured to identify each image that configures the packed image generated by the decoding unit based on packing information related to the packing, the packing information being preferentially used when the packed image is displayed.

A decoding method of the first aspect of the present technology corresponds to a decoding device of the first aspect of the present technology.

In the first aspect of the present technology, images that configure a packed image is identified based on packing information related to packing, the packing information preferentially being used when encoded data obtained such that the packed image in which a plurality of images is packed is encoded is decoded and the packed image is generated, and the packed image is displayed.

An encoding device according to a second aspect of the present technology includes: an encoding unit configured to encode a packed image in which a plurality of images is packed, and to generate encoded data; a setting unit configured to set packing information related to the packing, the packing, information being preferentially used when the packed image is displayed; and a transmission unit configured to transmit the encoded data generated by the encoding unit, and the packing information set by the setting unit.

An encoding method of the second aspect of the present technology corresponds to an encoding device of the second aspect of the present technology.

In the second aspect of the present technology, packing information related to packing is set, the packing information being preferentially used when a packed image in which a plurality of images is packed is encoded and encoded data is generated, and the packed image is displayed, and the encoded data and the packing information are transmitted.

Note that the decoding device of the first aspect and the encoding device of the second aspect can be realized by execution of programs by a computer.

Further, to realize the decoding device of the first aspect and the encoding device of the second aspect, the programs executed by the computer can be provided by being transmitted through a transmission medium or by being recorded on a recording medium.

Further, the decoding device of the first aspect and the encoding device of the second aspect may be independent devices, or may be internal blocks that configure single devices.

Effects of the Invention

According to the first aspect of the present technology, when an encoded stream of a packed image is decoded and displayed, images that configure the packed image can be reliably displayed.

According to the second aspect of the present technology, an encoded stream of a packed image can be generated so that images that configure the packed image can be reliably displayed when the encoded stream of the packed image is decoded and displayed.

BRIEF DESCRIPTION OF DRAWINGS

FIG. 3 is a diagram illustrating an example of syntax of VUI.

FIG. 4 is a diagram illustrating an example of syntax of frame packing SEI.

FIG. 5 is a diagram describing mode information of FIG. 4.

FIG. 6 is a diagram describing type information of FIG. 4.

FIG. 10 is a diagram describing an example of the position information of FIG. 9.

FIG. 11 is a diagram illustrating still another example of the syntax of the position information.

FIG. 12 is a diagram describing an example of the position information of FIG. 11.

FIG. 13 is a diagram illustrating another example of the syntax of the frame packing SEI.

FIG. 14 is a diagram illustrating an example of a part of syntax of a SPS.

FIG. 24 is a diagram illustrating an example of syntax of 2D-compatible frame packing SEI.

FIGS. 25A and 25B are diagrams describing a reason of change of the 2D-compatible frame packing SEI.

FIG. 39 is a diagram illustrating a schematic configuration example of a recording reproduction device to which the present technology is applied.

FIG. 40 is a diagram illustrating a schematic configuration example of an imaging device to which the present technology is applied.

MODE FOR CARRYING OUT THE INVENTION

First Embodiment (Configuration Example of First Embodiment of Encoding Device)

Figure 1:
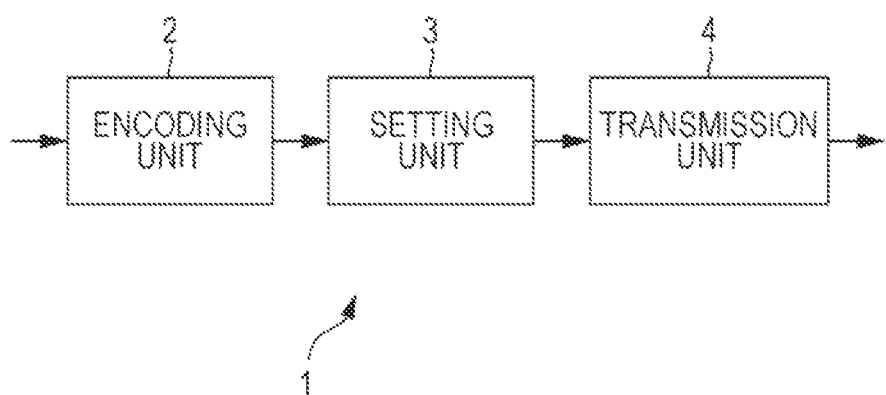
FIG. 1 is a block diagram illustrating a configuration example of a first embodiment of an encoding device to which the present technology is applied.

FIG. 1 is a block diagram illustrating a configuration example of a first embodiment of an encoding device to which the present technology is applied.

An encoding device 1 of FIG. 1 is configured from an encoding unit 2, a setting unit 3, and a transmission unit 4, and encodes an image such as a packed image in the HEVC system.

To be specific, the image such as a packed image in a frame unit is input to the encoding unit 2 of the encoding device 1 as an input signal. The encoding unit 2 encodes the input signal in the HEVC system, and supplies an encoded data obtained as a result of the encoding to the setting unit 3.

The setting unit 3 sets a SPS, a picture parameter set (PPS), video usability information (VUI) that indicates characteristics (usability) of an image corresponding to the encoded data for each sequence, SEI, and the like. The setting unit 3 generates an encoded stream from the set SPS, PPS, VUI, and SEI, and the encoded data supplied from the encoding unit 2. The setting unit 3 supplies the encoded stream to the transmission unit 4.

The transmission unit 4 transmits the encoded stream supplied from the setting unit 3 to a decoding device described below.

(Configuration Example of Encoding Unit)

Figure 2:
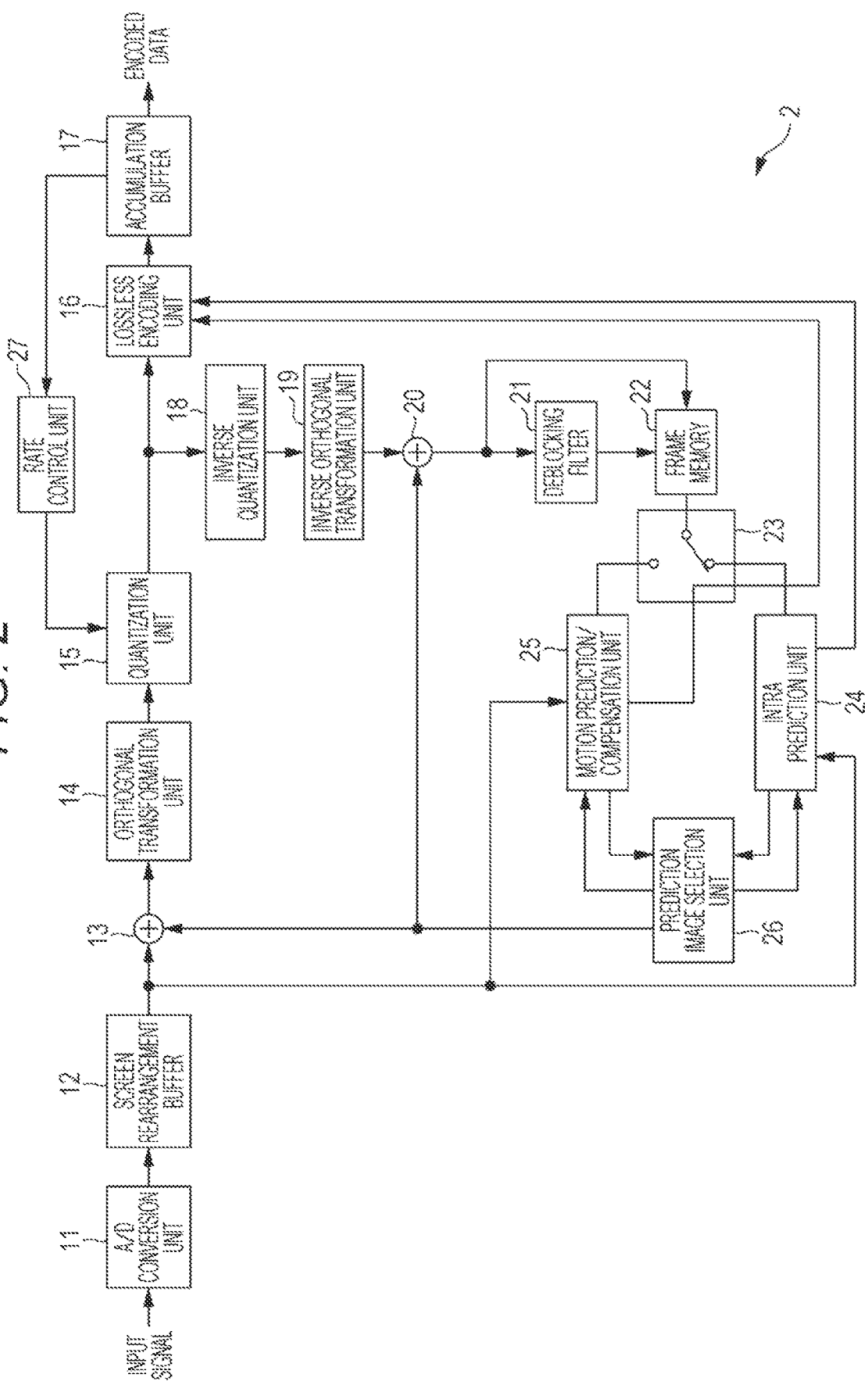
FIG. 2 is a block diagram illustrating a configuration example of an encoding unit of FIG. 1.

FIG. 2 is a block diagram illustrating a configuration example of the encoding unit 2 of FIG. 1.

The encoding unit 2 of FIG. 2 is configured from an A/D conversion unit 11, a screen rearrangement buffer 12, a calculation unit 13, an orthogonal transformation unit 14, a quantization unit 15, a lossless encoding unit 16, an accumulation buffer 17, an inverse quantization unit 18, an inverse orthogonal transformation unit 19, an adding unit 20, a deblocking filter 21, a frame memory 22, a switch 23, an intra prediction unit 24, a motion prediction/compensation unit 25, a prediction image selection unit 26, and a rate control unit 27.

To be specific, the A/D conversion unit 11 of the encoding unit 2 applies A/D conversion to the image in a frame unit input as the input signal, output the converted image to and stores the image in the screen rearrangement buffer 12. The screen rearrangement buffer 12 rearranges stored images in a display order in a frame unit to an order for encoding according to a group of picture (GOP) structure, and outputs the rearranged images to the calculation unit 13, the intra prediction unit 24, and the motion prediction/compensation unit 25.

The calculation unit 13 performs encoding by calculating a difference between a prediction image supplied from the prediction image selection unit 26 and an image to be encoded output from the screen rearrangement buffer 12. To be specific, the calculation unit 13 performs encoding by subtracting the prediction image supplied from the prediction image selection unit 26 from the image to be encoded output from the screen rearrangement buffer 12. The calculation unit 13 outputs an image as a result of the encoding to the orthogonal transformation unit 14 as residual information. Note that, when the prediction image is not supplied from the prediction image selection unit 26, the calculation unit 13 outputs the image read from the screen rearrangement buffer 12 to the orthogonal transformation unit 14 as it is as the residual information.

The orthogonal transformation unit 14 applies orthogonal transformation to the residual information from the calculation unit 13, and supplies a coefficient obtained as a result of the orthogonal transformation to the quantization unit 15.

The quantization unit 15 quantizes the coefficient supplied from the orthogonal transformation unit 14. The quantized coefficient is input to the lossless encoding unit 16.

The lossless encoding unit 16 acquires information indicating an optimum intra prediction mode (hereinafter, referred to as intra prediction mode information) from the intra prediction unit 24. Further, the lossless encoding unit 16 acquires information indicating an optimum inter prediction mode (hereinafter, referred to as inter prediction mode information), a motion vector, information for identifying a reference image, and the like from the motion prediction/compensation unit 25.

The lossless encoding unit 16 performs lossless encoding, such as variable length encoding (for example, context-adaptive variable length coding (CAVLC)), or arithmetic encoding (for example, context-adaptive binary arithmetic coding (CABAC)) with respect to the quantized coefficient supplied from the quantization unit 15.

Further, the lossless encoding unit 16 performs lossless encoding with respect to the intraprediction mode information, the inter prediction mode information, the motion vector, the information for identifying a reference image, and the like, as encoding information related to encoding. The lossless encoding unit 16 supplies the lossless encoded encoding information and coefficient to the accumulation buffer 17 as encoded data, and stores the encoded data therein. Note that the lossless encoded encoding information may serve as header information of the lossless encoded coefficient.

The accumulation buffer 17 temporarily stores the encoded data supplied from the lossless encoding unit 16. Further, the accumulation buffer 17 supplies the stored encoded data to the setting unit 3 of FIG. 1.

Further, the quantized coefficient output from the quantization unit 15 is also input to the inverse quantization unit 18, inversely quantized, and then supplied to the inverse orthogonal transformation unit 19.

The inverse orthogonal transformation unit 19 applies inverse orthogonal transformation to the coefficient supplied from the inverse quantization unit 18, and supplies residual information obtained as a result of the inverse orthogonal transformation to the adding unit 20.

The adding unit 20 adds the residual information as the image to be decoded supplied from the inverse orthogonal transformation unit 19 and the prediction image supplied from the prediction image selection unit 26 to obtain a locally decoded image. Note that, when the prediction image is not supplied from the prediction image selection unit 26, the adding unit 20 employs the residual information supplied from the inverse orthogonal transformation unit 19 as the locally decoded image. The adding unit 20 supplies the locally decoded image to the deblocking filter 21, and supplies the locally decoded image to the frame memory 22 and accumulates the image therein.

The deblocking filter 21 removes block distortion by filtering the locally decoded image supplied from the adding unit 20. The deblocking filter 21 supplies the image obtained as a result of the filtering to the frame memory 22, and accumulates the image therein. The image accumulated in the frame memory 22 is output to the intra prediction unit 24 or the motion prediction/compensation unit 25 through the switch 23 as a reference image.

The intra prediction unit 24 performs intra prediction processing in all of intra prediction modes in tile and slice units using the reference image that has not been filtered in the deblocking filter 21, and is read from the frame memory 22 through the switch 23.

Further, the intra prediction unit 24 calculates a cost function value (details will be described below) for all of candidate intra prediction modes based on the image read from the screen rearrangement buffer 12 and a prediction image generated as a result of the intra prediction processing. The intra prediction unit 24 then determines an intra prediction mode having a minimum cost function value as the optimum intra prediction mode.

The intra prediction unit 24 supplies the prediction image generated in the optimum intra prediction mode and the corresponding cost function value to the prediction image selection unit 26. When having been notified selection of the prediction image generated in the optimum intra prediction mode from the prediction image selection unit 26, the intra prediction unit 24 supplies intra prediction mode information to the lossless encoding unit 16.

Note that the cost function value is also called rate distortion (RD) cost, and is calculated based on a technique of either a High Complexity mode or a Low Complexity mode defined in the joint model (JM) that is reference software in the H.264/AVC system, for example.

To be specific, when the High Complexity mode is employed as the technique of calculating a cost function value, processing up to the lossless encoding is temporarily performed in all of the candidate prediction modes, and a cost function value expressed by the following formula (1) is calculated for each of the prediction modes.

$$\text{Cost(Mode)} = D + \lambda \cdot R \quad (1)$$

D is a difference (distortion) between an original image and a decoded image, R is a generated code amount containing up to the coefficient of the orthogonal transformation, and $\lambda$ is a Lagrange multiplier given as a function of a quantization parameter QP.

Meanwhile, when the Low Complexity mode is employed as the technique of calculating a cost function value, generation of a decoded image and calculation of header bits, such as information indicating a prediction mode, are performed for all of the candidate prediction modes, and a cost function expressed by the following formula (2) is calculated for each of the prediction modes.

$$\text{Cost(Mode)} = D + \text{QPtoQuant}(QP) \cdot \text{Header Bit} \quad (2)$$

D is a difference (distortion) between an original image and the decoded image, Header Bit is header bits with respect to a prediction mode, and QPtoQuant is a function given as a function of a quantization parameter QP.

In the Low Complexity mode, it is enough to generate the decoded image only for all of the prediction modes, and it is not necessary to perform the lossless encoding. Therefore, a smaller calculation amount is needed.

The motion prediction/compensation unit 25 performs motion prediction/compensation processing in all of the candidate inter prediction modes in tile and slice units. To be specific, the motion prediction/compensation unit 25 detects a motion vector of all of the candidate inter prediction modes in tile and slice units based on the image supplied from the screen rearrangement buffer 12 and the filtered reference image read from the frame memory 22 through the switch 23. The motion prediction/compensation unit 25 then applies compensation processing to the reference image in tile and slice units based on the motion vector, and generates a prediction image.

At this time, the motion prediction/compensation unit 25 calculates a cost function value for all of the candidate inter prediction mode based on the image supplied from the screen rearrangement buffer 12 and the prediction image, and determines an inter prediction mode having a minimum cost function value as the optimum inter measuring mode. The motion prediction/compensation unit 25 then supplies the cost function value of the optimum inter prediction mode and a corresponding prediction image to the prediction image selection unit 26. Further, when having been notified selection of the prediction image generated in the optimum inter prediction mode from the prediction image selection unit 26, the motion prediction/compensation unit 25 outputs the inter prediction mode information, the corresponding motion vector, the information that identifies the reference image, and the like to the lossless encoding unit 16.

The prediction image selection unit 26 determines either the optimum intra prediction mode or the optimum inter prediction mode having a smaller corresponding cost function value as an optimum prediction mode based on the cost function values supplied from the intra prediction unit 24 and the motion prediction/compensation unit 25. The prediction image selection unit 26 then supplies the prediction image of the optimum prediction mode to the calculation unit 13 and the adding unit 20. Further, the prediction image selection unit. 26 notifies selection of the prediction image of the optimum prediction mod to the intra prediction unit 24 or the motion prediction/compensation unit 25.

The rate control unit 27 controls a rate of a quantization operation of the quantization unit 15 based on the encoded data accumulated in the accumulation buffer 17 so that overflow or underflow is not caused.

(Example of Syntax of VUI)

FIG. 3 is a diagram illustrating an example of syntax of VUI set by the setting unit 3 of FIG. 1.

As illustrated in the 6th row of FIG. 3, the VUI includes a frame packing flag (frame_packing arrangement flag) as presence/absence information that indicates presence/absence of frame packing SEI that is SEI of packing information related to packing. The frame packing flag is 1 when indicating there is frame packing SEI, and is 0 when indicating there is no frame packing SEI.

(Example of Syntax of Frame Packing SEI)

FIG. 4 is a diagram illustrating an example of syntax of the frame packing SEI set by the setting unit 3 of FIG. 1.

As illustrated in the 2nd row of FIG. 4, the frame packing SEI (frame_packing arrangement) includes a cropping ignorance flag (frame_cropping_override_flag) as priority information that indicates whether the frame packing SEI is preferentially used when a packed image is displayed. The cropping ignorance flag is 1 when indicating the frame packing SEI is preferentially used at the time of displaying of the packed image, and is 0 when the frame packing SEI is not preferentially used at the time of displaying of the packed image.

Note that, in the first embodiment, the cropping ignorance flag is always 1. Therefore, it can be said that the frame packing flag itself is information that indicates whether the frame packing SEI is preferentially used at the time of displaying of the packed image (packing priority information).

Further, as illustrated in the 3rd row of FIG. 4, the frame packing SEI includes mode information (frame_packing_arrangement_id) that indicates a mode of the packing of the packed image. Details of the mode information will be described with reference to FIG. 5 below.

Further, as illustrated in the 6th row of FIG. 4, the frame packing SEI includes type information (content interpretation type) that indicates characteristics of images that configure the packed image. Details of the type information will be described with reference to FIG. 6 below.

Further, as illustrated in the 7th row of FIG. 4, the frame packing SEI includes the number of images information (num_of_picture_minus1) at indicates the number of images that configure the packed image. Further, as illustrated in the 8th to 14th rows of FIG. 4, the frame packing SEI includes position information that indicates positions of the images that configure the packed image in the packed image.

In the example of FIG. 4, the position information is pieces of information described for each of the images that configure the packed image, including left-end information (picture_left_offset) that indicates a left-end position of the image, right-end information (picture_right_offset) that indicates a right-end position of the image, upper-end information (picture_top_offset) that indicates an upper-end position of the image, lower-end information (picture_bottom_offset) that indicates a lower-end position of the image, and a picture ID of the image.

Details of the left-end information, the right-end information, the upper-end information, and the lower-end information will be described with reference to FIG. 7 described below. The picture ID is an ID unique to each of the images that configure the packed image.

(Description of Mode Information)

FIG. 5 is a diagram describing the mode information of FIG. 4.

As illustrated in FIG. 5, mode information (frame_packing_arrangement_id) is 0 when the mode of packing is the side-by-side mode in which the packing is performed in the side-by-side system. Further, the mode information is 1 when the mode of packing is the top-and-bottom mode in which the packing is performed by arranging of one of two images on the upper half, and the other on the lower half. Further, the mode information is 2 when the mode of packing is neither the side-by-side mode nor the top-and-bottom mode.

Here, the modes of packing are the side-by-side mode, the top-and-bottom mode, and the other modes. However, the modes of packing are not limited thereto. For example, as a mode of packing, there may be a mode of packing three or more images. Further, the mode information may be included in another SEI instead of the frame packing SEI, or may be included in another network abstraction layer (NAL) unit, such as VUI.

(Description of Type Information)

FIG. 6 is a diagram describing the type information of FIG. 4.

As illustrated in FIG. 6, the type information (content interpretation type) is 0 when the type information indicates there is no special relationship among images as the characteristics of the images that configure the packed image. Further, the type information is 1 when the type information indicates an image having the picture ID of 0 is the left-eye image and an image having the picture ID of 1 is the right-eye image of 3D images as the characteristics of the images that configure the packed image.

Further, the type information is 1 when the type information indicates an image having the picture ID of 0 is the right-eye image and an image having the picture ID of 1 is the left-eye image of the 3D images as the characteristics of the images that configure the packed image.

(Description. of Position Information)

Figure 7:
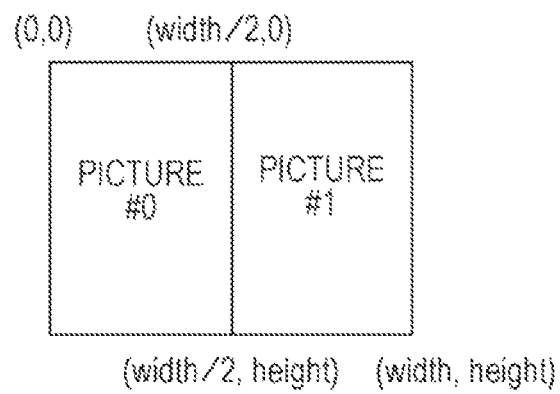
FIG. 7 is a diagram describing position information of FIG. 4.

FIG. 7 is a diagram describing the position information of FIG. 4.

The left-end information (picture_left_offset) is information expressing a left-end position of an image that configures the packed image by the number of pixels from the left end to a left end of the packed image. The right-end information (picture_right_offset), the upper-end information (picture_top_offset), and the lower-end information (picture_bottom_offset) are similar to the left-end information.

As illustrated in FIG. 7, when the picture ID of the left-half image of the packed image packed in the side-by-side system is 0, and the picture ID of the right-half image is 1, and when the upper left position of the packed image in a pixel unit is (0, 0), the upper left position of the image having the picture ID of 0 in the pixel unit is (0, 0). Further, the upper right, the lower left, and the lower right positions of the image having the picture ID of 0 in the pixel unit are (width/2, 0), (0, height), (width/2, height), respectively, where the number of pixels of the packed image in the horizontal direction is width, and the number of pixels of the packed image in the vertical direction is height.

Therefore, the left-end information, the right-end information, the upper-end information, and the lower-end information of the position information including 0 as the picture ID are 0 (=0-0), width/2 (=width−2/width), 0 (=0-0), 0 (=height−height), respectively.

Meanwhile, the upper left, the upper right, the lower left, and the lower right positions of the image having the picture ID of 1 in the pixel unit are (width/2, 0), (width, 0), (width/2, height), and (width, height), respectively. Therefore, the left-end information, the right-end information, the upper-end information, and the lower-end information of the position information including 1 as the picture ID are width/2 (=width/2-0), 0 (=width−width), 0 (=0-0), and 0 (=height−height).

Note that when the numbers of pixels of the luminance component and the color difference component are different, the number of pixels indicated by the left-end information, the right-end information, the upper-end information, and the lower-end information is the number of pixels of the component having a smaller number of pixels. Therefore, for example, when the packed image is YUV420 or YUV422, the number of pixels indicated by the left-end information, the right-end information, the upper-end information, and the lower-end information is the number of pixels of the color difference component. Further, the packed image is YUV444, the number of pixels indicated by the left-end information, the right-end information, the upper-end information, and the lower-end information is the number of pixels that is the same in the color difference component and the luminance component. Further, when the packed image is YUV400, the number of pixels indicated by the left-end information, the right-end information, the upper-end information, and the lower-end information is the number of pixels of the luminance component.

Figures 8, 9:
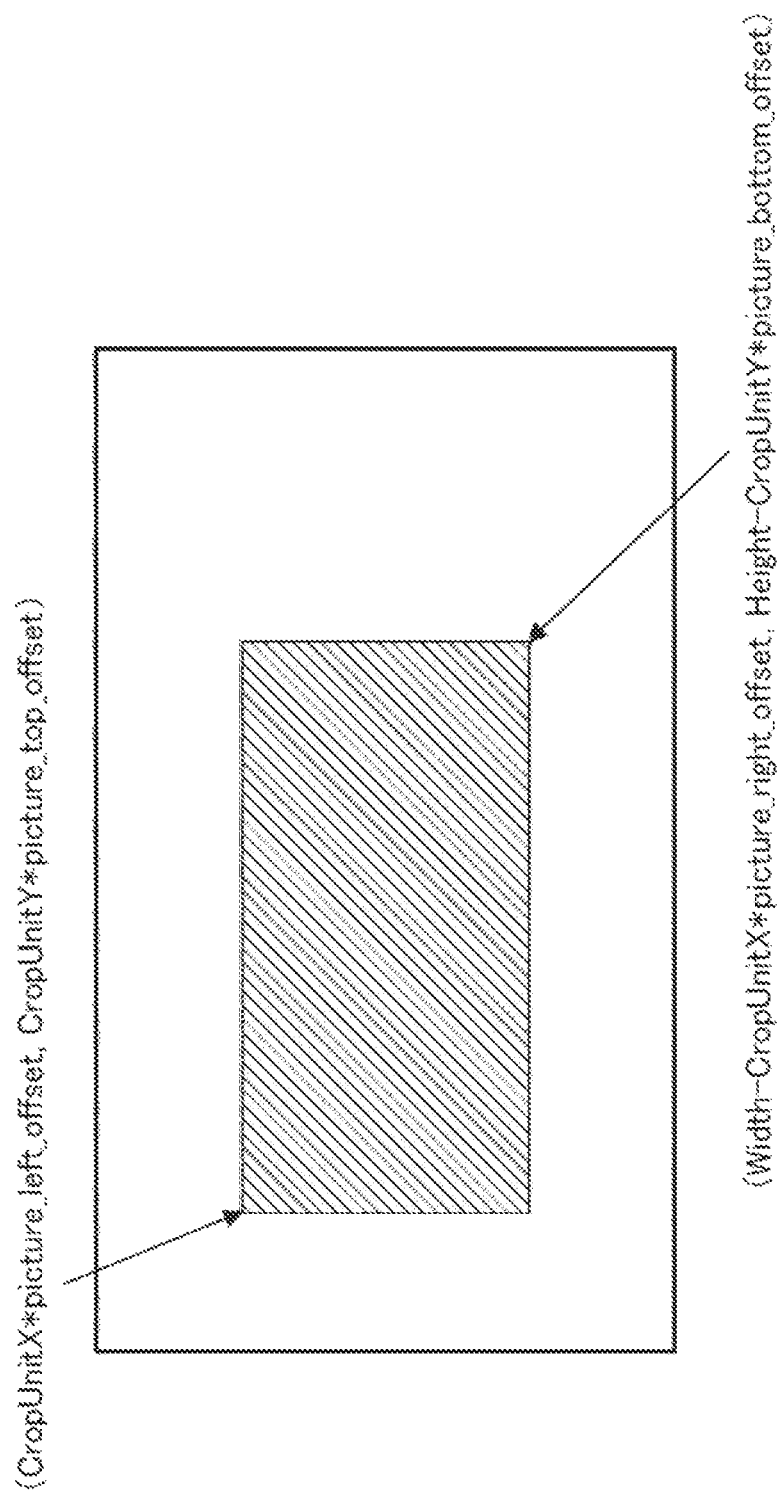
FIG. 8 is a diagram illustrating a position of a cropped area.
FIG. 9 is a diagram illustrating another example of the syntax of the position information.

Therefore, in the decoding device described below, when a desired image that configures the packed image is cropped based on the left-end information, the right-end information, the upper-end information, and the lower-end information, the position of the cropped area is as illustrated in FIG. 8.

That is, when the upper left position of the packed image in the pixel unit is (0, 0), the upper left position of the cropped area on the packed image in the pixel unit is (CropUnitX*picture_left_offset, CropUnitY*picture_top_offset), and the lower right position on the packed image in the pixel unit is (Width-CropUnitX*picture_right_offset+1, CropUnitY*picture_bottom_offset+1), as illustrated in FIG. 8.

Here, CropUnitX and CropUnitY are values determined based on YUV400, YUV420, YUV422, and YUV444, and the like indicated by the format information of the image to be encoded included in the SPS. To be specific, when the format information indicates YUV400 or YUV444, both of CropUnitX and CropUnitY are 1. When the format information indicates YUV420, both of CropUnitX and CropUnitY are 2. Further, when the format information indicates YUV422, CropUnitX is 2 and CropUnitY is 1.

(Another Example of Position Information) FIG. 9 is a diagram illustrating another example of the syntax of the position information included in the frame packing SEI of FIG. 4.

In the example of FIG. 9, the position information is information indicating the positions of the images that configure the packed image on the packed image in a tile unit that is a parallel encoding processing unit in the HEVC standard. To be specific, the position information of FIG. 9 is information indicating the picture ID of an image corresponding to tiles in the row direction (horizontal direction) for each row.

For example, as illustrated in FIG. 10, when the packed image is divided into four tiles such that two tiles each are arranged in the horizontal direction and in the vertical direction, and the packed image is a packed image in the side-by-side system, the position information is as follows.

That is, a tile ID that is a unique ID to a tile set to the SPS or the PPS is given to each tile in a raster scan order. Therefore, a tile to which 0 is given as the tile ID is an upper left tile. Therefore, the picture ID of the image corresponding to the tile having the tile ID of 0 is the picture ID of the left-half image of the packed image (0 in the example of FIG. 10). Further, a tile to which 1 is given as the tile ID is an upper right tile. Therefore, the picture ID corresponding to the tile having the tile ID of 1 is the picture ID of the right-half image of the packed image (1 in the example of FIG. 10).

Further, a tile to which 2 is given as the tile ID is a lower-left tile. Therefore, the picture ID of the image corresponding to the tile having the tile ID of 2 is the picture ID of the left-half image of the packed image (0 in the example of FIG. 10). Further, a tile to which 3 is given as the tile ID is a lower right tile. Therefore, the picture ID corresponding to the tile having the tile ID of 3 is the picture ID of the right-half image of the packed image (1 in the example of FIG. 10).

Therefore, the position information is information indicating the picture ID of the left-half image of the packed image as the picture ID of the image corresponding to the tiles having the tile IDs of 0 and 2, and the picture ID of the right-half image of the packed image as the picture ID of the image corresponding to the tiles of the tile IDs of 1 and 3.

(Still Another Example of Position Information)

FIG. 11 is a diagram illustrating still another example of the syntax of the position information included in the frame packing SEI of FIG. 4.

In the example of FIG. 11, the position information is information indicating the positions of the images that configure the packed image on the packed image in a slice unit. To be specific, the position information of FIG. 11 is information indicating the picture ID of an image of a slice for each slice.

For example, as illustrated in FIG. 12, when the packed image is divided into four slices, and the packed image is an image packed in the top-and-bottom system, the position information is as follows.

That is, the picture ID of an image of the first and second slices from the top is the picture ID of the upper-half image of the packed image (0 in the example of FIG. 12). Further, the picture ID of an image of the third and fourth slices from the top is the picture ID of the lower-half image of the packed image (1 in the example of FIG. 12).

Therefore, the position information is information indicating the picture ID of the upper-half image of the packed image as the picture ID of the image of the first and second slices from the top, and the picture ID of the lower-half image of the packed image as the picture ID of the image of the third and fourth slices from the top.

(Another Example of Syntax of Frame Packing SEI)

FIG. 13 is a diagram illustrating another example of the syntax of the frame packing SEI set by the setting unit 3 of FIG. 1.

In the example of FIG. 13, the frame packing SEI is one obtained such that the cropping ignorance flag (frame_cropping_override_flag) in the 2nd row is added to the frame packing SEI(frame_packing arrangement) in the AVC standard.

(Example of Syntax of SPS)

FIG. 14 is a diagram illustrating an example of a part of the syntax of the SPS set by the setting unit 3 of FIG. 1.

As illustrated in the 13th to 18th rows of FIG. 14, the cropping information that indicates a cropped area cropped at the time of displaying a corresponding image can be included in the SPS. The cropping information is cropping left-end information (pic_crop_left_offset) indicating the left-end position of the cropped area, cropping right-end information (pic_crop_right_offset) indicating the right-end position, cropping upper-end information (pic_crop_top_offset) indicating; the upper-end position, and cropping lower-end information (pic_crop_bottom_offset) indicating the lower-end position.

(Description of Processing of Encoding Device)

Figure 15:
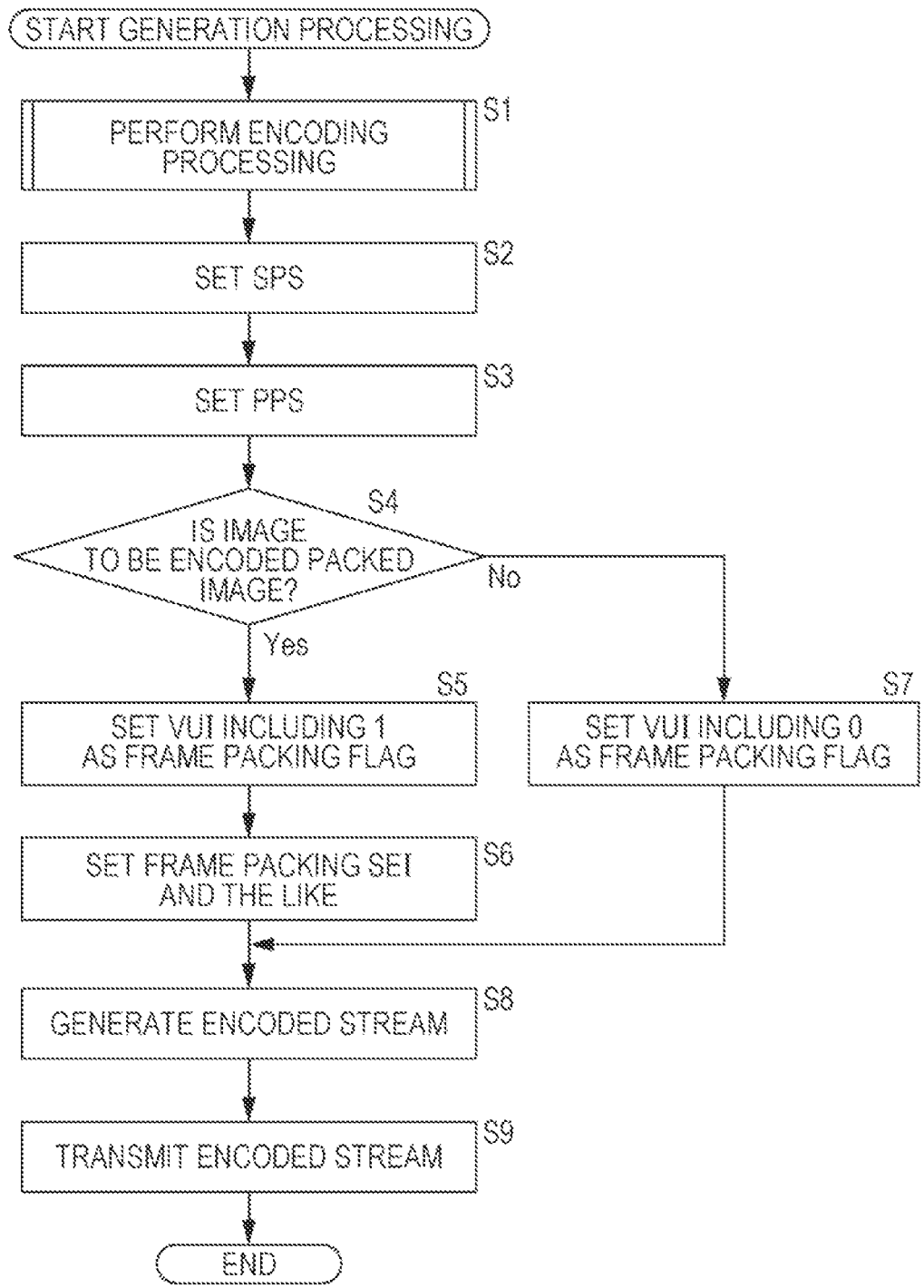
FIG. 15 is a flowchart describing generating processing by the encoding device of FIG. 1.

FIG. 15 is a flowchart describing generation processing of the encoding device 1 of FIG. 1.

In step S1 of FIG. 15, the encoding unit 2 of the encoding device 1 performs encoding processing of encoding an image, such as the packed image in a frame unit input as an input signal from an outside, in the HEVC system. Details of the encoding processing will be described with reference to FIGS. 16 and 17, below.

In step S2, the setting unit 3 sets the SPS including the cropping information. In step S3, the setting unit 3 sets the PPS. In step S4, the setting unit 3 determines whether an image to be encoded is a packed image based on an operation of an input unit (not illustrated), and the like by the user.

When the image to be encoded is determined to be a packed image in step S4, in step S5, the setting unit 3 sets VUI including 1 as a frame packing flag. In step S6, the setting unit 3 sets SEI, such as frame packing SEI, and advances the processing to step S8.

Meanwhile, when the image to be encoded is determined not to be a packed image in step S4, in step S7, the setting unit 3 sets VUI including 0 as a frame packing flag. Further, the setting unit 3 sets SEI other than the frame packing SEI, as necessary, and advances the processing to step S8.

In step S8, the setting unit 3 generates an encoded stream from the set SPS, PPS, VIII, and SEI, and the encoded data supplied from the encoding unit 2. The setting unit 3 supplies the encoded stream to the transmission unit 4.

In step S9, the transmission unit 4 transmits the encoded stream supplied from the setting unit 3 to the decoding device described below, and terminates the processing.

Figure 16:
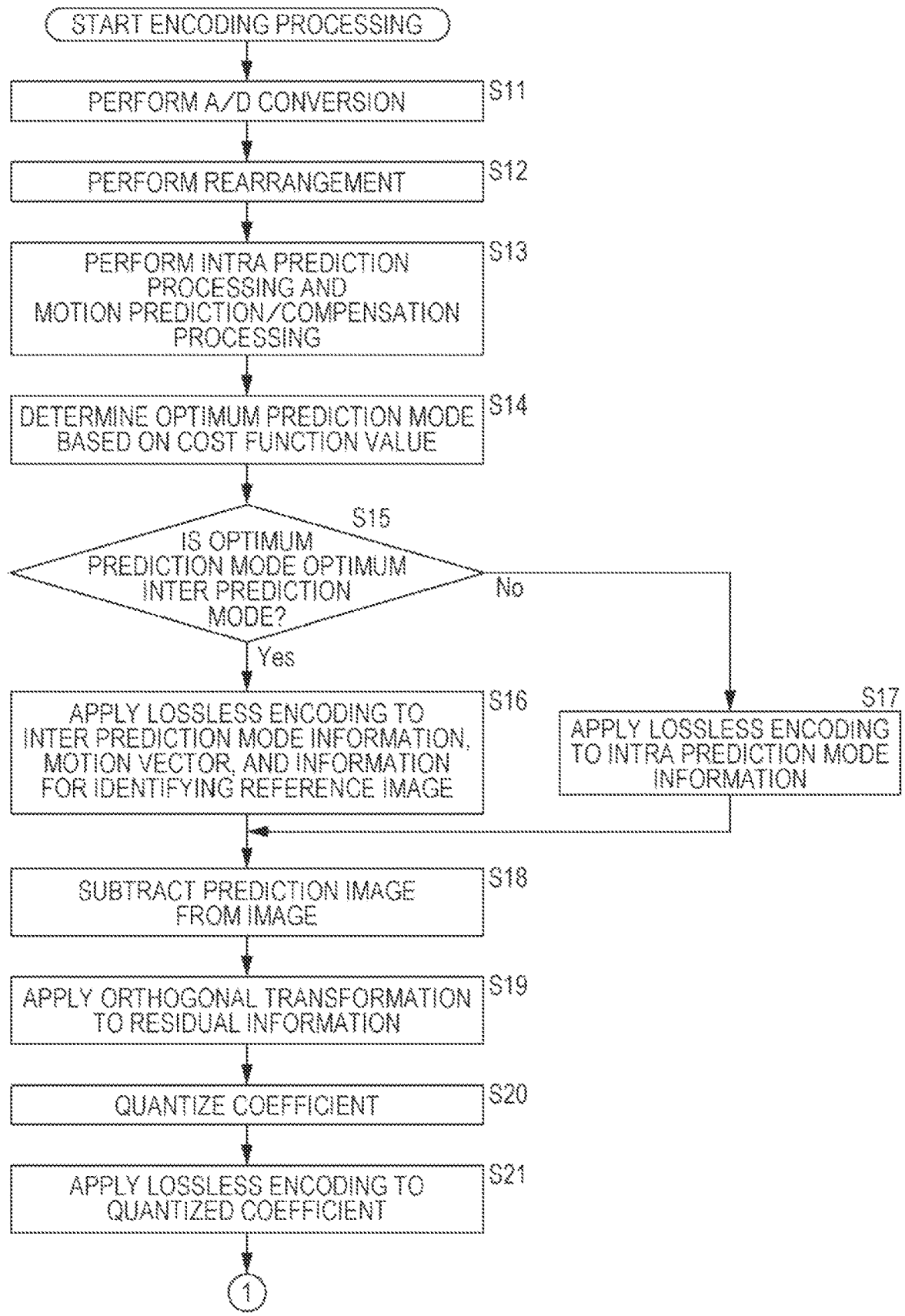
FIG. 16 is a flowchart describing details of the encoding processing of step S1 of FIG. 15.
Figure 17:
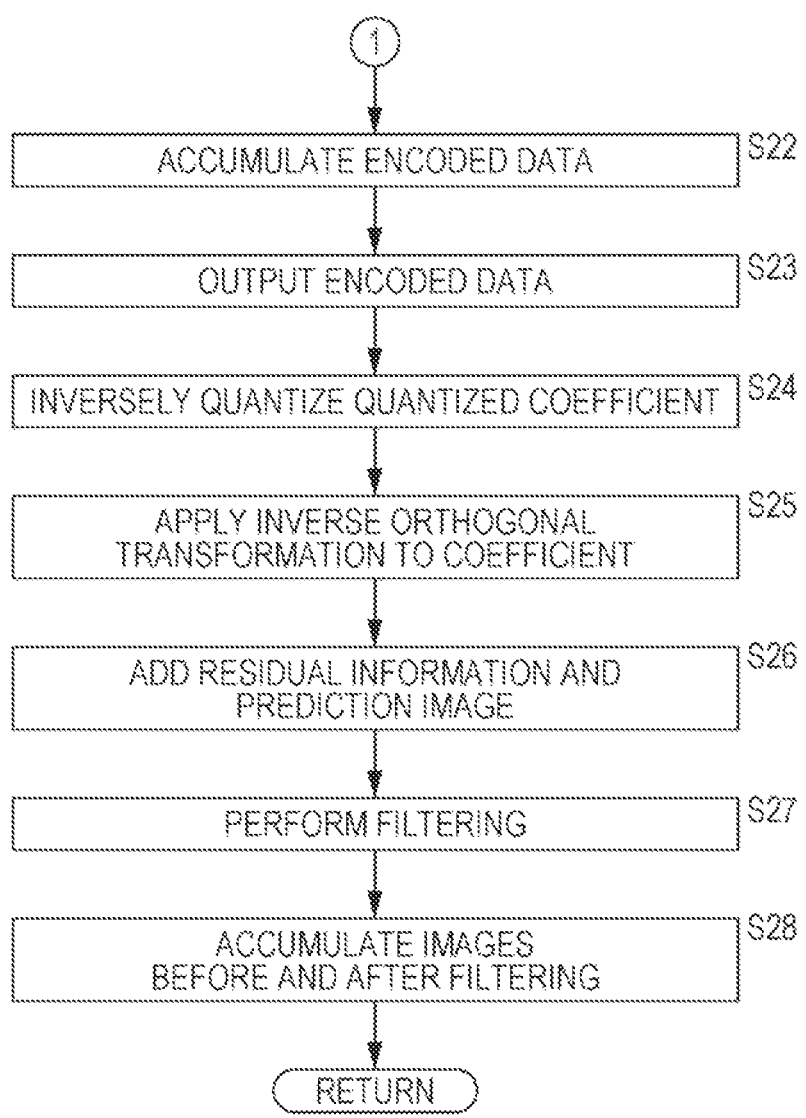
FIG. 17 is a flowchart describing details of the encoding processing of FIG. 15.

FIGS. 16 and 17 are flowcharts describing details of the encoding processing of step S1 of FIG. 15.

In step S11 of FIG. 16, the A/D conversion unit 11 of the encoding unit 2 applies A/D conversion to an image in a frame unit input as an input signal, and outputs and stores the converted image in the screen rearrangement buffer 12.

In step S12, the screen rearrangement buffer 12 rearranges stored images of frames in a display order to an order for encoding according to the GOP structure. The screen rearrangement buffer 12 supplies the rearranged images in the frame unit to the calculation unit 13, the intra prediction unit 24, and the motion prediction/compensation unit 25. Note that processing of steps S13 to S28 below is performed in a coding unit (CU).

In step S13, the intra prediction unit 24 performs intra prediction processing of all of candidate intra prediction modes. Further, the intra prediction unit 24 calculates a cost function value to all of the candidate intra prediction modes based on the image read from the screen rearrangement buffer 12, and a prediction image generated as a result of the intra prediction processing. The intra prediction unit 24 then determines an intra prediction mode having a minimum cost function value as an optimum intra prediction mode. The intra prediction unit 24 supplies a prediction image generated in the optimum intra prediction mode, and the corresponding cost function value to the prediction image selection unit 26.

Further, the motion prediction/compensation unit 25 performs the motion prediction/compensation processing of all of the candidate inter prediction modes. Further, the motion prediction/compensation unit 25 calculates a cost function value to all of the candidate inter prediction modes based on the image supplied from the screen rearrangement buffer 12 and the prediction image, and determines an inter prediction mode having a minimum cost function value as an optimum inter measuring mode. The motion prediction/compensation unit 25 then supplies the cost function value of the optimum inter prediction mode, and the corresponding prediction image to the prediction image selection unit 26.

In step S14, the prediction image selection unit 26 determines either the optimum intra prediction mode or the optimum inter prediction mode, which has the minimum cost function value as an optimum prediction mode based on the cost function values supplied from the intra prediction unit 24 and the motion prediction/compensation unit 25 by the processing of step S13. The prediction image selection unit 26 then supplies a prediction image of the optimum prediction mode to the calculation unit 13 and the adding unit 20.

In step S15, the prediction image selection unit 26 determines whether the optimum prediction mode is the optimum inter prediction mode. When the optimum prediction mode is determined to be the optimum inter prediction mode in step S15, the prediction image selection unit 26 notifies selection of the prediction image generated in the optimum inter prediction mode to the motion prediction/compensation unit 25. Accordingly, the motion prediction/compensation unit 25 outputs the inter prediction mode information, the corresponding motion vector, and the information for identifying a reference image to the lossless encoding unit 16.

Then, in step S16, the lossless encoding unit 16 applies lossless encoding to the inter prediction mode information, the motion vector, and the information for identifying a reference image supplied from the motion prediction/compensation unit 25 as encoding information. The processing then proceeds to step S18.

Meanwhile, when the optimum prediction mode is determined not to be the optimum inter prediction mode in step S15, that is, the optimum prediction mode is the optimum intra prediction mode, the prediction image selection unit 26 notifies selection of the prediction image generated in the optimum intra prediction mode to the intra prediction unit 24. Accordingly, the intra prediction unit 24 supplies the intra prediction mode information to the lossless encoding unit 16.

Then, in step S17, the lossless encoding unit 16 applies lossless encoding to the intra prediction mode information supplied from the intra prediction unit 24 as encoding information. The processing then proceeds to step S18.

In step S18, the calculation unit 13 performs encoding by subtracting the prediction image supplied from the prediction image selection unit 26 from the image supplied from the screen rearrangement buffer 12. The calculation unit. 13 outputs an image obtained as a result of the encoding to the orthogonal transformation unit 14 as residual information.

In step S19, the orthogonal transformation unit 14 applies orthogonal transformation to the residual information from the calculation unit 13, and supplies a coefficient obtained as a result of the orthogonal transformation to the quantization unit 15.

In step S20, the quantization unit 15 quantizes the coefficient supplied from the orthogonal transformation unit 14. The quantized coefficient is input to the lossless encoding unit 16 and the inverse quantization unit 18.

In step S21, the lossless encoding unit 16 applies lossless encoding to the quantized coefficient supplied from the quantization unit 15. The lossless encoding unit 16 then generates encoded data from the lossless encoded encoding information and the lossless encoded coefficient in the processing of steps S16 and S17.

In step S22 of FIG. 17, the lossless encoding unit 16 supplies the encoded data to the accumulation buffer 17 and accumulated the encoded data therein.

In step S23, the accumulation buffer 17 outputs the accumulated encoded data to the setting unit 3 of FIG. 1.

In step S24, the inverse quantization unit 18 inversely quantizes the quantized coefficient supplied from the quantization unit 15.

In step S25, the inverse orthogonal transformation unit 19 applies inverse orthogonal transformation to the coefficient supplied from the inverse quantization unit 18, and supplies residual information obtained as a result of the inverse orthogonal transformation to the adding unit 20.

In step S26, the adding unit 20 adds the residual information supplied from the inverse orthogonal transformation unit 19 and the prediction image supplied from the prediction image selection unit 26, and obtains a locally decoded image. The adding unit 20 supplies the obtained image to the deblocking filter 21 and to the frame memory 22.

In step S27, the deblocking filter 21 removes block distortion by filtering the locally decoded image supplied from the adding unit 20, and the image to the frame memory 22.

In step S28, the frame memory 22 accumulates the images before and after filtering. To be specific, the frame memory 22 accumulates the image supplied from the adding unit 20 and the image supplied from the deblocking filter 21. The image accumulated in the frame memory 22 is output to the intra prediction unit 24 or the motion prediction/compensation unit 25 through the switch 23 as a reference image. The processing is then returned to step S1 of FIG. 15, and proceeds to step S2.

Note that, for simplifying the description, in the encoding processing of FIGS. 16 and 17, the intra prediction processing and the motion prediction/compensation processing are always performed. However, in reality, only one of them may be performed depending on a picture type, or the like.

As described above, the encoding device 1 sets the frame packing SEI and the frame packing flag, and transmits the packed image together with the encoded data. Therefore, the decoding device that decodes and displays the encoded stream of the packed image can preferentially use the frame packing SEI and display a desired image that configures the packed image when the frame packing flag is 1, that is, the cropping ignorance flag is 1. Therefore, it can be said that the encoding device 1 can generate the encoded stream of the packed image so as to reliably display the desired image that configures the packed image when decoding and displaying the encoded stream of the packed image.

(Configuration Example of First Embodiment of Decoding Device)

Figure 18:
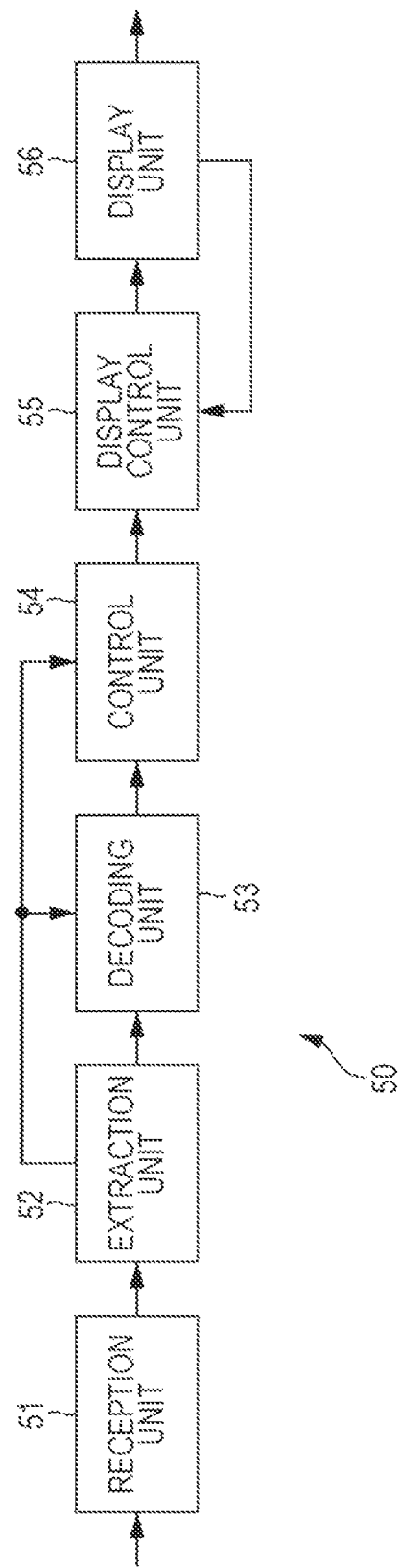
FIG. 18 is a block diagram illustrating a configuration example of the first embodiment of a decoding device to which the present technology is applied.

FIG. 18 is a block diagram illustrating a configuration example of the first embodiment of the decoding device to which the present technology is applied, the decoding device decoding the encoded stream transmitted from the encoding device 1 of FIG. 1.

A decoding device 50 of FIG. 18 is configured from a reception unit 51, an extraction unit 52, a decoding unit 53, a control unit 54, a display control unit 55, and a display unit 56.

The reception unit 51 of the decoding device 50 receives the encoded stream transmitted from the encoding device 1 of FIG. 1, and supplies the encoded stream to the extraction unit 52. The extraction unit 52 extracts the SPS, PPS, VUI, SEI, encoded data, and the like from the encoded stream supplied from the reception unit 51. The extraction unit 52 supplies the encoded data to the decoding unit 53. Further, the extraction unit 52 also supplies the SPS, PPS, VUI, SEI, and the like to the decoding unit 53 and the control unit 54 as needed.

The decoding unit 53 refers to the SPS, PPS, VUI, SEI, and the like supplied from the extraction unit 52 as needed, and decoded the encoded data supplied from the extraction unit 52 in the HEVC system. The decoding unit 5:3 supplies the image, such as the packed image, obtained as a result of the decoding to the control unit 54 as an output signal.

The control unit 54 identifies the images that configure the packed image supplied from the decoding unit 53 as an output signal based on the SPS, PPS, VUI, SEI, and the like supplied from the extraction unit 52 as needed. The control unit 54 then supplies the packed image as an output signal and information identifying the images that configure the packed image to the display control unit 55. The control unit 54 then supplies an image as an output signal, which is not the packed image and the cropping information included in the SPS to the display control unit 55.

The display control unit 55 performs cropping, enlargement, reduction, and the like of the packed image supplied from the control unit 54 as an output signal, and generates a display image, based on the information identifying the images that configure the packed image supplied from the control unit 54 and a display method notified from the display unit 56. Further, the display control unit 55 performs cropping, enlargement, reduction, and the like of the non-packed image supplied from the control unit 54 as an output signal, and generate a display image, based on the cropping information supplied from the control unit 54. The display control unit 55 supplies the generated display images to the display unit 56, and displays the images therein.

The display unit 56 displays the display images supplied from the display control unit 55. Further, the display unit 56 notifies a display method set in advance or a display method designated by the user of display methods set in advance to the display control unit 55.

(Configuration Example of Decoding Unit)

Figure 19:
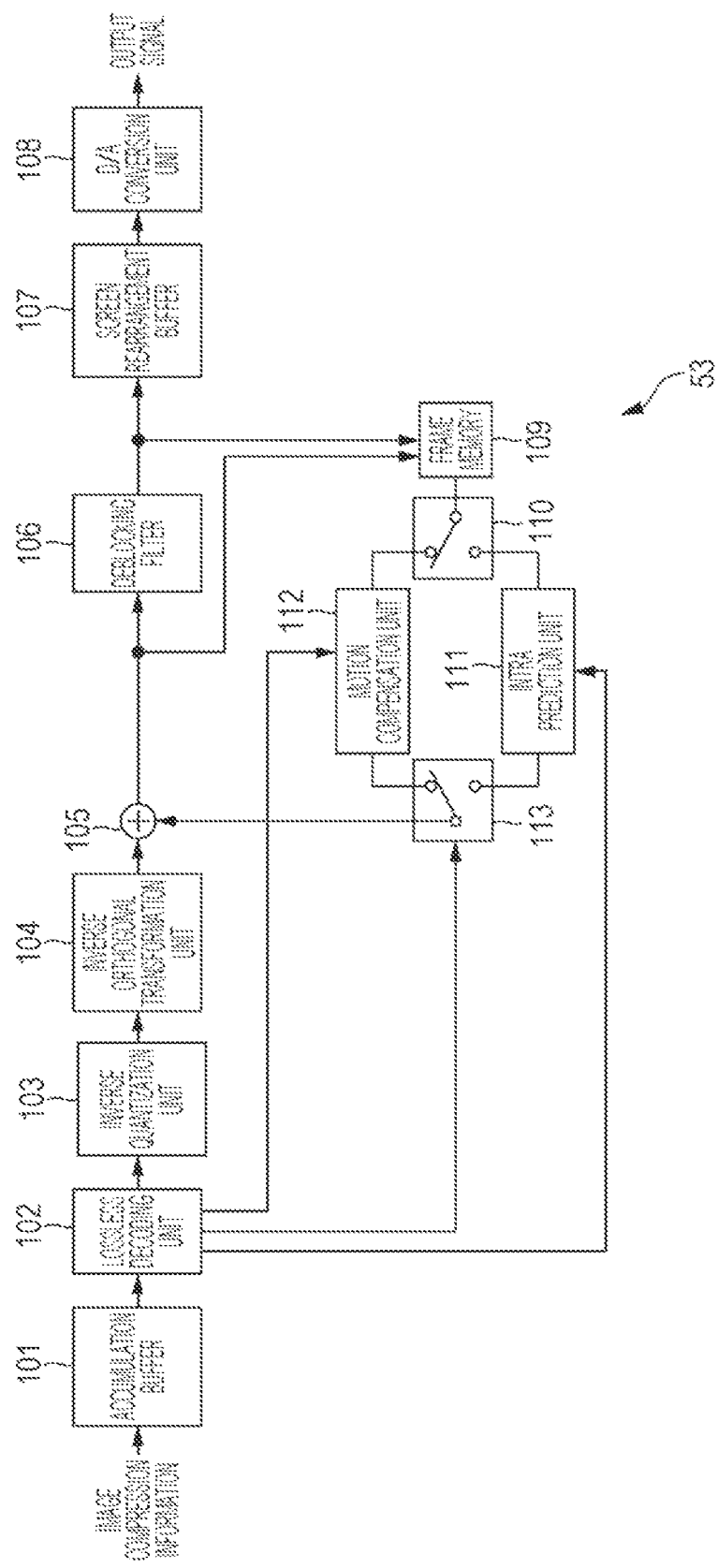
FIG. 19 is a block diagram illustrating a configuration example of a decoding unit of FIG. 18.

FIG. 19 is a block diagram illustrating a configuration example of the decoding unit 53 of FIG. 18.

The decoding unit 53 of FIG. 19 is configured from an accumulation buffer 101, a lossless decoding unit 102, an inverse quantization unit 103, an inverse orthogonal transformation unit 104, an adding unit 105, a deblocking filter 106, a screen rearrangement buffer 107, a D/A conversion unit 108, a frame memory 109, a switch 110, an intra prediction unit 111, a motion compensation unit 112, and a switch 113.

The accumulation buffer 101 of the decoding unit 53 receives the encoded data from the extraction unit 52 of FIG. 18 and accumulates the encoded data. The accumulation buffer 101 supplies the accumulated encoded data to the lossless decoding unit 102.

The lossless decoding unit 102 applies lossless decoding, such as variable length decoding and the arithmetic decoding, to the encoded data from the accumulation buffer 101 to obtain a quantized coefficient and encoding information. The lossless decoding unit 102 supplies the quantized coefficient to the inverse quantization unit 103. Further, the lossless decoding unit 102 supplies the intra prediction mode information, and the like as the encoding information to the intra prediction unit 111, and supplies the motion vector, the information for identifying a reference image, the inter prediction mode information, and the like to the motion compensation unit 112. Further, the lossless decoding unit 102 supplies the intra prediction mode information or the inter prediction mode information as the encoding information to the switch 113.

The inverse quantization unit 103, the inverse orthogonal transformation unit 104, the adding unit 105, the deblocking filter 106, the frame memory 109, the switch 110, the intra prediction unit 111, and the motion compensation unit 112 respectively perform similar processing to the inverse quantization unit 18, the inverse orthogonal transformation unit 19, the adding unit 20, the deblocking filter 21, the frame memory 22, the switch 23, the intra prediction unit 24, and the motion prediction/compensation unit 25 of FIG. 2, whereby the images are decoded.

To be specific, the inverse quantization unit 103 inversely quantizes the quantized coefficient from the loss less decoding unit 102, and supplies a coefficient obtained as a result of the inverse quantization to the inverse orthogonal transformation unit 104.

The inverse orthogonal transformation unit 104 applies inverse orthogonal transformation to the coefficient from the inverse quantization unit 103, and supplies residual information obtained as a result of the inverse orthogonal transformation to the adding unit 105.

The adding unit 105 performs decoding by adding the residual information as an image to be decoded supplied from the inverse orthogonal transformation unit 104 and the prediction image supplied from the switch 113. The adding unit 105 supplies an image obtained as a result of the decoding to the deblocking filter 106, and to the frame memory 109. Note that, when the prediction image is not supplied from the switch 113, the adding unit 105 supplies the image that is the residual information supplied from the inverse orthogonal transformation unit 104 to the deblocking filter 106 as the image obtained as a result of the decoding, and to the frame memory 109 and accumulated the image therein.

The deblocking filter 106 removes block distortion by filtering the image supplied from the adding unit 105. The deblocking filter 106 supplies an image obtained as a result of the filtering to the frame memory 109 and accumulates the image therein, and supplies the image to the screen rearrangement buffer 107. The image accumulated in the frame memory 109 is read through the switch 110 as a reference image, and is supplied to the motion compensation unit 112 or the intra prediction unit 111.

The screen rearrangement buffer 107 stores the image supplied from the deblocking filter 106 in a frame unit. The screen rearrangement buffer 107 rearranges the stored images in the order for encoding in a frame unit to the original display order, and supplies the images to the D/A conversion unit 108.

The D/A conversion unit 108 applies D/A conversion to the image in a frame unit supplied from the screen rearrangement buffer 107, and outputs the image to the control unit 54 of FIG. 18 as an output signal.

The intra prediction unit 111 performs intra prediction processing in the intra prediction mode indicated by the intra prediction mode information supplied from the lossless decoding unit 102 in tile and slice units using the reference image not filtered in the deblocking filter 106 and read from the frame memory 109 through the switch 110. The intra prediction unit 111 supplies a prediction image generated as a result of the intra prediction processing to the switch 113.

The motion compensation unit 112 reads the reference image filtered in the deblocking filter 106 from the frame memory 109 through the switch 110 based on the information for identifying the reference image supplied from the lossless decoding unit 102, in tile and slice units. The motion compensation unit 112 performs motion compensation processing in the optimum inter prediction mode indicated by the inter prediction mode information using the motion vector and the reference image. The motion compensation unit 112 supplies a prediction image generated as a result of the motion compensation processing to the switch 113.

When having been supplied the intra prediction mode information from the lossless decoding unit 102, the switch 113 supplies the prediction mode supplied from the intra prediction unit 111 to the adding unit 105. Meanwhile, when having been supplied the inter prediction mode information from the lossless decoding unit 102, the switch 113 supplies the prediction image supplied from the motion compensation unit 112 to the adding unit 105.

(Description. of Processing of Decoding Device)

Figure 20:
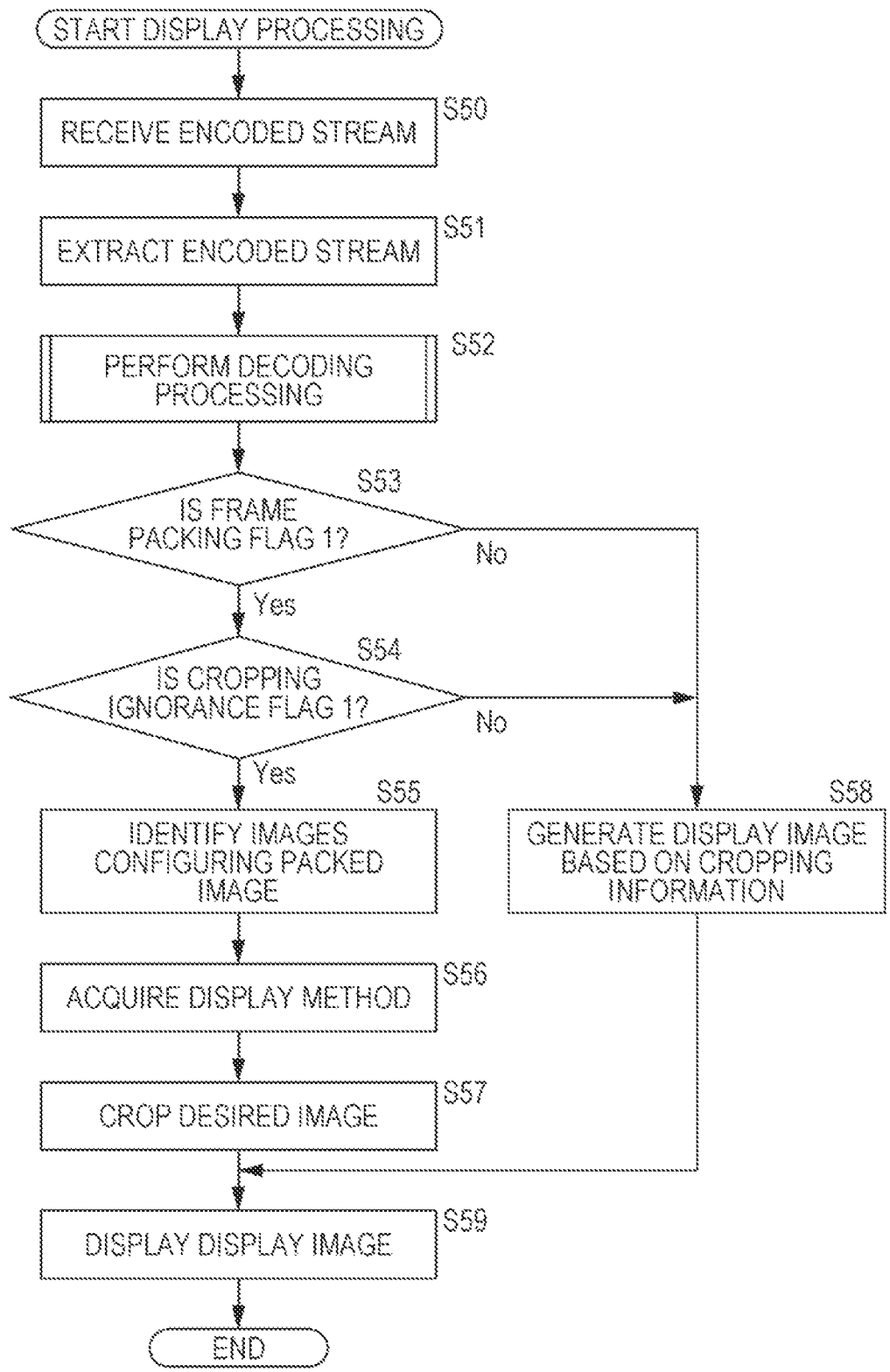
FIG. 20 is a flowchart describing display processing by the decoding device of FIG. 18.

FIG. 20 is a flowchart describing display processing by the decoding device 50 of FIG. 18.

In step S50 of FIG. 20, the reception unit 51 of the decoding device 50 receives the encoded stream transmitted from the encoding device 1 of FIG. 1, and supplies the encoded stream to the extraction unit 52.

In step S51, the extraction unit 52 extracts the SPS, PPS, VUI, SEI, encoded data, and the like from the encoded stream supplied from the reception unit 51. The extraction unit 52 supplies the encoded data to the decoding unit 53. Further, the extraction unit 52 also supplies the SPS, PPS, VUI, SEI, and the like to the decoding unit 53 and the control unit 54, as needed.

In step S52, the decoding unit 53 refers to the SPS, PPS, VUI, SEI, encoded data, and the like supplied from the extraction unit 52, as needed, and applies decoding processing that performs decoding in the HEVC system to the encoded data supplied from the extraction unit 52. Details of the decoding processing will be described with reference to FIG. 21 described below.

In step S53, the control unit 54 determines whether the frame packing flag included in the VUI supplied from the extraction unit 52 is 1. When the frame packing flag is determined to be 1 in step S53, the control unit 54 determines the output signal supplied from the decoding unit 53 is the packed image.

Then, in step S54, the control unit 54 determines whether the cropping ignorance flag included in the frame packing SEI supplied from the extraction unit 52 is 1. When the cropping ignorance flag is determined to be 1 in step S54, in step S55, the control unit 54 identifies images that configure the packed image based on the type information and the position information included in the frame packing SEI. The control unit 54 then supplies information identifying the images that configure the packed image and an output signal to the display control unit 55.

In step S56, the display control unit 55 acquires a display method notified from the display unit 56. In step S57, the display control unit 55 crops a desired image of the images that configure the packed image and performs enlargement, reduction, and the like, as needed, based on the display method and the information identifying the images that configure the packed image, and obtains a display image.

For example, when the output signal is a 3D display packed image, the control unit 54 identifies a left-eye image and a right-eye image that configure the packed image based on the type information, the position information, and the like included in the frame packing SEI. When the display method is 2D display, the display control unit 55 crops the left-eye image from the packed image, for example, and employs the image as the display image. Meanwhile, when the display method is 3D display, the display control unit 55 crops the left-eye image and the right-eye image from the packed image, and employs the images as the display images. The processing then proceeds to step S59.

Meanwhile, when the frame packing flag is determined not to be 1 in step S53, or when the cropping ignorance flag is determined not to be 1 in step S54, the control unit 54 determines that the output signal is not the packed image. The control unit 54 then supplies the output signal and the cropping information included in the SPS to the display control unit 55. In step S58, the display control unit 55 crops the image as the output signal based on the cropping information, performs enlargement, reduction, and the like, as needed, and employs the image as the display image. The processing then proceeds to step S59.

In step S59, the display control unit 55 displays the display image in the display unit 56 by supplying the generated display image to the display unit 56.

Figure 21:
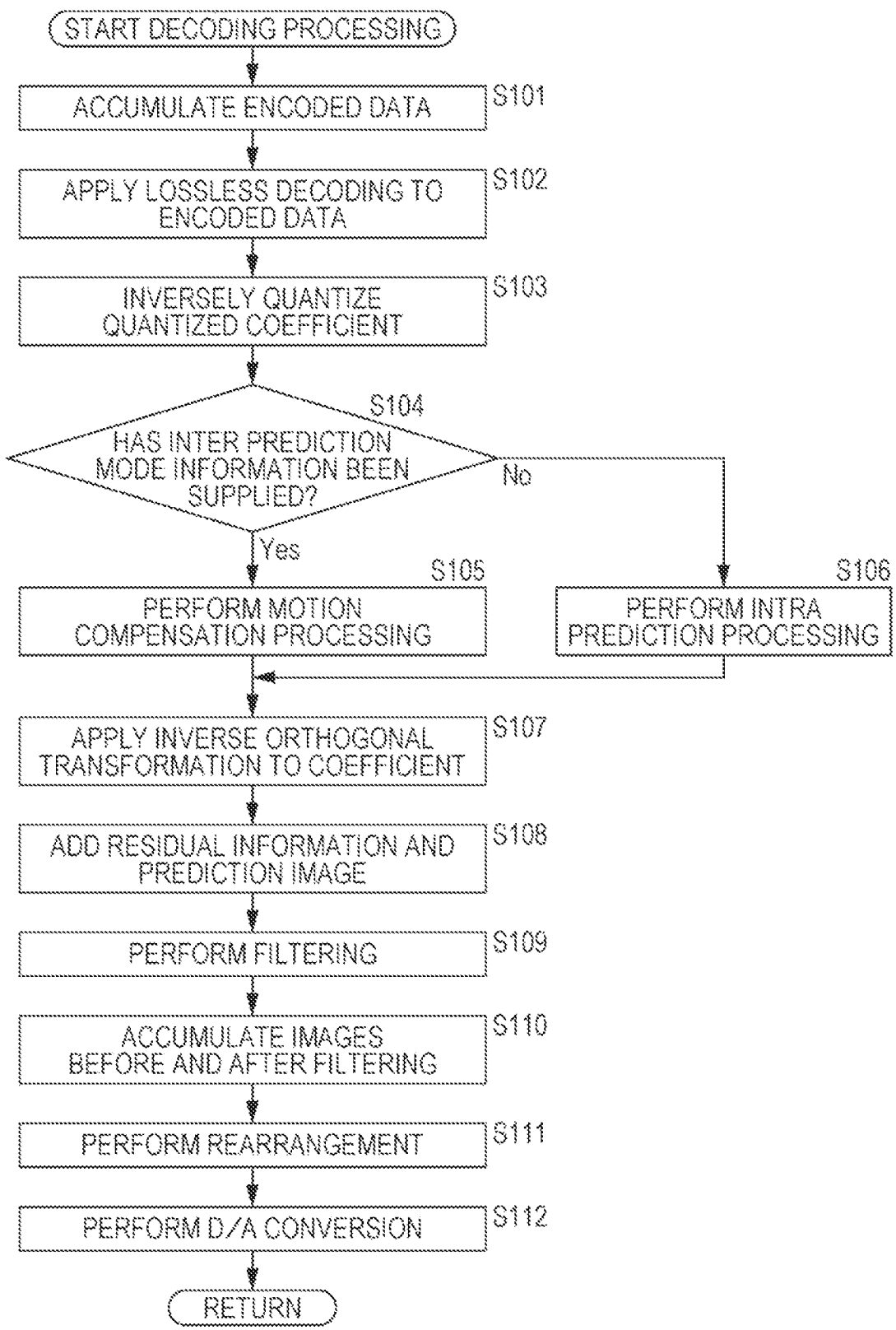
FIG. 21 is a flowchart describing details of the decoding processing of FIG. 20.

FIG. 21 is a flowchart describing details of the decoding processing of step S52 of FIG. 20.

In step S101 of FIG. 21, the accumulation buffer 101 of the decoding unit 53 receives the encoded data in a frame unit from the extraction unit 52 of FIG. 18, and accumulates the encoded data. The accumulation buffer 101 supplies the accumulated encoded data to the lossless decoding unit 102. Note that processing from steps S102 to S110 is performed in a CU unit.

In step S102, the lossless decoding unit 102 applies lossless decoding to the encoded data from the accumulation buffer 101, and obtains the quantized coefficient and the encoding information. The lossless decoding unit 102 supplies the quantized coefficient to the inverse quantization unit 103. Further, the lossless decoding unit 102 supplies the intra prediction mode information, and the like, as the encoding information to the intra prediction unit 111, and supplies the motion vector, the inter prediction mode information, the information for identifying a reference image, and the like to the motion compensation unit 112. Further, the lossless decoding unit 102 supplies the intra prediction mode information or the inter prediction mode information as the encoding information to the switch 113.

In step S103, the inverse quantization unit 103 inversely quantizes the quantized coefficient from the lossless decoding unit 102, and supplies a coefficient obtained as a result of the inverse quantization to the inverse orthogonal transformation unit 104.

In step S104, the motion compensation unit 112 determines whether the inter prediction mode information has been supplied from the lossless decoding unit 102. When it is determined that the inter prediction mode information has been supplied in step S104, the processing proceeds to step S105.

In step S105, the motion compensation unit 112 reads the reference image filtered in the debiocking filter 106, and performs motion compensation processing, based on the motion vector, the inter prediction mode information, and the information for identifying a reference image supplied from the lossless decoding unit 102. The motion compensation unit 112 supplies the prediction image generated as a result of the motion compensation processing to the adding unit 105 through the switch 113, and advances the processing to step S107.

Meanwhile, when it is determined that the inter prediction mode information has not been supplied in step S104, that is, when the intra prediction mode information has been supplied to the intra prediction unit 111, the processing proceeds to step S106.

In step S106, the intra prediction unit 111 performs intra prediction processing in the intra prediction mode indicated by the intra prediction mode information using the reference image not filtered in the deblocking filter 106 and read from the frame memory 109 through the switch 110. The intra prediction unit 111 supplies the prediction image generated as a result of the intra prediction processing to the adding unit 105 through the switch 113, and advances the processing to step S107.

In step S107, the inverse orthogonal transformation unit 104 applies inverse orthogonal transformation to the coefficient from the inverse quantization unit 103, and supplies residual information obtained as a result of the inverse orthogonal transformation to the adding unit 105.

In step S108, the adding unit 105 adds the residual information supplied from the inverse orthogonal transformation unit 104 and the prediction image supplied from the switch 113. The adding unit 105 supplies an image obtained as a result of the adding to the deblocking filter 106, and to the frame memory 109.

In step S109, the deblocking filter 106 filters the image supplied from the adding unit 105 to remove block distortion. The deblocking filter 106 supplies the filtered image to the frame memory 109.

In step S110, the frame memory 109 accumulates the image before filtering supplied from the adding unit 105, and the image after filtering supplied from the deblocking filter 106. The images accumulated in the frame memory 109 are supplied to the motion compensation unit 112 or the intra prediction unit 111 through the switch. 110 as reference images.

In step S111, the screen rearrangement buffer 107 stores the images supplied from the deblocking filter 106 in a frame unit, rearranges the stored images in an order for encoding to the original display order, and supplies the images to the D/A conversion unit 108.

In step S112, the D/A conversion unit 108 applies D/A conversion to the image in a frame unit supplied from the screen rearrangement buffer 107, and supplies the image to the control unit 54 of FIG. 18 as an output signal. The processing is then returned to step S52 of FIG. 20, and proceeds to step S53.

As described above, the decoding device 50 decodes the encoded data to generate the packed image, and identifies the images that configure the packed image based on the frame packing SEI when the frame packing flag is 1, that is, when the cropping ignorance flag is 1. Therefore, when decoding and displaying the encoded stream of the packed image, the decoding device 50 can reliably display a desired image that configures the packed image.

Further, the decoding device 50 can identify the images that configure the packed image. Therefore, the decoding device 50 side can determine the desired image to be displayed according to the display method, and the like.

Note that the cropping ignorance flag may not be included in the frame packing SEI. In this case, when the frame packing flag is 1, the decoding device ignores the cropping information, and identifies the images that configure the packed image based on the frame packing SEI.

Further, the decoding device that does not use SEI performs cropping based on cropping information even when the frame packing flag is 1. Note that the decoding device that does not use SEI may refer to frame packing SEI when the frame packing flag is 1. In this case, it is not necessary to include the cropping information in the SPS.

The frame packing flag may be included in another NAL unit, such as SPS, instead of VUI. Further, the number of images that configure the packed image may be 3 or more. For example, the packed image may be packed images of images of participants of a conference in a television conference system.

Further, when position information included in frame packing SEI is the position information illustrated in FIGS. 9 and 11, the number of images information may not be set.

Second Embodiment (Configuration Example of Second Embodiment of Encoding Device)

Figure 22:
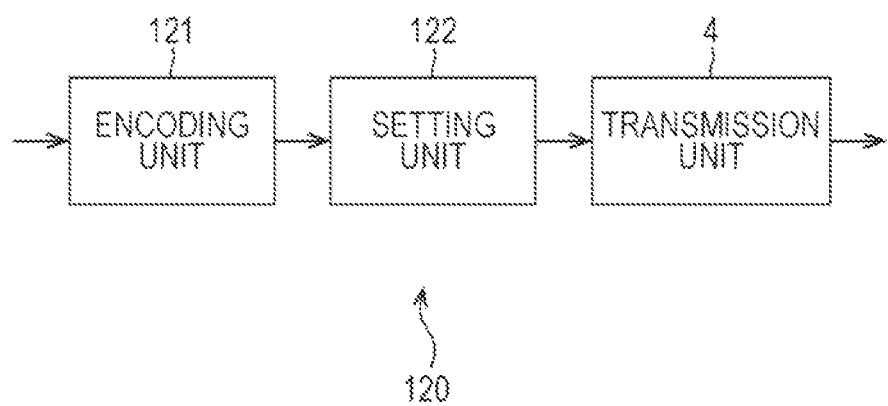
FIG. 22 is a block diagram illustrating a configuration example of a second embodiment of an encoding device to which the present technology is applied.

FIG. 22 is a block diagram illustrating a configuration example of a second embodiment of an encoding device to which the present technology is applied.

The same configuration of configurations illustrated in FIG. 22 as the configuration of FIG. 1 is denoted with the same reference sign. Description of overlapped description is appropriately omitted.

A configuration of an encoding device 120 of FIG. 22 is different from the configuration of FIG. 1 in that an encoding unit 121 is provided instead of the encoding unit 2, and a setting unit 122 is provided instead of the setting unit 3. The encoding device 120 generates an encoded stream of the packed image so that the encoded stream of the packed image includes 2D-compatible frame packing SEI that is frame packing SEI for including compatibility with an encoded stream of 2D image.

This 2D-compatible frame packing SEI is SEI applied before the cropping information when the packed image is displayed in the decoding device, and is SEI indicating the cropping information is to be ignored. That is, the 2D-compatible frame packing SEI is SEI preferentially used to the cropping information when the packed image is displayed.

An image, such as the packed image in a frame unit, and the like to the encoding unit 121 of the encoding device 120 as an input signal. The encoding unit 121 encodes the input signal in the HEVC system, and supplies encoded data obtained as a result of the encoding to the setting unit 122. Note that, while details will be described below, the encoding unit 2 and the encoding unit 121 have different types of filtering applied to a locally decoded image.

The setting unit 122 sets the SEI, such as the SPS, PPS, 2D-compatible frame packing SEI, and the like illustrated in FIG. 14. The setting unit 122 generates an encoded stream from the set SPS, PPS, SEI, and the like, and the encoded data supplied from the encoding unit 121. The setting unit 122 supplies the encoded stream to the transmission unit 4.

Figure 23:
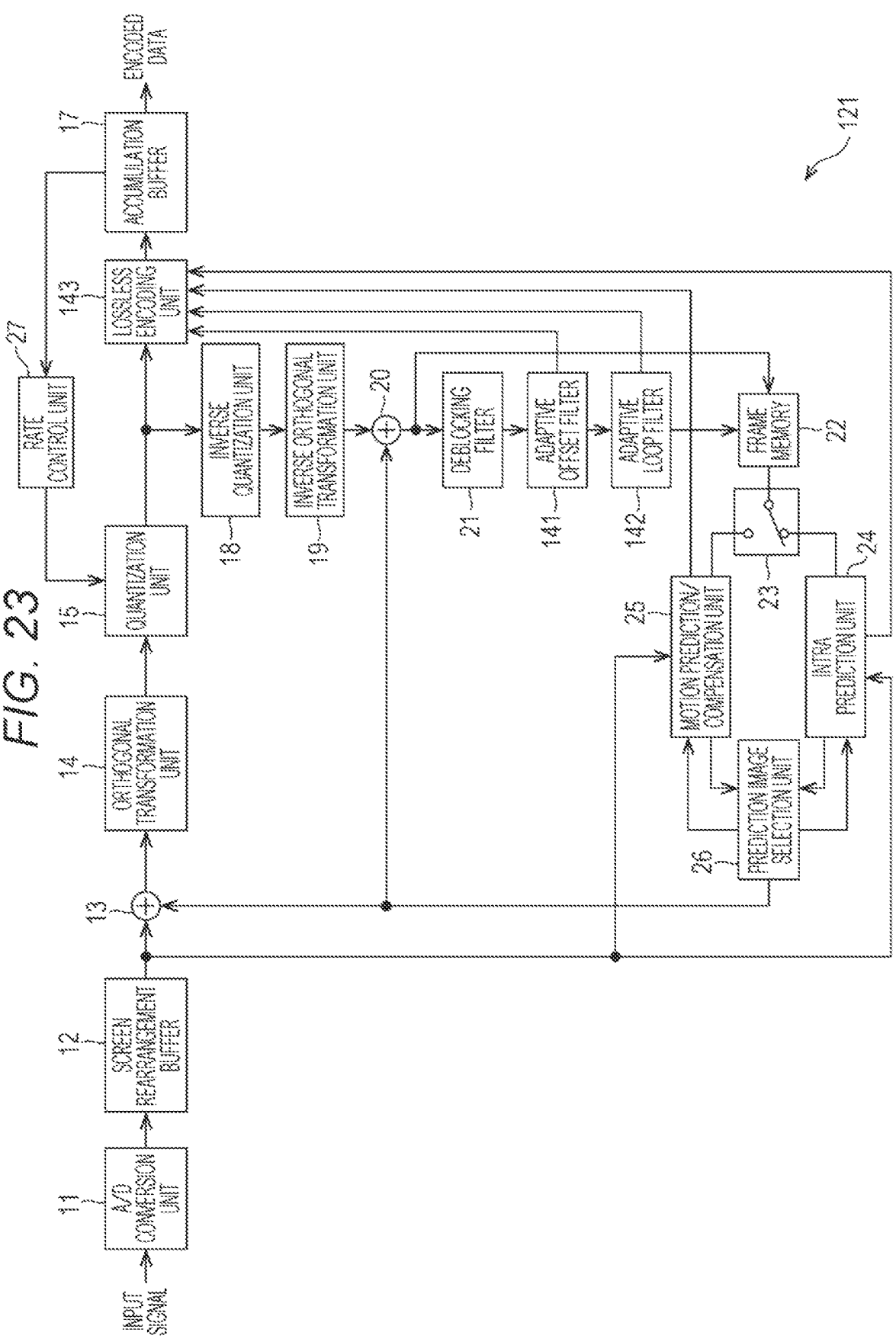
FIG. 23 is a block diagram illustrating a configuration example of the encoding unit of FIG. 22.

(Configuration Example of Encoding Unit) FIG. 23 is a block diagram illustrating a configuration example of the encoding unit 121 of FIG. 22.

The same configuration of configurations illustrated in FIG. 23 as the configuration of FIG. 2 is denoted with the same reference sign. Description of overlapped description is appropriately omitted.

The configuration of the encoding unit 121 of FIG. 23 is different from the configuration of FIG. 2 in that an adaptive offset filter 141 and an adaptive loop filter 142 are newly provided, and a lossless encoding unit 143 is provided instead of the lossless encoding unit 16.

The encoding unit 121 applies not only the filtering with the deblocking filter 21 (hereinafter, referred to as adaptive deblocking filter processing), but also filtering with the adaptive offset filter 141 and the adaptive loop filter 142 to the locally decoded image.

To be specific, the adaptive offset filter 141 applies adaptive offset filter (sample adaptive offset (SAO)) processing that mainly removes ringing to the image after the adaptive deblocking filter processing by the deblocking filter 21.

To be specific, the adaptive offset filter 141 determines a type of the adaptive offset filter processing for each largest coding unit (LCU) that is a maximum coding unit, and obtains an offset used for the adaptive offset filter processing. The adaptive offset filter 141 applies the determined type of the adaptive offset filter processing to the image after the adaptive deblocking filter processing using the obtained offset. The adaptive offset filter 141 then supplies an image after the adaptive offset filter processing to the adaptive loop filter 142.

Further, the adaptive offset filter 141 includes a buffer that stores an offset. The adaptive offset filter 141 determines whether the offset used in the adaptive deblocking filter processing has been stored in a buffer, for each LCU.

When having determined that the offset used in the adaptive deblocking filter processing has been already stored in a buffer, the adaptive offset filter 141 sets a storage flag that indicates whether the offset has been stored in a buffer to a value (here, 1) that indicates the offset has been stored in a buffer.

The adaptive offset filter 141 then supplies the storage flag set to 1, an index that indicates a storage location in a buffer of the offset, and the type information that indicates the type of the applied adaptive offset filter processing to the lossless encoding unit 143 for each LCU.

Meanwhile, when the offset used in the adaptive deblocking filter processing has not been stored in a buffer, the adaptive offset filter 141 stores the offset in a buffer in order. Further, the adaptive offset filter 141 sets the storage flag to a value (here, 0) that indicates the offset has not been stored in a buffer. The adaptive offset filter 141 then supplies the storage flag set to 0, the offset, the type information to the lossless encoding unit 143 for each LCU.

The adaptive loop filter 142 applies adaptive loop filter (ALF) processing to the image after the adaptive offset filter processing supplied from the adaptive offset filter 141 for each LCU, for example. As the adaptive loop filter processing, processing with a two-dimensional Wiener filter is used. Apparently, a filter other than the Wiener filter may be used.

To be specific, the adaptive loop filter 142 calculates a filter coefficient used in the adaptive loop filter processing so that a residual between the original image that is the image output from the screen rearrangement buffer 12 and the image after the adaptive loop filter processing is minimized, for each LCU. The adaptive loop filter 142 then applies adaptive loop filter processing to the image after the adaptive offset filter processing using the calculated filter coefficient, for each LCU.

The adaptive loop filter 142 supplies the image after the adaptive loop filter processing to the frame memory 22. Further, the adaptive loop filter 142 supplies the filter coefficient to the lossless encoding unit 143.

Note that, here, the adaptive loop filter processing is performed for each LCU. However, a processing unit of the adaptive loop filter processing is not limited to LCU. Note that the processing can be efficiently performed by making of processing units of the adaptive offset filter 141 and of the adaptive loop filter 142 uniform.

The lossless encoding unit 143 acquires the intra prediction mode information from the intra prediction unit 24, similarly to the lossless encoding unit 16 of FIG. 2, and acquires the inter prediction mode information, the motion vector, the information for identifying a reference image, and the like from the motion prediction/compensation unit 25. Further, the lossless encoding unit 143 acquires the storage flag, the index or the offset, and the type information from the adaptive offset filter 141 as offset filter information, and acquires the filter coefficient from the adaptive loop filter 142.

The lossless encoding unit 143 applies lossless encoding to the quantized coefficient supplied from the quantization unit 15, similarly to the lossless encoding unit 16. Further, the lossless encoding unit 143 applies lossless encoding to the intra prediction mode information or the inter prediction mode information, the motion vector, the information for identifying a reference image, the offset filter information, and the filter coefficient as the encoding information. The lossless encoding unit 143 supplies the lossless encoded encoding information and coefficient to the accumulation buffer 17 as encoded data, and accumulated the data therein. Note that the lossless encoded encoding information may server as header information of the lossless encoded coefficient.

(Example of Syntax of 2D-compatible Frame Packing SEI)

FIG. 24 is a diagram illustrating an example of 2D-compatible frame packing SEI set by the setting unit 122 of FIG. 22.

The description from the 2nd to 4th rows of FIG. 24 corresponds to the frame packing SEI in the AVC standard, that is, the description from the 3rd to 5th rows of FIG. 13 in the frame packing SEI of FIG. 13 where there is no description of the 2nd row.

Further, 2Dcomp_FPA type of the 5th row of FIG. 24 corresponds to frame_packing_arrangement_type (the 6th row of FIG. 13) in the frame packing SEI in the AVC standard. Note that, as described below, the mode information describable as 2Dcomp_FPA type is a part of the mode information describable as frame_packing_arrangement_type.

The description from the 6th to 11th rows of FIG. 24 corresponds to the description of the 8th, 9th, and from 13th to 20th rows of FIG. 13 in the frame packing SEI in the AVC standard. The position information is described in the 12th to 15th rows of FIG. 24.

In the example of FIG. 24, the position information is configured from upper-end information (top_position_frame) of the image, left-end information (left_position_frame) of the image, lower-end information (bottom_position_frame) of the image, and right-end information (right_position_frame) of the image, described for each image that configured the packed image.

Description from the 17th to 21st rows of FIG. 24 corresponds to the 21st to 25th rows of FIG. 13.

As described above, the 2D-compatible frame packing SEI of FIG. 24 is different from the frame packing SEI in the AVC system in that frame_packing_arrangement_type is changed to 2Dcomp_FPA_type, quincunx_sampling_flag (the 7th row of FIG. 13), field_pictures_flag (field_view_flag) (the 11th row of FIG. 13), and current_frame_is_frame0_flag (the 12th of FIG. 13) are not described.

(Description of Reasons of Change of 2D-compatible Frame Packing SEI)

FIGS. 25A and 25B are diagrams describing reasons of change of the 2D-compatible frame packing SEI with respect to the frame packing SEI in the AVC system.

Note that the squares marked with crosses in FIGS. 25A and 25B represent pixels of a left-eye image, and the squares marked with circles represent pixels of a right-eye image. Further, in the example of FIGS. 25A and 25B, a packed image and a display image are made of 12×8 pixels.

Here, as the mode information in the AVC system, there area checkerboard mode, an interleave mode, a frame sequential mode, in addition to a side-by-side mode, a top-and-bottom mode.

The checkerboard mode is a mode to perform packing in a checkerboard system by alternately arranging left-eye pixels and right-eye pixels in the row direction and in the column direction. The interleave mode is a mode to perform packing in an interleave system by arranging the left-eye pixel and the right-eye pixel in every other row or in every other column. The frame sequential mode is a mode to perform packing in a frame sequential system by alternately packing the left-eye image and the right-eye image in time division manner.

As illustrated in FIG. 25A, when the packing mode is the side-by-side mode, the decoding device can display the left-eye image as a 2D display image by cropping the left-eye image positioned in the left half of the packed image, and making (enlarging) the image to have high resolution.

Further, although the illustration is omitted, when the packing mode is the top-and-bottom mode, the decoding device can display the 2D display image by cropping and making of high resolution, similarly to the side-by-side mode.

However, as illustrated in FIG. 25B, when the packing mode is the check board mode, the decoding device cannot display the 2D display image by cropping and making of high resolution. Further, although illustration is omitted, when the packing mode is the interleave mode or the frame sequential mode, the decoding device cannot display the 2D display image by cropping and making of high resolution, similarly to the checkerboard mode.

Therefore, the encoding device 120 treats only the packed image packed in the top-and-bottom mode or the side-by-side mode, and the decoding device displays the 2D display image by cropping and making of high resolution. Therefore, the mode information is information indicating either the side-by-side mode or the top-and-bottom mode.

Further, the packing mode is either the top-and-bottom mode or the side-by-side mode, quincunx_sampling_flag that is description for the checkerboard mode is not included in the 2D-compatible frame packing SEI. Similarly, field_pictures_flag (field_view_flag) that is description for the interleave mode and current_frame_is_frame0_flag that is description for the frame sequential are not included in the 2D-compatible frame packing SEI.

(Description of Position Information)

Figure 26:
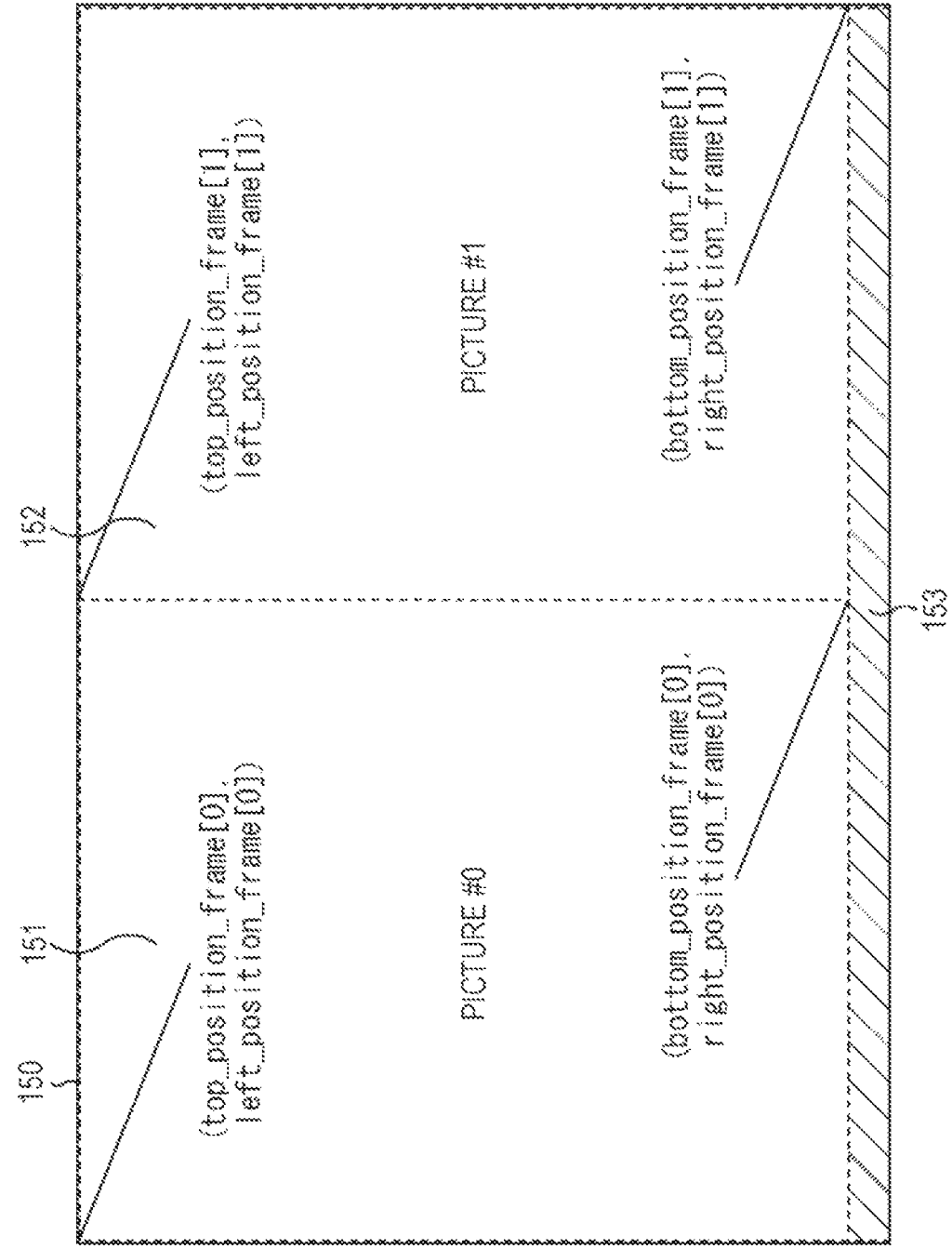
FIG. 26 is a diagram describing the position information of FIG. 24.

FIG. 26 is a diagram describing the position information of FIG. 24.

In the example of FIG. 26, a packed image 150 is packed by the side-by-side system. The picture ID of a left-half image 151 of the packed image 150 is 0, and the picture ID of a right-half image 152 is 1.

In this case, as illustrated in FIG. 26, upper-end information (top_position_frame[0]), left-end information (left_position_frame[0]), lower-end information (bottom_position_frame[0]), and right-end information (right_position_frame[0]) of the image 151 are described as the position information.

Further, upper-end information (top_position_frame[1]), left-end information (left_position_frame[1]), lower-end information (bottom_position_frame[1]), and right-end information (right_position_frame[1]) of the image 152 are described as the position information.

Here, the upper-end information (top_position_frame) is information expressing the upper-end position of the image 151 (152) that configures the packed image 150 by the number of pixels from its upper end to the upper end of the packed image 150. The left-end information (left_position_frame), the lower-end information (bottom_position_frame), and the right-end information (right_position_frame) are similar to the upper-end information.

Note that, similarly to the first embodiment, when the numbers of pixels of the luminance component and of the color difference component are different, the numbers of pixels indicated by the left-end information, the right-end information, the upper-end information, and the lower-end information are the numbers of pixels of the component having smaller numbers of images.

The images 151 and 152 of the packed image 150 can be identified based on such position information. The size of the packed image 150 is an integer multiple of the LCU. However, the size of the image 151 (152) that configures the packed image 150 is not necessarily integer multiple of the LCU. Therefore, as illustrated in FIG. 26, a blank area 153 other than the images 151 and 152 that configure the packed image 150 exists in the packed image 150.

Note that the position information may be information indicating the position of the image 151 (152) on the packed image 150 in a tile unit, similarly to FIG. 9, or may be information indicating the position in a slice unit, similarly to FIG. 11.

Further, here, the position information is configured from the upper-end information, the left-end information, the lower-end information, and the right-end information of the image 151 (152). However, the position information is not limited to the above example as long as the information indicates the position of the image 151 (152) on the packed image 150.

For example, when the number of pixels in the horizontal direction and the number of pixels in the vertical direction of the image 151 (152) are the same, the position information can be configured from the upper-end information and the left-end information of the image 151 (152), and the number of pixels in the horizontal direction and the number of pixels in the vertical direction common to the image 151 (152).

In this case, the number of pieces of information that configures the position information becomes 6, and a smaller number of pieces of information is needed. In contrast, when the position information is configured from the upper-end information, the left-end information, the lower-end information, and the right-end information of the image 151 (152), the number of pieces of information that configures the position information becomes 8.

Further, all pieces of the position information of the images 151 and 152 that configure the packed image 150 may not be included in the 2D-compatible frame packing SEI. For example, the upper-end information, the left-end information, the lower-end information, and the right-end information of the image 152 (151) other than the image 151 (152) corresponding to the cropped area indicated by the cropping information included in the SPS of the images 151 and 152 may be included as the position information. In this case, the decoding device identifies the image 151 (152) other than the image 152 (151) corresponding to the position information based on the cropping information. Further, in this case, the number of pieces of information that configures the position information becomes 4, and thus a smaller number of pieces of information is needed.

Further, when the number of pixels in the horizontal direction and the number of pixels in the vertical direction of the image 151 (152) are the same, the upper-end information and the left-end information of the image 152 (151) other than the image 151 (152) corresponding to the cropped area indicated by the cropping information of the images 151 and 152 may be included as the position information. In this case, the decoding device identifies the image 151 (152) other than the image 152 (151) corresponding to the position information based on the cropping information. The decoding device then identifies the image 152 (151) corresponding to the position information based on the number of pixels in the horizontal direction and the number of pixels in the vertical direction of the image 151 (152), and the upper-end information and the left-end information. In this case, the number of pieces of information that configures the position information becomes 2, and a smaller number of pieces of information is needed.

(Description of Processing of Encoding Device)

Figure 27:
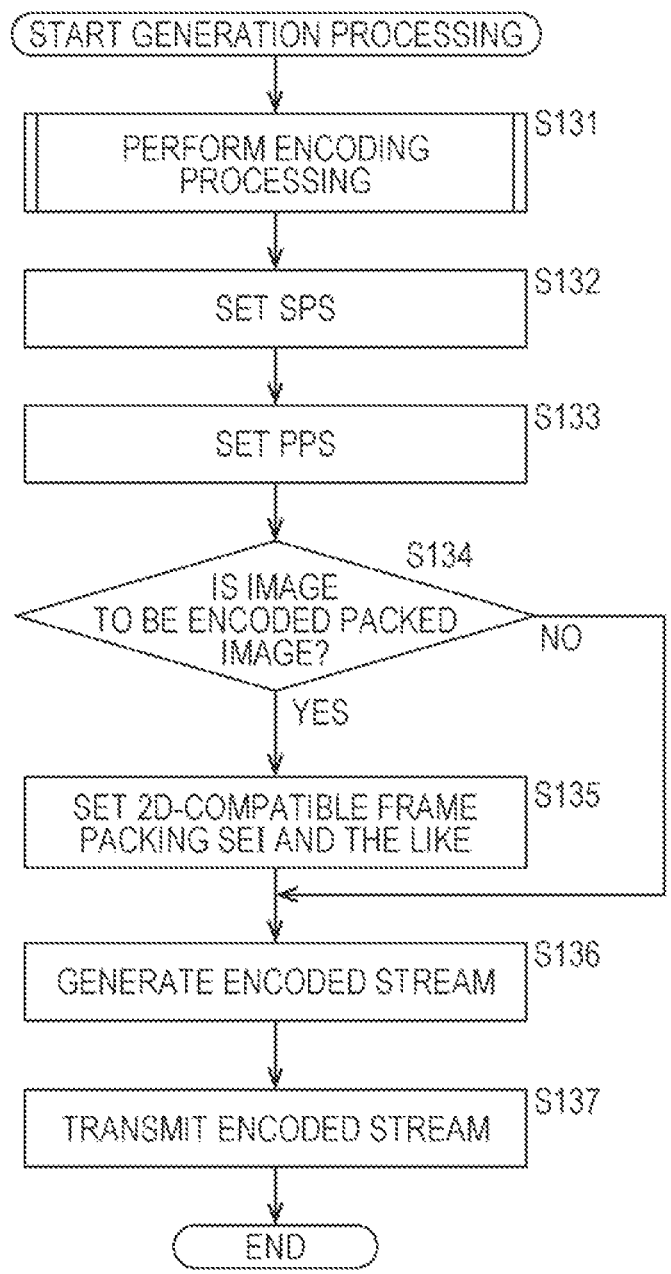
FIG. 27 is a flowchart describing generation processing by the encoding device of FIG. 22.

FIG. 27 is a flowchart describing generation processing of the encoding device 120 of FIG. 22.

In step S131 of FIG. 27, the encoding unit 121 of the encoding device 120 performs encoding processing of encoding an image, such as a packed image, input from an outside as an input signal in the HEVC system. Details of the encoding processing will be described with reference to FIGS. 28 and 29 described below.

In step S132, the setting unit 122 sets the SPS (FIG. 14) including the cropping information. In step S133, the setting unit 122 sets the PPS. In step S1:34, the setting unit. 122 determines whether an image to be encoded is a packed image based on an operation of an input unit (not illustrated) by the user, or the like.

In step S134, when the image to be encoded is determined to be a packed image, in step S135, the setting unit 122 sets the SEI, such as the 2D-compatible frame packing SEI of FIG. 24, and the like, and advances the processing to step S136.

Meanwhile, when the image to be encoded is determined not to be a packed image in step S134, the setting unit 122 sets the SEI other than the 2D-compatible frame packing SEI, as needed, and advances the processing to step S136.

In step S136, the setting unit 122 generates an encoded stream from the set SPS, PPS, and SEI, and the encoded data supplied from the encoding unit 121. The setting unit 122 supplies the encoded stream to the transmission unit 4.

In step S137, the transmission unit 4 transmits the encoded stream supplied from the setting unit 122 to the decoding device described below, and terminates the processing.

Figure 28:
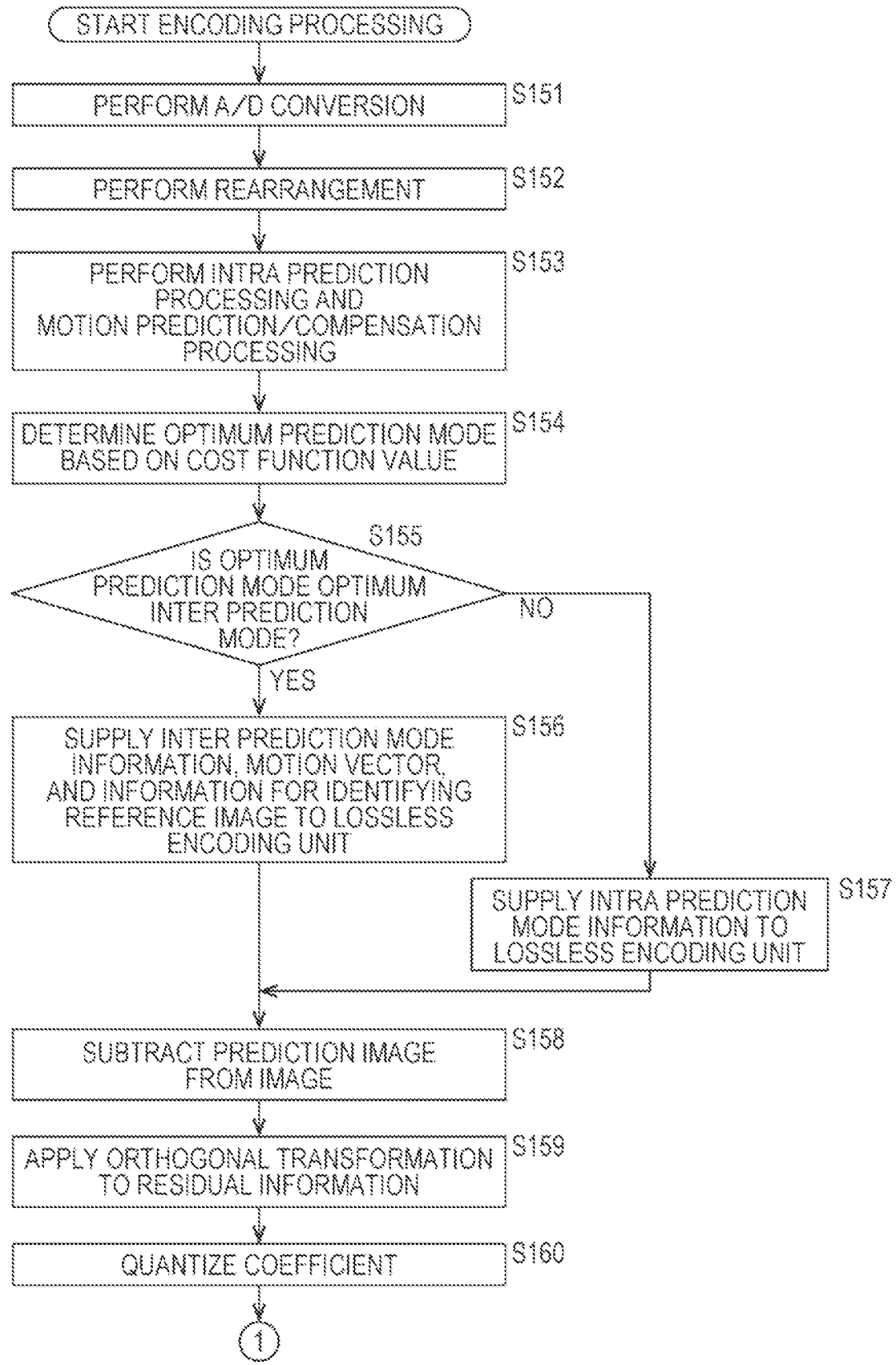
FIG. 28 is a flowchart describing details of the encoding processing of FIG. 27.
Figure 29:
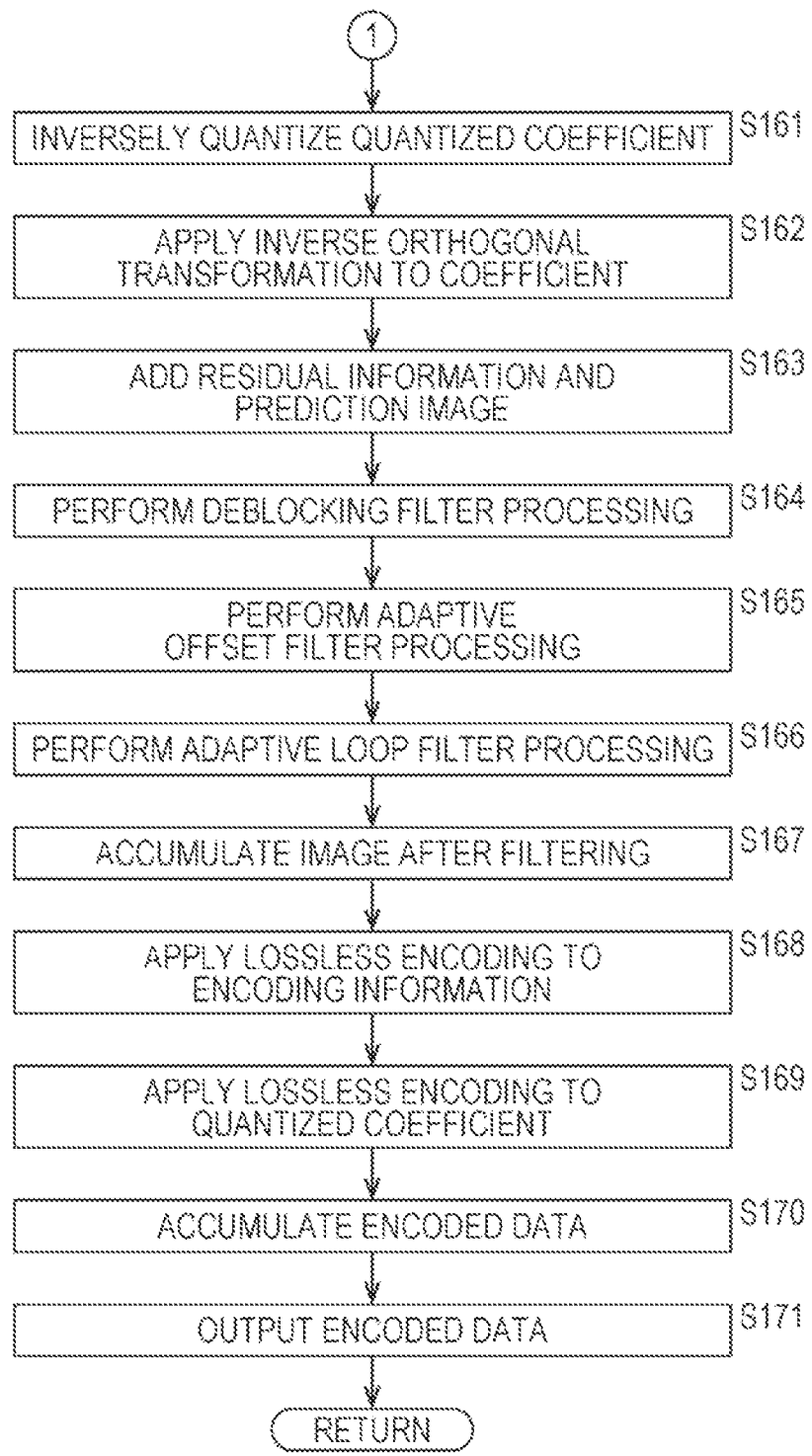
FIG. 29 is a flowchart describing details of the encoding processing of FIG. 27.

FIGS. 28 and 29 are flowcharts describing details of the encoding processing of step S131 of FIG. 27.

Processing of steps S151 to S155 of FIG. 28 is similar to the processing of steps S11 to S15 of FIG. 16, and thus description is omitted.

When the optimum prediction mode is determined to be the optimum inter prediction mode in step S155, the prediction image selection unit 26 notifies selection of the prediction image generated in the optimum inter prediction mode to the motion prediction/compensation unit 25.

Then, in step S156, the motion prediction/compensation unit 25 supplies the inter prediction mode information, the corresponding motion vector, and information for identifying a reference image to the lossless encoding unit 143. The processing then proceeds to step S158.

Meanwhile, when the optimum prediction mode is determined not to be the optimum inter prediction mode in step S155, that is, when the optimum prediction mode is the optimum intra prediction mode, the prediction image selection unit 26 notifies selection of the prediction image generated in the optimum intra prediction mode to the intra prediction unit 24.

Then, in step S157, the intra prediction unit 24 supplies the intra prediction mode information to the lossless encoding unit 14:3. The processing then proceeds to step S158.

Processing of steps S158 to S163 is similar to the processing of steps S18 to S20 of FIG. 16 and steps of S24 to S26 of FIG. 17, and thus description is omitted.

In step S164, the deblocking filter 21 applies deblocking filter processing to the locally decoded image supplied from the adding unit 20. The deblocking filter 21 supplies an image obtained as a result of the deblocking filter processing to the adaptive offset filter 141.

In step S165, the adaptive offset filter 141 applies adaptive offset filter processing to the image supplied from the deblocking filter 21, for each LCU. The adaptive offset filter 141 supplies an image obtained as a result of the adaptive offset filter processing to the adaptive loop filter 142. Further, the adaptive offset filter 141 supplies the storage flag, the index or the offset, and the type information to the lossless encoding unit 143 as offset filter information, for each LCU.

In step S166, the adaptive loop filter 142 applies adaptive loop filter processing to the image supplied from the adaptive offset filter 141, for each LCU. The adaptive loop filter 142 supplies an image obtained as a result of the adaptive loop filter processing to the frame memory 22. Further, the adaptive loop filter 142 supplies the filter coefficient used in the adaptive loop filter processing to the lossless encoding unit 143.

In step S167, the frame memory 22 accumulates the images before and after the filtering. To be specific, the frame memory 22 accumulates the image supplied from the adding unit 20, and the image supplied from the adaptive loop filter 142. The images accumulated in the frame memory 22 are output to the intra prediction unit 24 or the motion prediction/compensation unit 25 through the switch 23 as reference images.

In step S168, the lossless encoding unit 143 applies lossless encoding to the intra prediction mode information or the inter prediction mode information, the motion vector, the information for identifying a reference image, the offset filter information, and the filter coefficient as the encoding information.

In step S169, the lossless encoding unit 143 applies lossless encoding to the quantized coefficient supplied from the quantization unit 15. The lossless encoding unit 143 then generates encoded data from the lossless encoded encoding information and the lossless encoded coefficient in the processing of step S168.

Processing of steps S170 and S171 is similar to the processing of steps S22 and S23 of FIG. 17, and thus description is omitted. After the processing of step S171, the processing is returned to step S131 of FIG. 27, and proceeds to step S132.

As described above, the encoding device 120 sets the 2D-compatible frame packing SEI applied before the cropping information and indicating the cropping information is to be ignored, and transmits the 2D-compatible frame packing SEI together with the encoded data that is the encoded packed image.

Therefore, the decoding device that decodes and displays the encoded stream of the packed image can preferentially use the 2D-compatible frame packing SET and identify the images that configure the packed image when the encoded stream includes the 2D-compatible frame packing SEI. Therefore, the decoding device can reliably display a desired image that configures the packed image.

Therefore, it can be said that the encoding device 120 can generate the encoded stream of the packed image so as to reliably display the desired image that configures the packed image when decoding and displaying the encoded stream of the packed image.

(Configuration Example of Second Embodiment of Decoding Device)

Figure 30:
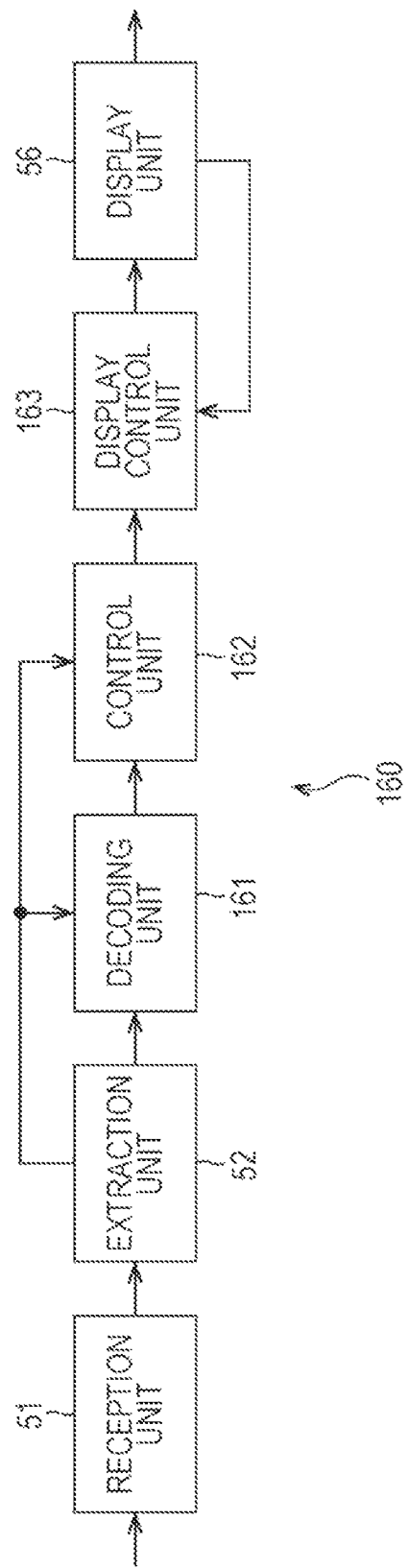
FIG. 30 is a block diagram illustrating a configuration example of the second embodiment of a decoding device to which the present technology is applied.

FIG. 30 is a block diagram illustrating a configuration example of the second embodiment of the decoding device to which the present technology is applied, which decodes the encoded stream transmitted from the encoding device 120 of FIG. 22.

The same configuration of configurations illustrated in FIG. 30 as the configuration of FIG. 18 is denoted with the same reference sign. Description of overlapped description is appropriately omitted.

The configuration of the decoding device 160 of FIG. 30 is different from the configuration of FIG. 18 in that a decoding unit 161, a control unit 162, and a display control unit 163 are provided instead of the decoding unit 53, the control unit 54, and the display control unit 163. The decoding device 160 preferentially uses the 2D-compatible frame packing SEI to generate a display image when the encoded stream includes the 2D-compatible frame packing SEI.

To be specific, the decoding unit 161 of the decoding device 160 refers to the SPS, PPS, SEI, and the like supplied from the extraction unit 52, as needed, and decodes the encoded data supplied from the extraction unit 52 in the HEW, system. The decoding unit 161 supplies an image, such as a packed image, obtained as a result of the decoding to the control unit 162 as an output signal. Note that, while details will be described below, the decoding unit 53 and the decoding unit 161 have different types of filtering applied to the locally decoded image.

When the 2D-compatible frame packing SEI is supplied from the extraction unit 52, that is, when the output signal is the packed image, the control unit 162 identifies images that configure the packed image based on the position information included in the 2D-compatible frame packing SEI. The control unit 162 then ignores the cropping information, and supplies the packed image as the output signal and information identifying the images that configure the packed image to the display control unit 163.

Meanwhile, the control unit 162, when the 2D-compatible frame packing SEI is not supplied from the extraction unit 52, that is, when the output signal is an image that is not the packed image, the control unit 162 supplies the image that is not the packed image as the output signal and the cropping information included in the SPS to the display control unit 163.

The display control unit 163 crops the packed image, makes (enlarges) the packed image to have high resolution, and the like, the packed image being supplied from the control unit 162 as an output signal, and generates a display image, based on the information identifying the images that configure the packed image supplied from the control unit 162 and a display method notified from the display unit 56. Further, the display control unit 163 crops the non-packed image, makes (enlarges) the non-packed image to have high resolution, and the like, the non-packed image being supplied from the control unit 162 as the output signal, based on the cropping information supplied from the control unit 162, and generates a display image. The display control unit 163 supplies the generated display images to the display unit 56, and displays the images therein.

(Configuration Example of Decoding Unit)

Figure 31:
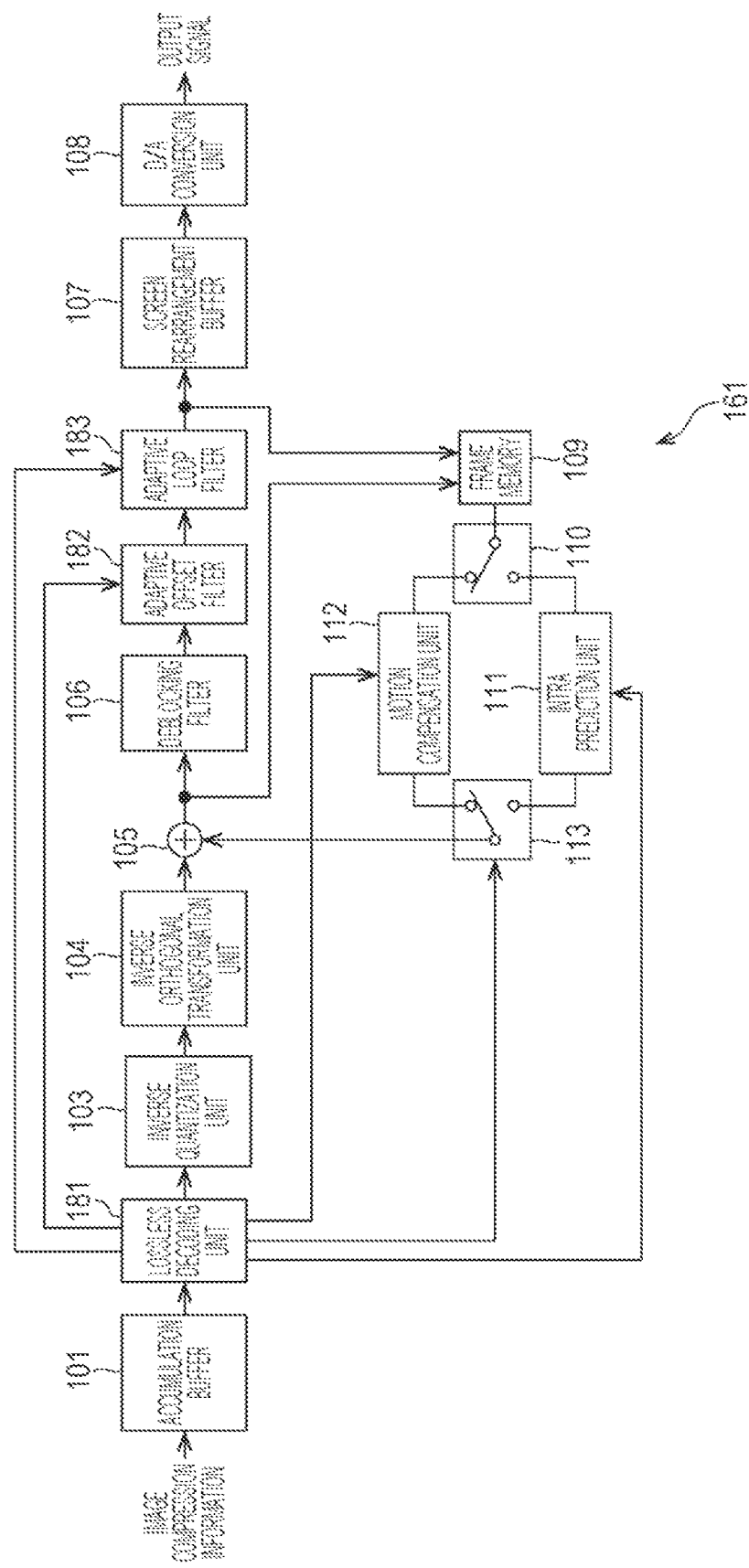
FIG. 31 is a block diagram illustrating a configuration example of a decoding unit of FIG. 30.

FIG. 31 is a block diagram illustrating a configuration example of the decoding unit 161 of FIG. 30.

The same configuration of configurations illustrated in FIG. 31 as the configuration of FIG. 19 is denoted with the same reference sign. Description. of overlapped description is appropriately omitted.

The configuration of the decoding unit 161 of FIG. 31 is different from the configuration of FIG. 19 in that a lossless decoding unit 181 is provided instead pf the lossless decoding unit 102, and an adaptive offset filter 182 and an adaptive loop filter 183 are newly provided. The decoding unit 161 applies not only the adaptive deblocking filter processing, but also filtering by the adaptive offset filter 182 and the adaptive loop filter 183 to the locally decoded image.

Specifically, the lossless decoding unit 181 applies lossless decoding, such as variable length decoding and the arithmetic decoding, to the encoded data from the accumulation buffer 101 to obtain a quantized coefficient and encoding information, similarly to the lossless decoding unit 102 of FIG. 19. The lossless decoding unit 181 supplies the quantized coefficient to the inverse quantization unit 103, similarly to the lossless decoding unit 102.

Further, the lossless decoding unit 181 supplies the intra prediction mode information as the encoding information to the intra prediction unit 111, similarly to the lossless decoding unit 102. The lossless decoding unit 181 supplies the motion vector, the information for identifying a reference image, the inter prediction mode information, and the like as the encoding information to the motion compensation unit 112, similarly to the lossless decoding unit 102.

Further, the lossless decoding unit 181 supplies the intra prediction mode information or the inter prediction mode information as the encoding information to the switch 113, similarly to the lossless decoding unit 102. The lossless decoding unit 181 supplies the offset filter information as the encoding information to the adaptive offset filter 182, and supplies the filter coefficient to the adaptive loop filter 183.

The adaptive offset filter 182 includes a buffer in which the offset supplied from the lossless decoding unit 181 in order. Further, the adaptive offset filter 182 applies adaptive offset filter processing to the image after the adaptive deblocking filter processing by the deblocking filter 106 based on the offset filter information supplied from the lossless decoding unit 181, for each LCU.

To be specific, when the storage flag included in the offset filter information is 0, the adaptive offset filter 182 applies adaptive offset filter processing of the type indicated by the type information to the image after the deblocking filter processing in an LCU unit using the offset included in the offset filter information.

Meanwhile, when the storage flag included in the offset filter information is 1, the adaptive offset filter 182 reads an offset stored in the position indicated by the index included in the offset filter information to the image after the deblocking filter processing in an LCU. The adaptive offset filter 182 then performs the adaptive offset filter processing of the type indicated by the type information using the read offset. The adaptive offset filter 182 supplies the image after the adaptive offset filter processing to the adaptive loop filter 183.

The adaptive loop filter 183 applies adaptive loop filter processing to the image supplied from the adaptive offset filter 182, for each LCU, using the filter coefficient supplied from the lossless decoding unit 181. The adaptive loop filter 183 supplies an image obtained as a result of the adaptive offset filter processing to the frame memory 109 and the screen rearrangement buffer 107.

(Description of Application Period of 2D-compatible Frame Packing SEI)

Figure 32:
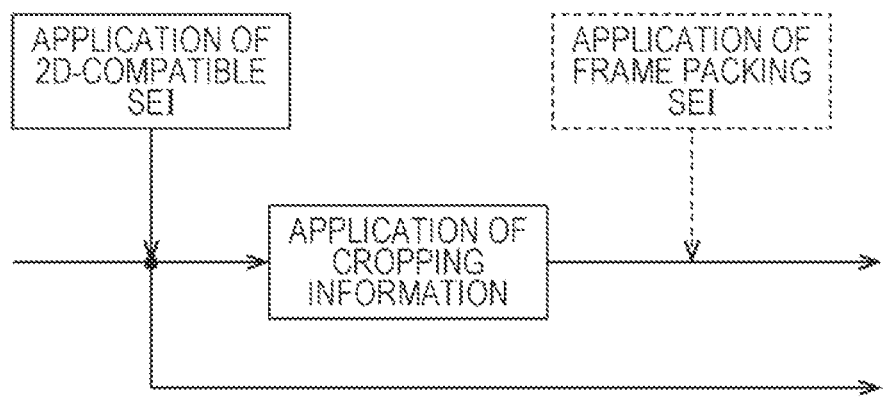
FIG. 32 is a diagram describing an application period of 2D-compatible frame packing SET.

FIG. 32 is a diagram describing an application period of the 2D-compatible frame packing SEI.

As illustrated in FIG. 32, the decoding device 160 first determines whether the 2D-compatible frame packing SEI is included in the received encoded stream. When the 2D-compatible frame packing SEI is included, the decoding device 160 applies the 2D-compatible frame packing SEI, and ignores the cropping information.

As described above, the 2D-compatible frame packing SEI is applied before the cropping information, and indicates ignorance of the cropping information. Therefore, when the 2D-compatible frame packing SEI is included in the encoded stream, the decoding device 160 applies only the 2D-compatible frame packing SEI.

Meanwhile, when the 2D-compatible frame packing SEI is not included in the encoded stream, the decoding device 160 applies the cropping information included in the SPS.

In contrast, the frame packing SEI in the conventional AVC system is applied after the cropping information, and is not the SEI that indicates ignorance of the cropping information. Therefore, when the frame packing SEI in the conventional AVC system is included in the encoded stream, the frame packing SEI is applied after the cropping information is applied.

Therefore, when the cropping information indicates an area of either one of the left-eye image or the right-eye image as the cropped area, a 3D display decoding device that uses SEI cannot display the other image.

Further, when the frame packing SEI in the conventional AVC system is included in the encoded stream, the 3D display decoding device that uses SEI can display a 3D image based on the frame packing SEI by ignoring the cropping information. However, the frame packing SEI in the conventional AVC system is not the SEI that indicates ignorance of the cropping information. Therefore, ignorance of the cropping information included in the SPS that is mandatory information on the standard is violation of the standard.

(Description of Information Describable in 2D-compatible frame packing SEI)

Figure 33:
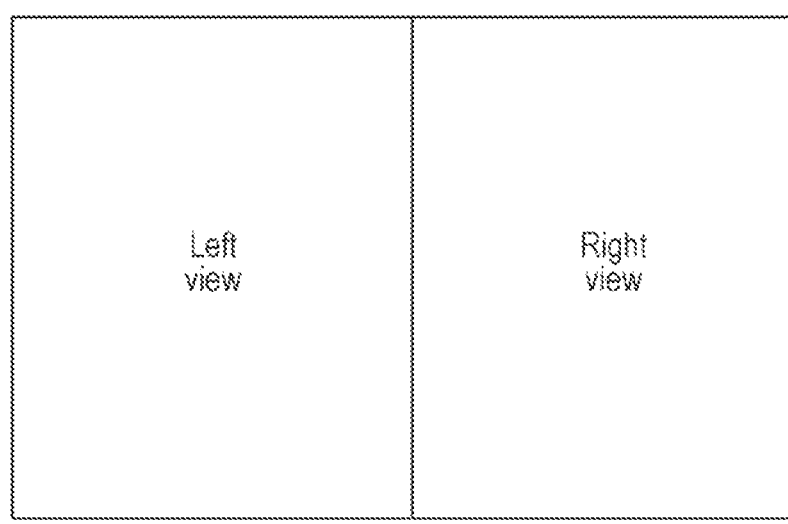
FIG. 33 is a diagram describing information describable in the 2D-compatible frame packing SEI.

FIG. 33 is a diagram describing information describable in the 2D-compatible frame packing SEI.

In the example of FIG. 33, the packed image is packed by the side-by-side system, the left-half image of the packed image is the left-eye image (left view) that configures the 3D image, and the right-half image is the right-eye image (right view).

In this case, the 2D-compatible frame packing SEI is applied before the cropping information, and thus the left-eye image and the right-eye image that configure the packed image can be described.

In contrast, the frame packing SEI in the conventional AVC system is applied after the cropping information. Therefore, when the cropping information indicates an area of either one of the left-eye image or the right-eye image (the left-eye image in the example of FIG. 33), only the one image (the left-eye image in the example of FIG. 33) can be described.

(Description of Processing of Decoding Device)

Figure 34:
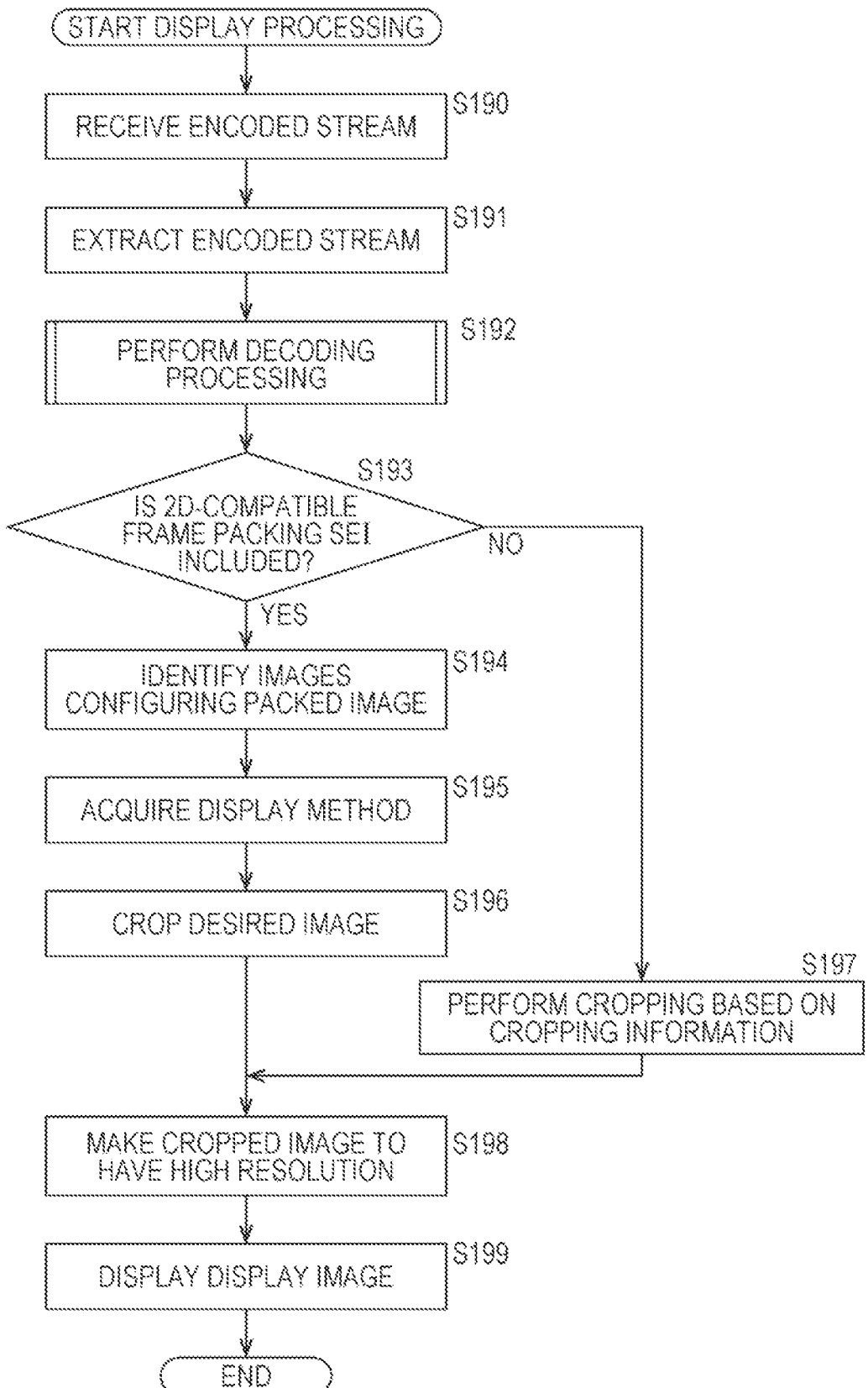
FIG. 34 is a flowchart describing display processing by the decoding device of FIG. 30.

FIG. 34 is a flowchart describing display processing by the decoding device 160 of FIG. 30.

Processing of steps S190 and S191 of FIG. 34 is similar to the processing of steps S50 and S51 of FIG. 20, and thus description is omitted.

In step S192, the decoding unit 161 refers to the SPS, PPS, SEI, and the like supplied from the extraction unit 52, as needed, and applies decoding processing that decodes in the HEVC system to the encoded data supplied from the extraction unit 52. Details of the decoding processing will be described with reference to FIG. 35 described below.

In step S193, the control unit 162 determines whether the 2D-compatible frame packing SEI is included in the encoded stream, that is, whether the 2D-compatible frame packing SEI has been supplied from the extraction unit 52. When the 2D-compatible frame packing SEI is determined to be included in step S193, the control unit 162 determines that the output signal supplied from the decoding unit 161 is the packed image.

Then, in step S194, the control unit 162 identifies images that configure the packed image based on the position information included in the 2D-compatible frame packing SEI, and the like. The control unit 162 then supplies information identifying the images that configure the packed image and the output signal to the display control unit 163.

In step S195, the display control unit 163 acquires a display method notified from the display unit 56. In step S196, the display control unit 163 crops a desired image of the images that configure the packed image based on the display method and the information identifying the images that configure the packed image.

For example, when the output signal is the 3D display packed image, the control unit 162 identifies the left-eye image and the right-eye image that configure the packed image based on the position information included in the 2D-compatible frame packing SEI, and the like. Then, when the display method is the 2D display, the display control unit 163 crops the left-eye image from the packed image, for example. Meanwhile, when the display method is the 3D display, the display control unit 163 crops the left-eye image and the right-eye image from the packed image. Then, the processing proceeds to step S198.

Meanwhile when the 2D-compatible frame packing SEI is determined not to be included in step S193, the control unit 162 determines that the output signal is not the packed image. The control unit 162 then supplies the output signal and the cropping information included in the SPS supplied from the extraction unit 52 to the display control unit 163.

Then, in step S197, the display control unit 163 crops the image as the output signal based on the cropping information supplied from the control unit 162, and the processing proceeds to step S198.

In step S198, the display control unit 163 makes (enlarges) the image cropped in step S196 or S197 to have high resolution, and employs the image as the display image. In step S199, the display control unit 16:3 displays the display image in the display unit 56 by supplying the display image to the display unit 56, and terminates the processing.

Figure 35:
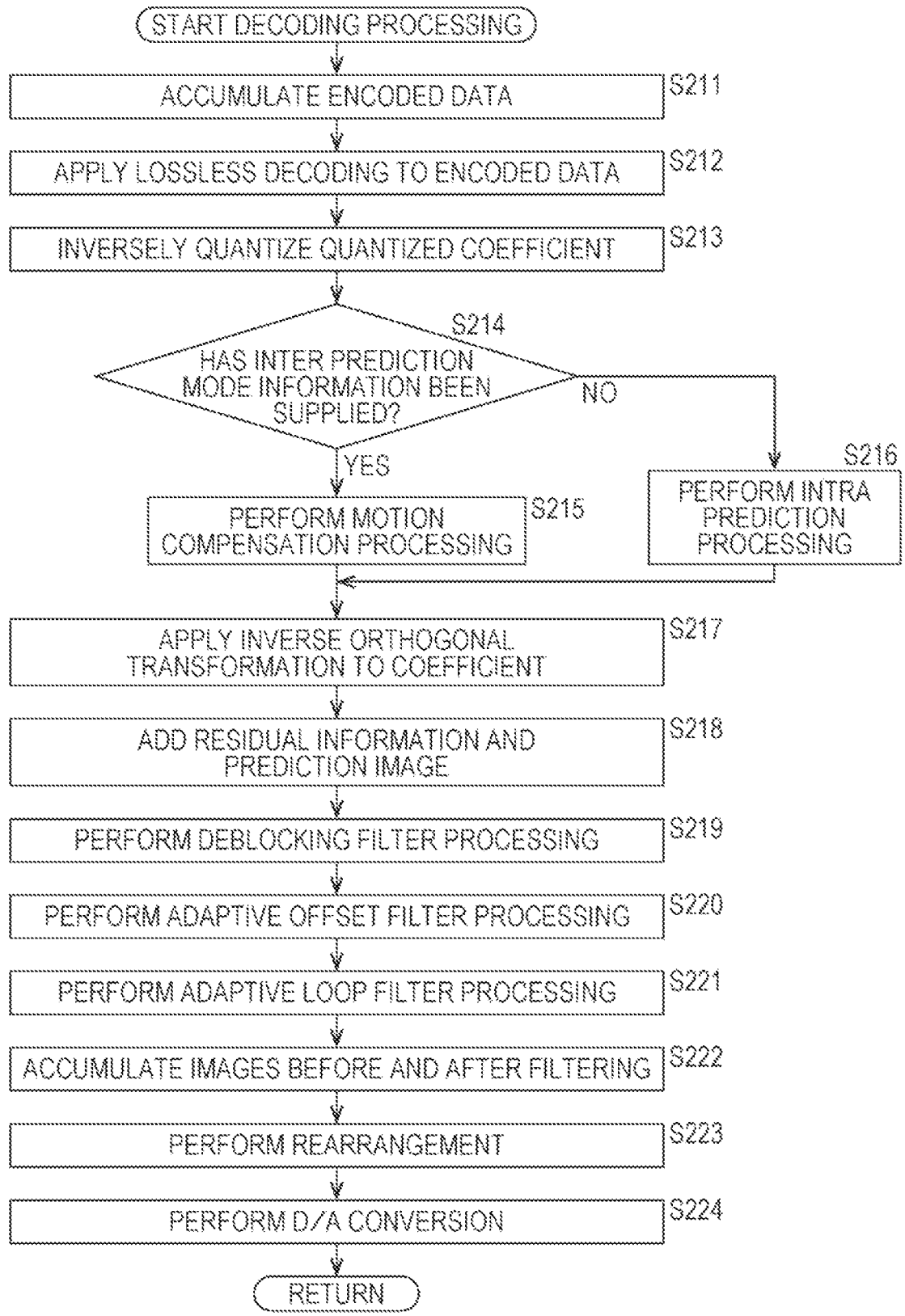
FIG. 35 is a flowchart describing details of the decoding processing of FIG. 34.

FIG. 35 is a flowchart describing details of the decoding processing of step S192 of FIG. 34.

Processing of steps S211 to S218 of FIG. 35 is similar to the processing of steps S101 to S108 of FIG. 21.

In step S219, the deblocking filter 106 applies the deblocking filter processing to the image supplied from the adding unit 105 to remove block distortion. The deblocking filter 106 supplies an image obtained as a result of the deblocking filter processing to the adaptive offset filter 182.

In step S220, the adaptive offset filter 182 applies adaptive offset filter processing to the image after the deblocking filter processing by the deblocking filter 106, for each LCU, based on the offset filter information supplied from the lossless decoding unit 181. The adaptive offset filter 182 supplies the image after the adaptive offset filter processing to the adaptive loop filter 183.

In step S221, the adaptive loop filter 183 applies adaptive loop filter processing to the image supplied from the adaptive offset filter 182 using the filter coefficient supplied from the lossless decoding unit 181, for each LCU. The adaptive loop filter 183 supplies an image obtained as a result of the adaptive loop filter processing to the frame memory 109 and the screen rearrangement buffer 107.

Processing of steps S222 to S224 is similar to the processing of steps S110 to S112 of FIG. 21, and thus the description is omitted.

As described above, the decoding device 160 decodes the encoded data to generate the packed image, and when the 2D-compatible frame packing SEI is included in the encoded stream, the decoding device 160 applies the 2D-compatible frame packing SEI, and ignores the cropping information. To be specific, the decoding device 160 identifies images that configure the packed image based on the 2D-compatible frame packing SEI. Therefore, when decoding and displaying the encoded stream of the packed image, the decoding device 160 can reliably display a desired image that configures the packed image.

Further, the decoding device 160 can identify the images that configure the packed image, and thus the decoding device 160 side can determine the desired image to be displayed according to the display method, and the like.

Note that the decoding device that does not use SEI performs cropping based on the cropping information. Accordingly, when the cropping information indicates an area of either one of the left-eye image or the right-eye image that configures the packed image as the cropped area, the decoding device that does not use SEI can display the one image as a 2D image.

Further, in the second embodiment, the 2D-compatible frame packing SEI is newly set. However, the frame packing SEI in the conventional AVC system may be extended to have a function of the 2D-compatible frame packing SEI.

In this case, frame_packing_arrangement_extension_flag of the frame packing SEI in the conventional AVC system is used as a flag that indicates whether the cropping information is applied. Then, when frame_packing_arrangement_extension_flag indicates the cropping information is not applied, information for setting quincunx_sampling_flag, field_pictures_flag (field_view_flag), and current_frame_is_frame0_flag disabled, and the position information are described in the extended frame packing SEI.

The decoding device that uses SEI reads the extended frame packing SEI before applying the cropping information. When frame_packing_arrangement_extension_flag indicates the cropping information is not applied, the decoding device that uses SEI identifies the image based on the position information of the extended frame packing SEI, and ignores the cropping information. Meanwhile, when frame_packing_arrangement_extension_flag indicates the cropping information is applied, the decoding device that uses SEI performs cropping based on the cropping information.

As described above, the decoding device that uses SEI preferentially uses the extended frame packing SEI to the cropping information to identify the image, and performs cropping based on the cropping information without preferentially using the extended frame packing SEI based on frame_packing_arrangement_extension_flag. Therefore, it can be said frame_packing_arrangement_extension_flag is information (packing priority information) that indicates whether the extended frame packing SEI is preferentially used at the time of displaying the packed image.

Third Embodiment (Description of Computer to which Present Technology is Applied)

The above-described series of processing can be executed by hardware or by software. When the series of processing is executed by software, a program that configures the software is installed in a computer. Here, the computer includes a computer incorporated in dedicated hardware, a general-purpose personal computer that can execute various functions by being installed various programs, and the like.

Figure 36:
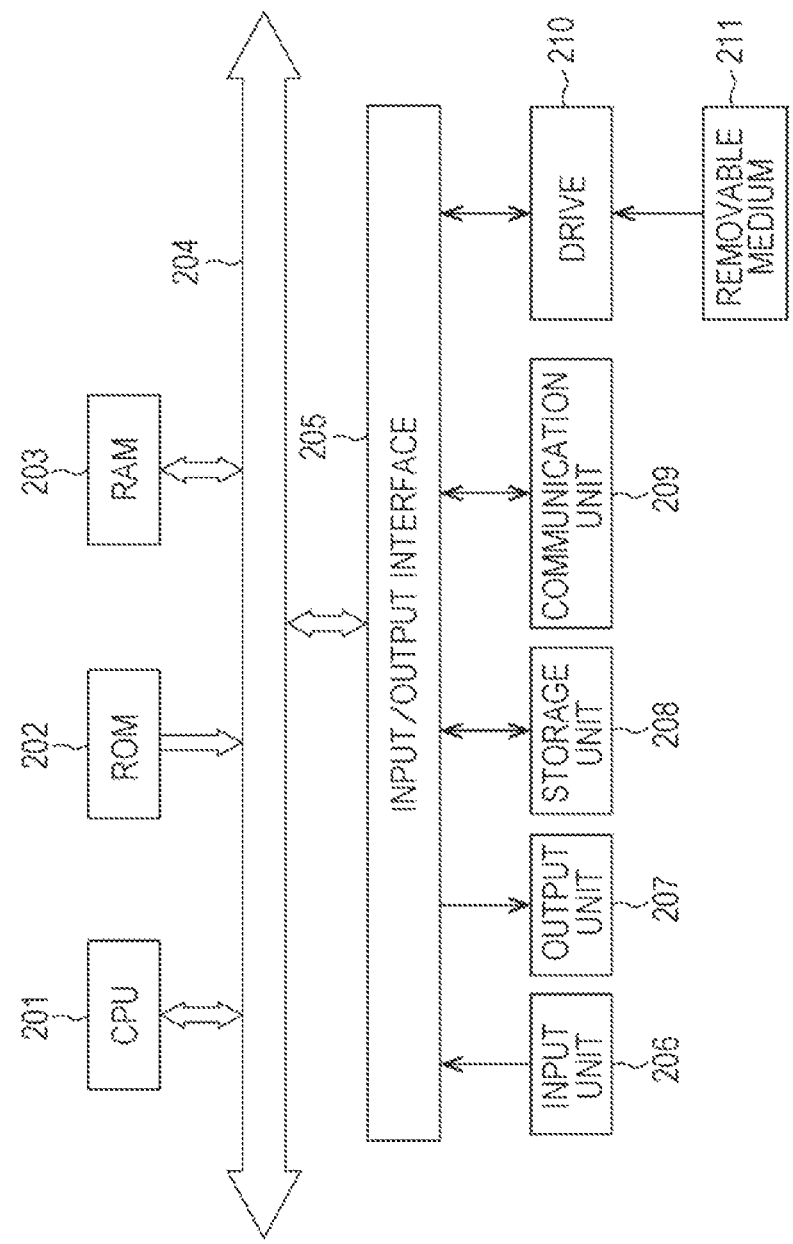
FIG. 36 is a block diagram illustrating a configuration example of hardware of a computer.

FIG. 36 is a block diagram illustrating a configuration example of hardware of a computer that executes the series of processing by a program.

In the computer, a central processing unit (CPU) 201, a read only memory (ROM) 202, a random access memory (RAM) 203 are mutually connected by a bus 204.

An input/output interface 205 is further connected to the bus 204. An input unit 206, an output unit 207, a storage unit 208, a communication unit 209, and a drive 210 are connected to the input/output interface 205.

The input unit 206 is made of a keyboard, a mouse, a microphone, and the like. The output unit 207 is made of a display, a speaker, and the like. The storage unit 208 is made of a hard disk, a non-volatile memory, and the like. The communication unit 209 is made of a network interface, and the like. The drive 210 drives a removable medium 211, such as a magnetic disk, an optical disk, a magneto-optical disk, or a semiconductor memory.

In the computer configured as described above, the above-described series of processing is performed such that the CPU 201 loads the program stored in the storage unit 208 through the input/output interface 205 and the bus 204 to the RAM 203, and executes the program, for example.

The program executed by the computer (CPU 201) can be recorded on the removable medium 211 as a package media, or the like, and can be provided. Further, the program can be provided through a wired or wireless transmission medium, such as a local area network, the Internet, and a digital satellite broadcasting.

In the computer, the program can be installed to the storage unit 208 through the input/output interface 205 by attaching of the removable medium 211 to the drive 210. Further, the program can be received by the communication unit 209 through the wired or wireless transmission medium, and installed to the storage unit 208. Alternatively, the program can be installed to the ROM 202 or the storage unit 208, in advance.

Note that the program executed by the computer may be a program in which the processing is performed in time series according to the order described in the present specification, or a program in which the processing is performed in parallel or at a necessary tinning, such as when readout is performed.

Fourth Embodiment (Configuration Example of Television Device)

Figure 37:
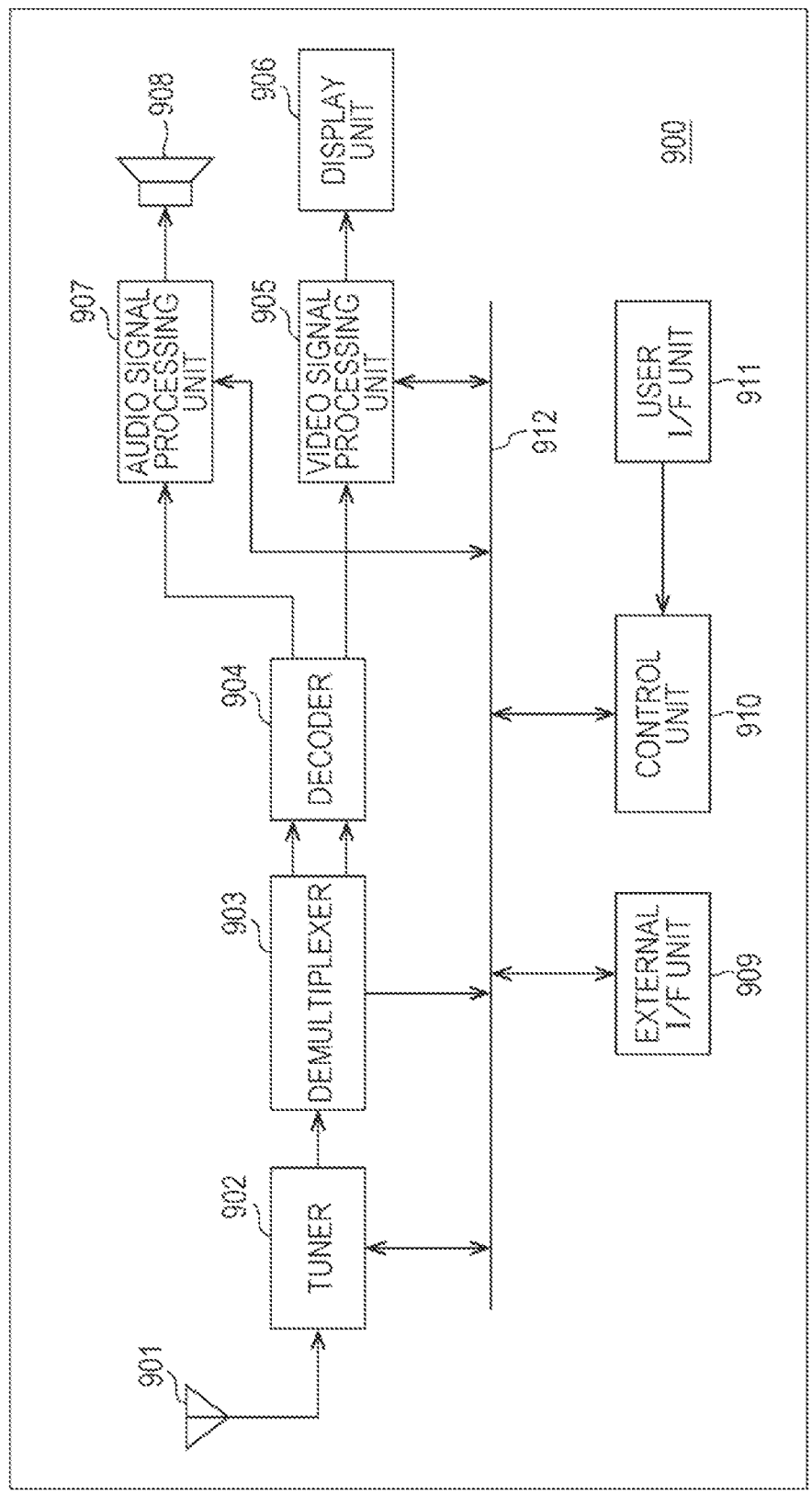
FIG. 37 is a diagram illustrating a schematic configuration example of a television device to which the present technology is applied.

FIG. 37 exemplarily illustrates a schematic configuration of a television device to which the present technology is applied. A television device 900 includes an antenna 901, a tuner 902, a demultiplexer 903, a decoder 904, a video signal processing unit 905, a display unit 906, an audio signal processing unit 907, a speaker 908, and an external interface unit 909. Further, the television device 900 includes a control unit 910, a user interface unit 911, and the like.

The tuner 902 selects a desired channel from broadcast signals received by the antenna 901 and performs demodulation, and outputs an obtained encoded bitstream to the demultiplexer 903.

The demultiplexer 903 extracts a video or an audio of a TV program that is an object to be watched from the encoded bitstream, and outputs data of an extracted packet to the decoder 904. Further, the demultiplexer 903 supplies a packet of data, such as electronic program guide (EPG) to the control unit 910. Note that, when scramble is performed, release of the scramble is performed by a demultiplexer, or the like.

The decoder 904 performs decoding processing of the packet, and outputs video data generated by the decoding processing to the video signal processing unit 905, and the audio data to the audio signal processing unit 907.

The video signal processing unit 905 applies noise removable or video processing according to user setting to the video data. The video signal processing unit 905 generates video data of a TV program displayed in the display unit 906, or image data by processing based on an application supplied through the network. Further, the video signal processing unit 905 generates video data for displaying a menu screen, such as selection of items, and superimposes the video data on the video data of the TV program. The video signal processing unit 905 generates a drive signal based on the generated video data to drive the display unit 906.

The display unit 906 drives a display device (for example, a liquid crystal display element, and the like) base on the drive signal from the video signal processing unit 905 to display a video of a TV program.

The audio signal processing unit 907 applies predetermined processing, such as noise removable, to the audio data, applies D/A conversion processing and amplification processing to the audio data after the predetermined processing, and supplies the audio data to the speaker 908 to output an audio output.

The external interface unit 909 is an interface for making connection to an external device or the network, and performs transmission/reception of data, such as video data and audio data.

The user interface unit 911 is connected to the control unit 910. The user interface unit 911 is configured from an operation switch, a remote control signal reception unit, and the like, and supplies an operation signal according to a user operation to the control unit 910.

The control unit 910 is configured from a central processing unit (CPU), a memory, and the like. The memory stores the program executed by the CPU, and various types of data, EPG data, data acquired through the network, and the like, which are necessary for the CPU to perform the processing. The program stored in the memory is read out by the CPU at a predetermined timing, such as start-up of the television device 900, and executed. The CPU controls units so that the television device 900 performs an operation according to a user operation by executing the program.

Note that a bus 912 is provided in the television device 900 for connecting the control unit 910 with the tuner 902, the demultiplexer 903, the video signal processing unit 905, the audio signal processing unit 907, the external interface unit 909, and the like.

In the television device configured in this way, the decoder 904 is provided with the decoding device (decoding method) of the present application. Therefore, when the encoded stream of the packed image is decoded and displayed, a desired image that configures the packed image can be reliably displayed.

Fifth Embodiment (Configuration Example of Mobile Phone Device)

Figure 38:
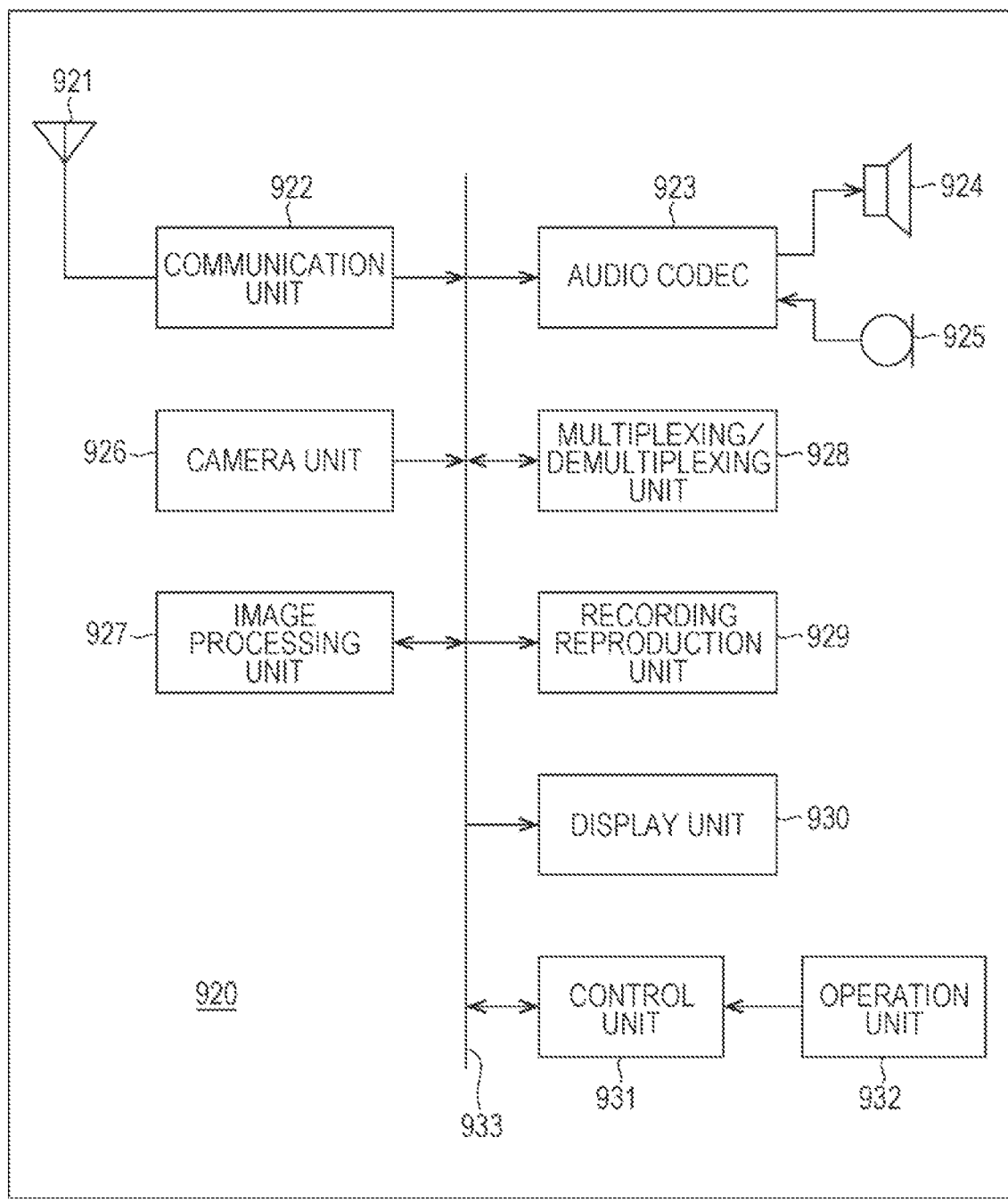
FIG. 38 is a diagram illustrating a schematic configuration example of a mobile phone device to which the present technology is applied.

FIG. 38 exemplarily illustrates a schematic configuration of a mobile phone device to which the present technology is applied. The mobile phone device 920 includes a communication unit 922, an audio codec 923, a camera unit 926, an image processing unit 927, a multiplexing/demultiplexing unit 928, a recording reproduction unit 929, a display unit 930, and a control unit 931. These units are mutually connected through a bus 933.

Further, an antenna 921 is connected to the communication unit 922, and a speaker 924 and a microphone 925 are connected to the audio codec 923. Further, an operation unit 932 is connected to the control unit 931.

The mobile phone device 920 performs various operations, such as transmission/reception of audio signal, transmission/reception of an electronic mail or image data, image capturing, and data record in various modes, such as an audio call mode and a data communication mode.

In the audio call mode, an audio signal generated in the microphone 925 is converted into audio data and applied data compression in the audio codec 923, and is supplied to the communication unit 922. The communication unit 922 applies modulation processing and frequency conversion processing to the audio data to generate a transmission signal. Further, the communication unit 922 supplies the transmission signal to antenna 921 to transmit the signal to a base station (not illustrated). Further, the communication unit 922 applies amplification, frequency conversion processing, and modulation processing to a reception signal received at the antenna 921, and supplies obtained audio data to the audio codec 923. The audio codec 923 performs data decompression of the audio data and conversion to an analog audio signal, and output the analog audio signal to the speaker 924.

Further, when an electronic mail is transmitted in the data communication mode, the control unit 931 receives character data input by an operation of the operation unit 932, and displays the input characters in the display unit 930. Further, the control unit 931 generates mail data base on a user instruction, and the like in the operation unit 932, and supplies the mail data to the communication unit 922. The communication unit 922 performs modulation processing and frequency conversion processing of the mail data, and transmits an obtained transmission signal through the antenna 921. Further, the communication unit 922 performs amplification, frequency conversion processing, and demodulation processing of a reception signal received by the antenna 921, and reconstructs the mail data. The communication unit 922 supplies the mail data to the display unit 930, and displays the content of the mail data.

Note that the mobile phone device 920 can allow the recording reproduction unit 929 to store the received mail data in a storage medium. The storage medium is any rewritable storage medium. For example, the storage medium is a removable medium, such as a semiconductor memory, such as a RAM or a built-in type flash memory, a hard disk, a magnetic disk, a magneto-optical disk, an optical disk, a USB memory, or a memory card.

When image data is transmitted in the data communication mode, the image data generated in the camera unit 926 is supplied to the image processing unit 927. The image processing unit 927 performs encoding processing of the image data to generate encoded data.

The multiplexing/demultiplexing unit 928 multiplexes the encoded data generated in the image processing unit 927 and the audio data supplied from the audio codec 923 in a predetermined system, and supplies the data to the communication unit 922. The communication unit 922 performs modulation processing, frequency conversion processing, and the like of the multiplexed data, and transmits an obtained transmission signal through the antenna 921. Further, the communication unit 922 performs amplification, frequency conversion processing, demodulation processing, and the like of a reception signal received by the antenna 921, and reconstructs the multiplexed data. The multiplexed data is supplied to the multiplexing/demultiplexing unit 928. The multiplexing/demultiplexing unit 928 performs separation of the multiplexed data, and supplies the encoded data to the image processing unit 927, and the audio data to the audio codec 923. The image processing unit 927 performs decoding processing of the encoded data to generate image data. The image processing unit 927 supplies the image data to the display unit 930, and displays the received image. The audio codec 923 converts the audio data into an analog audio signal, and supplies the analog audio signal to the speaker 924 to output the received audio.

In the mobile phone device configured in this way, the image processing unit 927 is provided with the functions of the encoding device and the decoding device (encoding method and decoding method). Therefore, the encoded stream of the packed image can be generated so that a desired image that configures the packed image can be reliably displayed when the encoded stream of the packed image is decoded and displayed. Further, when the encoded stream of the packed image is decoded and displayed, the desired image that configures the packed image can be reliably displayed.

Sixth Embodiment (Configuration Example of Recording Reproduction Device)

FIG. 39 exemplarily illustrates a schematic configuration of a recording reproduction device to which the present technology is applied. The recording reproduction device 940 records audio data and video data of a received broadcast program on a recording medium, and provides the user with the recorded data at a timing according to an instruction of the user. Further, the recording reproduction device 940 can acquire the audio data and the video data from another device, for example, and record the data on the recording medium. Further, the recording reproduction device 940 enables a monitor device or the like to perform image display and an audio output by decoding and outputting the audio data and video data recorded on the recording medium.

The recording reproduction device 940 includes a tuner 941, an external interface unit 942, an encoder 943, a hard disk drive (HDD) unit 944, disk drive 945, a selector 946, a decoder 947, an on-screen display (OSD) unit 948, a control unit 949, and a user interface unit 950.

The tuner 941 selects a desired channel from broadcast signals received by an antenna (not illustrated). The tuner 941 outputs an encoded bitstream obtained by demodulating the reception signal of the desired channel to the selector 946.

The external interface unit 942 is configured from at least one of an IEEE1394 interface, a network interface unit, a USB interface, a flash memory interface. The external interface unit 942 is an interface for making connection with an external device, a network, a memory card, and the like, and performs transmission/reception of data, such as video data and audio data to be recorded.

The encoder 943 encodes the video data and audio data supplied from the external interface unit 942 in a predetermined system when these data have not been encoded, and outputs an encoded bitstream to the selector 946.

The HDD unit 944 records content data, such as video or audio, various programs, and other data in a built-in hard disk, and reads out the data from the hard disk at the time of reproduction.

The disk drive 945 performs record and reproduction of a signal on a mounted optical disk. The optical disk is, for example, a DVD disk (a DVD-Video, a DVD-RAM, a DVD-R, a DVD-RW, a DVD+R, a DVD+RW, or the like) or a Blu-ray (registered trademark) disk, or the like.

The selector 946 selects an encoded bit stream from either the tuner 941 or the encoder 943 at the time of recording of video and audio, and supplies the encoded bitstream to either the HDD unit 944 or the disk drive 945. Further, the selector 946 supplies the encoded bitstream output from the HDD unit 944 or the disk drive 945 at the time of reproduction of video and audio to the decoder 947.

The decoder 947 performs decoding processing of the encoded bitstream. The decoder 947 supplies the video data generated by decoding processing to the OSD unit 948. Further, the decoder 947 outputs audio data generated by decoding processing.

The OSD unit 948 generates the video data for displaying a menu screen, such as selection of items, superimposes the video data on the video data output from the decoder 947, and outputs superimposed data.

The user interface unit 950 is connected to the control unit 949. The user interface unit 950 is configured from an operation switch, a remote control signal reception unit, and the like, and supplies an operation signal according to a user operation to the control unit 949.

The control unit 949 is configured from a CPU, a memory, and the like. The memory stores a program executed by the CPU and various types of data necessary for the CPU to perform processing. The program stored in the memory is read out by the CPU at a predetermined timing, such as start-up of the recording reproduction device 940, and executed. The CPU controls units so that the recording reproduction device 940 performs an operation according to a user operation by executing the program.

In the recording reproduction device configured in this way, the decoder 947 is provided with the decoding device (the decoding method) of the present application. Therefore, when the encoded stream of the packed image is decoded and displayed, a desired image that configures the packed image can be reliably displayed.

Seventh Embodiment (Configuration Example of Imaging Device)

FIG. 40 exemplarily illustrates a schematic configuration of an imaging device to which the present technology is applied. An imaging device 960 images an object, displays an image of the object in the display unit, and records the image on a recording medium as image data.

The imaging device 960 includes an optical block 961, an imaging unit 962, a camera signal processing unit 963, an image data processing unit 964, a display unit 965, an external interface unit 966, a memory unit 967, a media drive 968, an OSD unit 969, and a control unit 970. Further, a user interface unit 971 is connected to the control unit 970. Further, the image data processing unit 964, the external interface unit 966, the memory unit 967, the media drive 968, the OSD unit 969, the control unit 970, and the like are connected through a bus 972.

The optical block 961 is configured from a focus lens, an aperture mechanism, and the like. The optical block 961 focuses an optical image of the object on an imaging surface of the imaging unit 962. The imaging unit 962 is configured from a CCD or CMOS image sensor, and generates an electrical signal by photoelectric conversion according to an optical image and supplies the electrical signal to the camera signal processing unit 963.

The camera signal processing unit 963 applies various types of camera signal processing, such as knee correction, gamma correction, and color correction, to the electrical signal supplied from the imaging unit 962. The camera signal processing unit 963 supplies image data after the camera signal processing to the image data processing unit 964.

The image data processing unit 964 performs encoding processing of the image data supplied from the camera signal processing unit 963. The image data processing unit 964 supplies encoded data generated by the encoding processing to the external interface unit 966 and the media drive 968. Further, the image data processing unit 964 performs decoding processing of the encoded data supplied from the external interface unit 966 or the media drive 968. The image data processing unit 964 supplies image data generated by the decoding processing to the display unit 965. Further, the image data processing unit 964 supplies the image data supplied from the camera signal processing unit 963 to the display unit 965, and superimposes display data acquired from the OSD unit 969 on the image data and supplies the superimposed data to the display unit 965.

The OSD unit 969 generates display data, a menu screen and an icon made of symbols, characters, and figures, and outputs the display data to the image data processing unit 964.

The external interface unit 966 is configured from a USB input/output terminal, for example, and is connected with a printer when printing an image. Further, a drive is connected to the external interface unit 966, as needed, and a removable medium, such as a magnetic disk, or an optical disk is appropriately mounted and a computer program read therefrom is installed, as needed. Further, the external interface unit. 966 includes a network interface connected to a predetermined network, such as a LAN or the Internet. The control unit 970 can read out the encoded data from the memory unit 967 according to an instruction from the user interface unit 971, for example, and supply the encoded data from the external interface unit 966 to another device through the network. Further, the control unit 970 can acquire, through the external interface unit 966, encoded data or image data supplied from another device through the network, and supply the data to the image data processing unit 964.

As a recording medium driven by the media drive 968, any readable/writable removable medium, such as a magnetic disk, a magneto-optical disk, an optical disk, or a semiconductor memory, is used, for example. Further, the recording medium may employ any type of the removable medium, and may be a tape device, a disk, or a memory card. Apparently, a non-contact IC card or the like can be employed.

Further, the media drive 968 and a recording medium are integrated, and may be configured from a non-transportable storage medium, such as a built-in type hard disk drive, or a solid state drive (SSD).

The control unit 970 is configured from a CPU, a memory, or the like. The memory stores a program executed by the CPU, various types of data necessary for the CPU to perform processing, and the like. The program stored in the memory is read out and executed by the CPU at a predetermined timing, such as start-up of the imaging device 960. The CPU controls various units so that the imaging device 960 performs an operation according to a user operation by executing the program.

In the imaging device configured in this way, the image data processing unit 964 is provided with the encoding device and the decoding device (the encoding method and the decoding method) of the present application. Therefore, the encoded stream of the packed image can be generated so that a desired image that configures the packed image can be reliably displayed when the encoded stream of the packed image is decoded and displayed. Further, when the encoded stream of the packed image is decoded and displayed, the desired image that configures the packed image can be reliably displayed.

Note that an embodiment of the present technology is not limited to the above-described embodiments, and various changes can be made without departing from the gist of the present technology.

For example, the display control unit 55 and the display unit 56 of FIG. 18 may be provided outside the decoding device 50.

Further, the present technology may have a configuration of cloud computing in which one function is shared and cooperatively processed by a plurality of devices through the network.

Further, the steps described in the flowcharts can be shared and executed by a plurality of devices, other than executed by a single device.

Further, when a plurality of pieces of processing are included in one step, the plurality of pieces of processing included in the one step can be shared and executed by a plurality of devices, other than executed by a single device.

Further, the present technology may employ the following configurations.

(1)

A decoding device including:

a decoding unit configured to decode encoded data, the encoded data being an encoded packed image in which a plurality of images is packed, and to generate the packed image; and a control unit configured to identify each image that configures the packed image generated by the decoding unit based on packing information related to the packing, the packing information being preferentially used when the packed image is displayed.

(2)

The decoding device according to (1), further including: a reception unit configured to receive the packing information as supplement enhancement information (SEI).

(3)

The decoding device according to (1), further including: a reception unit configured to receive image information related to a part of the packed image.

(4)

The decoding device according to (3), wherein the image information includes position information indicating a position of the part of the packed image.

(5)

The (decoding device according to (4), wherein the packing information is preferentially used to the image information when the packed image is displayed.

(6)

The decoding device according to any of (1) to (5), wherein the packing information includes position information indicating positions in the packed image of the images that configure the packed image.

(7)

The decoding device according to any of (1) to (6), wherein the packing information includes a mode of the packing.

(8)

The decoding device according to any of (1) to (7), wherein the control unit displays the identified image in a display unit configured to display an image.

(9)

The decoding device according to any of (1) to (8), wherein the decoding unit decodes the encoded data in a coding unit (CU).

(10)

A decoding method including the steps of:

by a decoding device, decoding encoded data, the encoded data being an encoded packed image in which a plurality of images is packed, and generating the packed image; and performing control by identifying each image that configures the packed image generated by processing of the decoding based on packing information related to the packing, the packing information being preferentially used when displaying the packed image.

(11)

An encoding device including:

an encoding unit configured to encode a packed image in which a plurality of images is packed, and to generate encoded data;

a setting unit configured to set packing information related to the packing, the packing information being preferentially used when the packed image is displayed; and a transmission unit configured to transmit the encoded data generated by the encoding unit, and the packing information set by the setting unit.

(12)

The encoding device according to (11), wherein the transmission unit transmits the packing information as supplemental enhancement information (SEI).

(13)

The encoding device according to (11) or (12), wherein the transmission unit transmits image information related to a part of the packed image.

(14)

The encoding device according to (13), wherein the image information includes position information indicating a position of the part of the packed image.

(15)

The encoding device according to (14), wherein the packing information is preferentially used to the image information when the packed image is displayed.

(16)

The encoding device according to any of (11) to (15), wherein the packing information includes position information indicating positions in the packed image of the images that configure the packed image.

(17)

The encoding device according to any of (11) to (16), wherein the packing information includes a mode of the packing.

(18)

The encoding device according to any of (11) to (17), wherein the encoding unit encodes the packed image in a coding unit (CU).

(19)

An encoding method including the steps of:
by an encoding device,
encoding packed image in which a plurality of images is packed, and generating encoded data;
setting packing information related to the packing, the packing information being preferentially used when displaying the packed image; and
transmitting the encoded data generated by processing of the encoding, and the packing information set by processing of the setting.

REFERENCE SIGNS LIST

1 Encoding device
2 Encoding unit
3 Setting unit
4 Transmission unit
50 Decoding device
51 Reception unit
53 Decoding unit
54 Control unit
55 Display control unit.
56 Display unit
120 Encoding device
121 Encoding unit
122 Setting unit
160 Decoding device
161 Decoding unit
162 Control unit
163 Display control unit.

The invention claimed is:

1. An encoding device comprising:
an encoding unit configured to encode data, the data including a packed image in which a plurality of images are packed, a packing area information that indicates an image area of an identified image, a cropping information in a sequence parameter set (SPS) that indicates a cropped area of the identified image, and a packing arrangement type information that indicates whether the packed image is in a side-by-side packing arrangement,
wherein the packing area information and the packing arrangement type information are used for selecting between using the image area to identify a display area and using the cropping information to identify the display area,
wherein the packing area information and the packing arrangement type information are used for identifying the display area by using the image area, instead of the cropping information, that is displayed as a result of decoding the packed image, and
wherein the encoding unit is implemented via at least one processor.

2. The encoding device according to claim 1, wherein the packing area information includes position information of each image included in the packed image.

3. The encoding device according to claim 1, further including:
a transmission unit configured to transmit the encoded data generated by the encoding unit,
wherein the transmission unit transmits the packing area information as supplemented enhancement information (SEI), and
wherein the transmission unit is implemented via at least one processor.

4. The encoding device according to claim 1, wherein the cropping information includes left-end information in the cropped area, right-end information in the cropped area, upper-end information in the cropped area and lower-end information in the cropped area.

5. The encoding device according to claim 1, further including:
a transmission unit configured to transmit the encoded data generated by the encoding unit,
wherein the transmission unit transmits image information related to a part of the packed image, and
wherein the transmission unit is implemented via at least one processor.

6. The encoding device according to claim 5, wherein the image information includes position information indicating a position of the part of the packed image.

7. The encoding device according to claim 6, wherein the packing area information is preferentially used to the image information when the packed image is displayed.

8. The encoding device according to claim 1, wherein the packing area information includes position information indicating positions in the packed image of the images that configure the packed image.

9. The encoding device according to claim 1, wherein the encoding unit encodes the packed image in a coding unit (CU).

10. A decoding method comprising:
encoding data, the data including a packed image in which a plurality of images are packed, a packing area information that indicates an image area of an identified image, a cropping information in a sequence parameter set (SPS) that indicates a cropped area of the identified image, and a packing arrangement type information that indicates whether the packed image is in a side-by-side packing arrangement,
wherein the packing area information and the packing arrangement type information are used for selecting between using the image area to identify a display area and using the cropping information to identify the display area, and
wherein the packing area information and the packing arrangement type information are used for identifying the display area by using the image area, instead of the cropping information, that is displayed as a result of decoding the packed image.

11. A non-transitory computer-readable medium having encoded thereon a program, which when executed by a computer causes the computer to execute a method, the method comprising:
encoding data, the data including a packed image in which a plurality of images are packed, a packing area information that indicates an image area of an identified image, a cropping information in a sequence parameter set (SPS) that indicates a cropped area of the identified image, and a packing arrangement type information that indicates whether the packed image is in a side-by-side packing arrangement, wherein the packing area information and the packing arrangement type information are used for selecting between using the image area to identify a display area and using the cropping information to identify the display area, and wherein the packing area information and the packing arrangement type information are used to identify the display area by using the image area, instead of the cropping information, that is displayed as a result of decoding the packed image.

* * * * *